(12) United States Patent
Contreras et al.

(10) Patent No.: US 12,297,646 B1
(45) Date of Patent: May 13, 2025

(54) REINFORCED PORCELAIN PANEL PRODUCT FABRICATION METHODS FOR ENHANCED STRUCTURAL PROTECTION

(71) Applicant: Moderno Porcelain Works, LLC, Houston, TX (US)

(72) Inventors: Roberto Contreras, Houston, TX (US); Armin Thomas Deutsch, Houston, TX (US)

(73) Assignee: Moderno Porcelain Works, LLC, Houston, TX (US)

( * ) Notice: Subject to any disclaimer, the term of this patent is extended or adjusted under 35 U.S.C. 154(b) by 0 days.

(21) Appl. No.: 19/013,292

(22) Filed: Jan. 8, 2025

Related U.S. Application Data

(60) Division of application No. 18/902,121, filed on Sep. 30, 2024, now Pat. No. 12,241,258, which is a
(Continued)

(51) Int. Cl.
*E04B 1/00* (2006.01)
*A47B 77/02* (2006.01)
(Continued)

(52) U.S. Cl.
CPC .......... *E04F 13/142* (2013.01); *A47B 77/022* (2013.01); *B32B 3/06* (2013.01);
(Continued)

(58) Field of Classification Search
CPC . E04F 13/0885; E04F 13/0866; E04F 13/142; B32B 2305/022; B32B 2315/02; B32B 9/005
See application file for complete search history.

(56) References Cited

U.S. PATENT DOCUMENTS 2,018,201 A    10/1935   Currie
2,111,003 A    3/1938    Francis
(Continued)

FOREIGN PATENT DOCUMENTS

CN      2880962     3/2007
CN    101092842     2/2009
(Continued)

OTHER PUBLICATIONS

European Patent Office, PCT International Search Report and Written Opinion for PCT/US2024/049360, Feb. 6, 2025.
(Continued)

*Primary Examiner* — Basil S Katcheves
(74) *Attorney, Agent, or Firm* — Womble Bond Dickinson (US) LLP

(57) ABSTRACT

The present disclosure provides embodiments of a method a reinforced porcelain panel product for renovations or new constructions. In an embodiment, a method includes applying an adhesive to a top surface of a structural core board that includes a foam-core material. Further, the method continues with abuttingly contacting the structural core board to a bottom surface of a porcelain slab with the adhesive such that regions of the structural core board substantially extend beyond outer peripheries of the porcelain slab to define buffer regions, thereby to allow the buffer regions to be visible and to enhance protection from cracking when the reinforced porcelain panel product is handled. Additional features include the bottom surface of the structural core board having a second surface area larger than the first surface area of the porcelain slab and a fracture toughness greater than the porcelain slab.

20 Claims, 23 Drawing Sheets

Related U.S. Application Data continuation-in-part of application No. 18/821,454, filed on Aug. 30, 2024, now Pat. No. 12,247,403, said application No. 18/902,121 is a continuation-in-part of application No. 18/821,478, filed on Aug. 30, 2024.

(60) Provisional application No. 63/676,400, filed on Jul. 28, 2024, provisional application No. 63/651,803, filed on May 24, 2024, provisional application No. 63/643,778, filed on May 7, 2024, provisional application No. 63/551,903, filed on Feb. 9, 2024, provisional application No. 63/549,820, filed on Feb. 5, 2024, provisional application No. 63/549,704, filed on Feb. 5, 2024, provisional application No. 63/541,981, filed on Oct. 2, 2023.

(51) Int. Cl.
| | | |
|---|---|---|
| *B32B 3/06* | (2006.01) | |
| *B32B 7/12* | (2006.01) | |
| *B32B 9/00* | (2006.01) | |
| *B32B 9/04* | (2006.01) | |
| *B32B 37/12* | (2006.01) | |
| *B32B 37/16* | (2006.01) | |
| *B32B 38/00* | (2006.01) | |
| *E04F 13/08* | (2006.01) | |
| *E04F 13/14* | (2006.01) | |

(52) U.S. Cl.
CPC .............. *B32B 7/12* (2013.01); *B32B 9/005* (2013.01); *B32B 9/046* (2013.01); *B32B 37/12* (2013.01); *B32B 37/16* (2013.01); *B32B 38/0004* (2013.01); *E04F 13/0866* (2013.01); *E04F 13/0885* (2013.01); *E04F 13/0889* (2013.01); *B32B 2250/02* (2013.01); *B32B 2266/0214* (2013.01); *B32B 2305/022* (2013.01); *B32B 2307/54* (2013.01); *B32B 2307/7265* (2013.01); *B32B 2307/7376* (2023.05); *B32B 2315/02* (2013.01); *B32B 2607/00* (2013.01)

(56) References Cited

U.S. PATENT DOCUMENTS

| | | | |
|---|---|---|---|
| 2,156,149 | A | 4/1939 | Feichter |
| 2,207,178 | A | 7/1940 | Richards |
| 2,230,309 | A | 2/1941 | Reed |
| 2,255,712 | A | 9/1941 | Phillips |
| 2,636,770 | A | 4/1953 | Cornwell |
| 2,733,592 | A | 2/1956 | Berchenal et al. |
| 2,760,881 | A | 8/1956 | Toulmin |
| 2,836,055 | A | 5/1958 | Shuman |
| 2,904,990 | A | 9/1959 | Emmerling |
| 3,088,588 | A | 5/1963 | Feichter et al. |
| 3,341,996 | A | 9/1967 | Jones et al. |
| 3,362,119 | A | 1/1968 | Timothy |
| 3,646,180 | A | 2/1972 | Winnick |
| 3,817,012 | A | 6/1974 | Wack et al. |
| 3,831,710 | A * | 8/1974 | Wirt .............. B32B 27/08 428/116 |
| 3,873,402 | A | 3/1975 | Mrasek |
| 3,897,097 | A | 7/1975 | Davis |
| 4,170,857 | A | 10/1979 | Rieger |
| 4,262,464 | A | 4/1981 | Ludowici |
| 4,301,634 | A | 11/1981 | Shore et al. |
| 4,324,605 | A | 4/1982 | Bethea |
| 4,522,855 | A | 6/1985 | Bethea |
| 4,535,022 | A | 8/1985 | Kato |
| 4,619,860 | A | 10/1986 | Brown et al. |
| 4,676,937 | A | 6/1987 | Brown et al. |
| 4,756,943 | A * | 7/1988 | Koletzko ............ B32B 3/18 428/116 |
| 4,923,728 | A * | 5/1990 | Snedeker ............ F41H 5/0492 2/2.5 |
| 5,128,195 | A * | 7/1992 | Hegedus ............ B32B 5/024 428/184 |
| 5,252,023 | A | 10/1993 | Kelly |
| 5,429,545 | A | 7/1995 | Meyer |
| 5,543,187 | A * | 8/1996 | Errico ............ B32B 9/041 257/E39.011 |
| 5,705,250 | A * | 1/1998 | Hudson, Jr. ............ B32B 7/12 52/309.3 |
| 5,816,005 | A * | 10/1998 | Han ............ A47K 3/008 52/390 |
| 5,989,369 | A | 11/1999 | Light |
| 6,150,007 | A | 11/2000 | Oshima et al. |
| 6,578,334 | B2 | 6/2003 | Watanabe |
| 7,874,842 | B2 | 1/2011 | Beno |
| 8,529,810 | B2 | 9/2013 | Guo |
| 8,656,674 | B1 | 2/2014 | Woodward |
| 9,469,510 | B2 | 10/2016 | Philip |
| 9,957,722 | B2 | 5/2018 | Taylor et al. |
| 10,132,086 | B2 | 11/2018 | Wood et al. |
| 10,208,486 | B2 | 2/2019 | Lupi |
| 10,455,988 | B2 | 10/2019 | Lyons et al. |
| 10,588,459 | B2 | 3/2020 | Browning |
| 10,618,256 | B2 | 4/2020 | Calvo |
| 11,002,019 | B1 | 5/2021 | Mendoza |
| 11,242,687 | B2 | 2/2022 | Boucke |
| 11,560,721 | B2 | 1/2023 | Döhring |
| 11,773,603 | B2 | 10/2023 | Cook et al. |
| 11,891,813 | B2 | 2/2024 | Brines et al. |
| 12,098,556 | B2 | 9/2024 | Peñaloza |
| 12,129,661 | B2 | 10/2024 | Naeyaert |
| 12,227,951 | B1 * | 2/2025 | Contreras ............ E04F 13/0894 |
| 12,241,258 | B1 | 3/2025 | Contreras et al. |
| 12,241,259 | B1 | 3/2025 | Contreras et al. |
| 12,247,403 | B1 | 3/2025 | Contreras et al. |
| 2003/0047056 | A1 | 3/2003 | Comas |
| 2005/0276982 | A1 | 12/2005 | Manchee |
| 2007/0071971 | A1 | 3/2007 | Drogan |
| 2007/0157537 | A1 | 7/2007 | Nicolson et al. |
| 2007/0284815 | A1 | 12/2007 | Ramsey |
| 2008/0202053 | A1 | 8/2008 | Guy et al. |
| 2008/0295819 | A1 | 12/2008 | Gifford et al. |
| 2009/0044681 | A1 | 2/2009 | Comas |
| 2010/0088990 | A1 | 4/2010 | Liu |
| 2010/0148896 | A1 | 6/2010 | Hugo |
| 2011/0111192 | A1 | 5/2011 | Calvo |
| 2011/0206870 | A1 | 8/2011 | Aravamudan |
| 2012/0000156 | A1 | 1/2012 | Esposito |
| 2012/0017528 | A1 | 1/2012 | Liu |
| 2012/0073228 | A1 | 3/2012 | Fork et al. |
| 2012/0186002 | A1 | 7/2012 | Bhatnagar et al. |
| 2012/0304580 | A1 | 12/2012 | Sha |
| 2013/0212971 | A1 | 8/2013 | Cordeiro |
| 2015/0308127 | A1 | 10/2015 | Rapp |
| 2015/0375471 | A1 | 12/2015 | Song |
| 2016/0010341 | A1 | 1/2016 | DeAngelis |
| 2016/0375674 | A1 | 12/2016 | Schulte |
| 2017/0036415 | A1 | 2/2017 | Ebnother et al. |
| 2017/0044778 | A1 | 2/2017 | Brickner et al. |
| 2017/0108325 | A1 | 4/2017 | Kenne et al. |
| 2017/0144354 | A1 | 5/2017 | Lombaert et al. |
| 2017/0247063 | A1 | 8/2017 | Banerjee et al. |
| 2017/0362835 | A1 | 12/2017 | Nielsen et al. |
| 2018/0020879 | A1 | 1/2018 | Lyons et al. |
| 2018/0099482 | A1 | 4/2018 | Calvo |
| 2018/0281358 | A1 | 10/2018 | Ben-Daat et al. |
| 2018/0290421 | A1 | 10/2018 | Ide |
| 2018/0338651 | A1 | 11/2018 | Burtt |
| 2021/0047063 | A1 | 2/2021 | Toro |
| 2021/0079666 | A1 | 3/2021 | Caselli et al. |
| 2021/0131120 | A1 | 5/2021 | Rao |
| 2021/0148121 | A1 | 5/2021 | Boquillon et al. |
| 2021/0170723 | A1 | 6/2021 | Feuerhuber |
| 2021/0230883 | A1 | 7/2021 | De Keyzer |
| 2021/0316525 | A1 | 10/2021 | Millan et al. |
| 2021/0363759 | A1 | 11/2021 | Baert et al. |
| 2021/0381229 | A1 | 12/2021 | Paradis |
| 2021/0381259 | A1 | 12/2021 | Paradis |

(56) References Cited

U.S. PATENT DOCUMENTS

| | | |
|---|---|---|
| 2022/0018136 A1 | 1/2022 | Baert et al. |
| 2022/0018139 A1 | 1/2022 | Baert et al. |
| 2022/0251852 A1 | 8/2022 | Ravis |
| 2022/0307270 A1 | 9/2022 | Lasanen et al. |
| 2022/0325530 A1 | 10/2022 | Peñaloza |
| 2023/0098163 A1 | 3/2023 | Cook et al. |
| 2023/0131010 A1 | 4/2023 | Czerkas |
| 2023/0141438 A1 | 5/2023 | Boucke |
| 2024/0254778 A1 | 8/2024 | Iannetta et al. |

FOREIGN PATENT DOCUMENTS

| | | |
|---|---|---|
| DE | 10007347 | 12/2004 |
| DE | 10344755 | 4/2005 |
| EP | 1130183 | 9/2001 |
| EP | 2236065 | 10/2010 |
| EP | 2765255 | 8/2014 |
| EP | 3488746 | 1/2021 |
| FR | 2247937 | 10/1973 |
| GB | 2299713 | 10/1996 |
| GB | 2218438 | 12/2017 |
| RU | 44706 | 12/2004 |
| WO | 2014166774 | 10/2014 |
| WO | 2018055571 | 3/2018 |
| WO | 2023111300 | 6/2023 |

OTHER PUBLICATIONS

European Patent Office, PCT International Search Report and Written Opinion for PCT/US2024/049363, Feb. 6, 2025.
European Patent Office, PCT International Search Report and Written Opinion for PCT/US2024/049364, Feb. 6, 2025.
European Patent Office, PCT International Search Report and Written Opinion for PCT/US2024/049359, Feb. 4, 2025.
European Patent Office, PCT International Search Report and Written Opinion for PCT/US2024/049361, Feb. 4, 2025.
Kablan, Why Magnetic Tiles?, https://www.kablan.ca/why-magnetic-porcelain, May 2022.
International Standard, Ceramic tiles—Grouts and adhesives—Part 2: Test methods for adhesives, ISO 2010.
3A Composites Core Materials, Airex T92, 2018.
3A Composites Core Materials, Safety data sheet for Airex® T90 T92, 2017.
Safeboard website printout, 2024.
Safeboard, Wave Tech OSP, website printout, 2024.
Safeboard, Wave Tech Brochure, 2023.
Moderno Porcelain Works, Video Introducing MightySlab™: A Patent-Pending Innovation, 2024, https://www.youtube.com/watch?v=Gnc_WxP1_wl.
Non-final Office Action for U.S. Appl. No. 18/902,190, filed Dec. 6, 2024.
Non-final Office Action for U.S. Appl. No. 18/902,191, filed Dec. 9, 2024.
Non-final Office Action for U.S. Appl. No. 18/821,478, filed Dec. 4, 2024.
Non-final Office Action for U.S. Appl. No. 18/902,097, filed Dec. 12, 2024.
Non-final Office Action for U.S. Appl. No. 18/821,454, filed Nov. 8, 2024.
Non-final Office Action for U.S. Appl. No. 18/902,140, filed Dec. 23, 2024.
Translation of German Application No. DE10344755A1, Peter Kellner, Apr. 14, 2005.
Notice of Allowance for U.S. Appl. No. 18/902,163, filed Dec. 31, 2024.
Notice of Allowance for U.S. Appl. No. 18/902,121, filed Jan. 8, 2025.
Notice of Allowance for U.S. Appl. No. 18/902,190, filed Jan. 8, 2025.
MICShield, TAW 106, Cement-based, White Tile Adhesive for Ceramic and Small Format Tiles, Manaseer Group, 2024.

\* cited by examiner

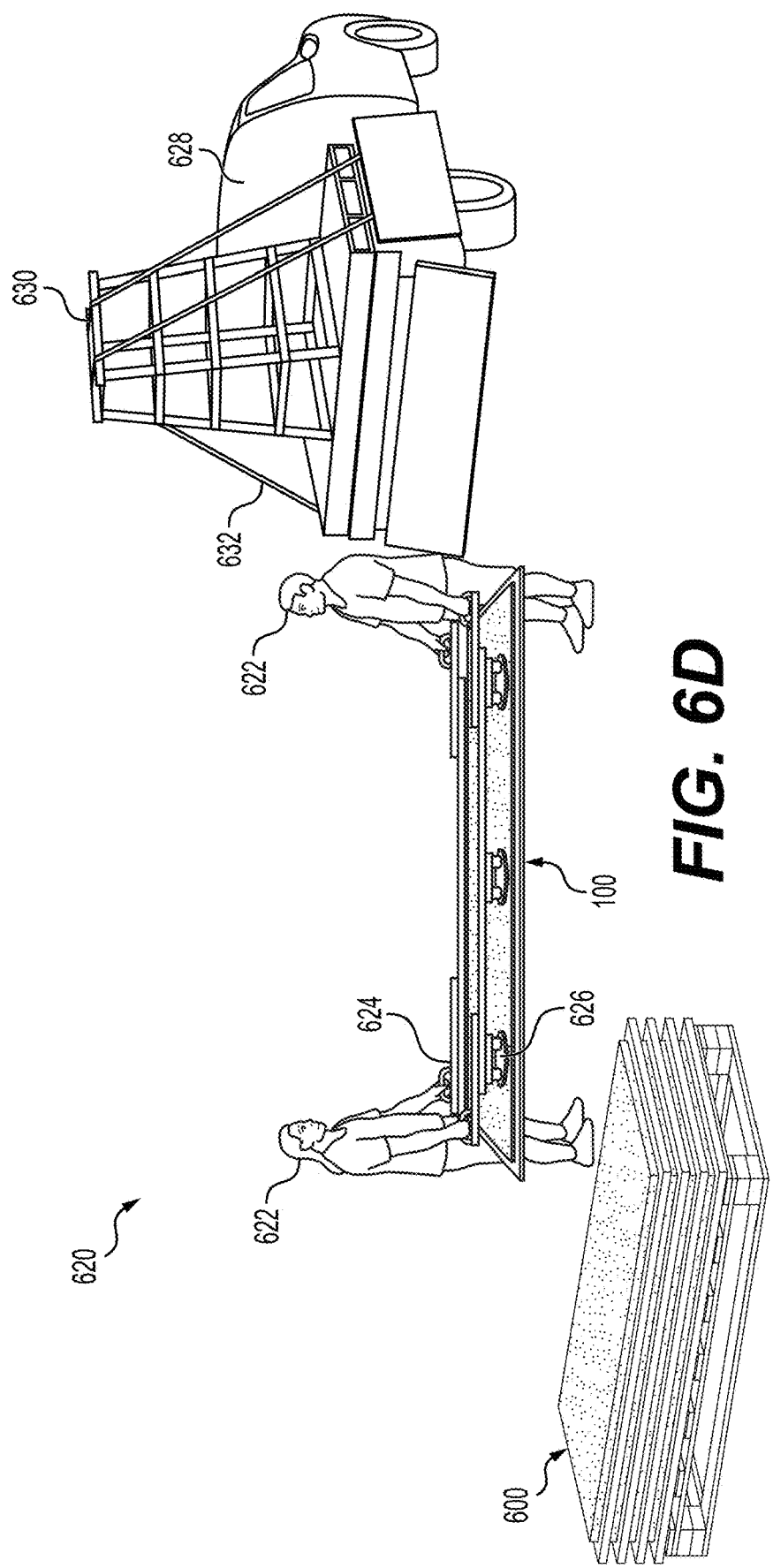

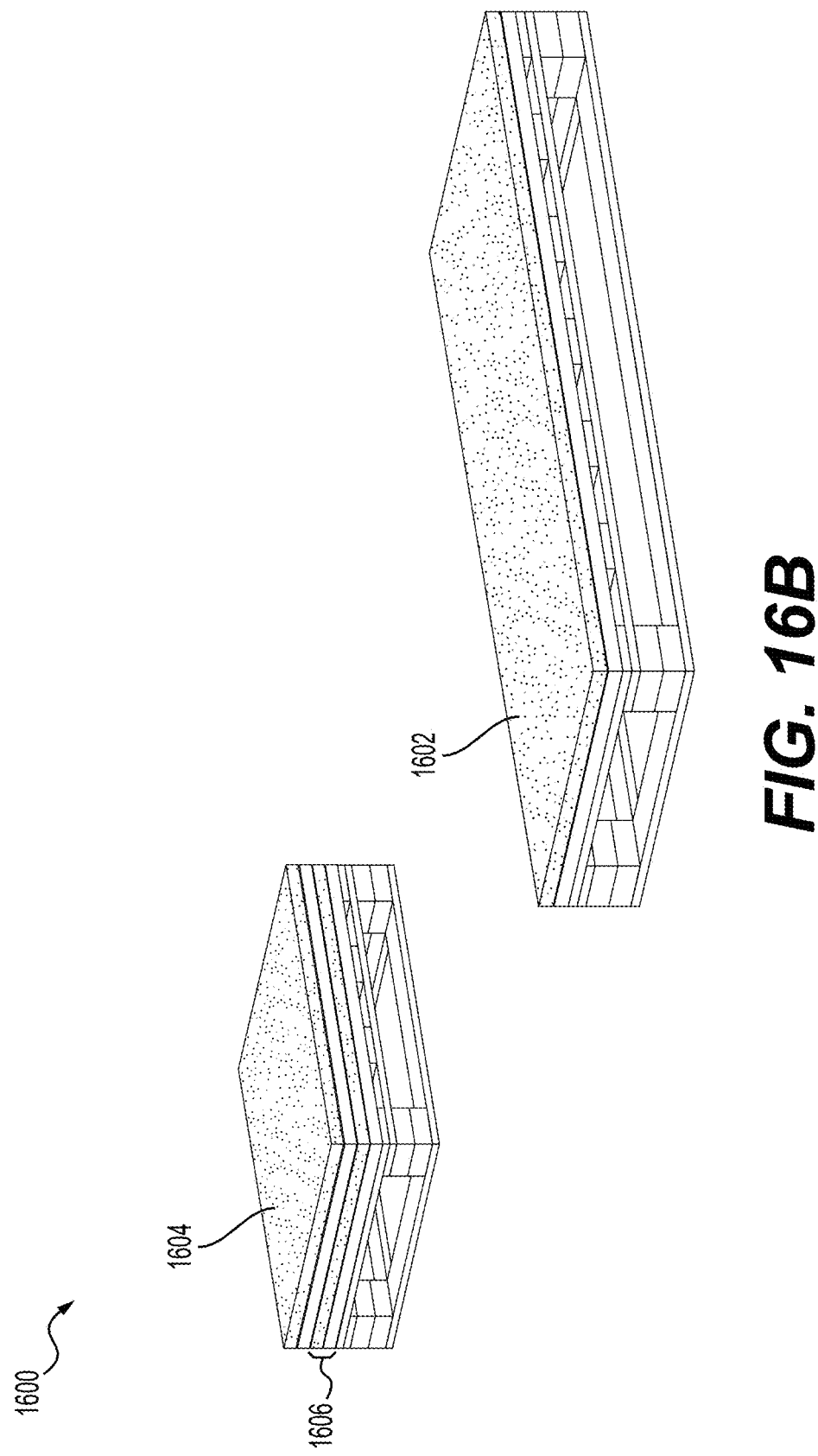

ic core board to the porcelain slab such that the adhesive

REINFORCED PORCELAIN PANEL PRODUCT FABRICATION METHODS FOR ENHANCED STRUCTURAL PROTECTION

CROSS REFERENCE TO RELATED APPLICATIONS

This application is a divisional of U.S. Non-Provisional application Ser. No. 18/902,121, filed Sep. 30, 2024, titled "REINFORCED PORCELAIN PANEL PRODUCT FABRICATION METHODS FOR ENHANCED STRUCTURAL PROTECTION," which is a continuation-in-part of U.S. Non-Provisional application Ser. No. 18/821,454, filed Aug. 30, 2024, titled "REINFORCED PORCELAIN PANEL SYSTEM AND ASSOCIATED METHODS FOR ENHANCED STRUCTURAL PROTECTION," which claims priority to and the benefit of U.S. Provisional Application No. 63/676,400, filed Jul. 28, 2024, titled "REINFORCED PORCELAIN PANEL PRODUCT AND ASSOCIATED METHODS FOR ENHANCED STRUCTURAL PROTECTION," U.S. Provisional Application No. 63/651,803, filed May 24, 2024, titled "REINFORCED PORCELAIN PANEL PRODUCT AND ASSOCIATED METHODS FOR ENHANCED STRUCTURAL PROTECTION," U.S. Provisional Application No. 63/643,778, filed May 7, 2024, titled "REINFORCED PORCELAIN PANEL PRODUCT AND ASSOCIATED METHODS FOR ENHANCED STRUCTURAL PROTECTION," U.S. Provisional Application No. 63/551,903, filed Feb. 9, 2024, titled "MAGNETIC SHOWER WALL ACCESSORIES," U.S. Provisional Application No. 63/549,820, filed Feb. 5, 2024, titled "PORCELAIN BOARD TILES," U.S. Provisional Application No. 63/549,704, filed Feb. 5, 2024, titled "PORCELAIN BOARD FOR FABRICATORS OR DISTRIBUTORS," and U.S. Provisional Application No. 63/541,981, filed Oct. 2, 2023, titled "SYSTEMS AND METHODS FOR PORCELAIN BOARD," the disclosures of all of which are incorporated herein by reference in their entireties. U.S. Non-Provisional application Ser. No. 18/902,121 is also a continuation-in-part of U.S. Non-Provisional application Ser. No. 18/821,478, filed Aug. 30, 2024, titled "REINFORCED PORCELAIN PANEL SYSTEM AND ASSOCIATED METHODS FOR ENHANCED STRUCTURAL PROTECTION," which claims priority to and the benefit of U.S. Provisional Application No. 63/676,400, filed Jul. 28, 2024, titled "REINFORCED PORCELAIN PANEL PRODUCT AND ASSOCIATED METHODS FOR ENHANCED STRUCTURAL PROTECTION," U.S. Provisional Application No. 63/651,803, filed May 24, 2024, titled "REINFORCED PORCELAIN PANEL PRODUCT AND ASSOCIATED METHODS FOR ENHANCED STRUCTURAL PROTECTION," U.S. Provisional Application No. 63/643,778, filed May 7, 2024, titled "REINFORCED PORCELAIN PANEL PRODUCT AND ASSOCIATED METHODS FOR ENHANCED STRUCTURAL PROTECTION," U.S. Provisional Application No. 63/551,903, filed Feb. 9, 2024, titled "MAGNETIC SHOWER WALL ACCESSORIES," U.S. Provisional Application No. 63/549,820, filed Feb. 5, 2024, titled "PORCELAIN BOARD TILES," U.S. Provisional Application No. 63/549,704, filed Feb. 5, 2024, titled "PORCELAIN BOARD FOR FABRICATORS OR DISTRIBUTORS," and U.S. Provisional Application No. 63/541,981, filed Oct. 2, 2023, titled "SYSTEMS AND METHODS FOR PORCELAIN BOARD," the disclosures of all of which are incorporated herein by reference in their entireties.

TECHNICAL FIELD

The present disclosure generally relates to a reinforced porcelain panel product fabrication methods for enhanced structural protection. More specifically, the present disclosure relates to embodiments of a reinforced porcelain panel product fabrication methods for enhanced structural protection to reduce risk of chips or cracks from handling, installing, cutting, or transporting of the reinforced porcelain panel product.

BACKGROUND

Porcelain slabs have various uses within residential and commercial locations. In particular, bathrooms, common spaces, such as living rooms and kitchens, lobbies, and other similar occupied spaces, may benefit from the aesthetic design of porcelain slabs. Furthermore, porcelain can be crafted, or engineered, to display a variety of designs, such as, for example, a marble appearance, a metallic appearance, or other similar features. While porcelain is an ideal aesthetic material for construction, among other benefits, porcelain, however, is a delicate and brittle material that is vulnerable to chips and cracks upon mishandling, such as during fabrication, shipping, and installation. Applicant has recognized that the implementation of proper handling training, tools, and techniques to move or install porcelain has not achieved a suitable protection from stress induced fractures of the porcelain from mishandling.

SUMMARY

Applicant has recognized a need for enhanced protection of porcelain slabs from stress induced fractures during fabrication, installation, transport, handling, or cutting. Applicant has recognized a need for reducing a risk of stress induced fractures during fabrication, fabrication, installation, transport, handling, or cutting caused by mishandling, such as, for example, collisions of delicate porcelain slabs, which lead to loss of material, non-aesthetic repairs, and increasing the cost of construction. Embodiments of the present disclosure include, for example, a method to fabricate a reinforced porcelain panel product for renovations or new constructions, as would be understood by one skilled in the art. The method comprising includes applying an adhesive material to a top surface of a structural core board. The structural core board includes a foam-core material and has a bottom surface opposite the top surface. The method further includes abuttingly contacting the structural core board to a bottom surface of a porcelain slab with the adhesive material therebetween such that regions of the top surface of the structural core board extend beyond outer peripheries of a first surface area of a top surface of the porcelain slab to define buffer regions, thereby to allow the buffer regions to be visible when viewing the reinforced porcelain panel product from a front view of a top surface of a reinforced porcelain panel product produced and to enhance protection from cracking when the reinforced porcelain panel product is handled. The structural core board has a second surface area larger than the first surface area of a top surface of the porcelain slab and a fracture toughness greater than the porcelain slab.

In yet another embodiment, for example, the method includes pre-sizing the porcelain slab to have a thickness of about 3-millimeters to about 8-millimeters prior to applying the adhesive material to a top surface of a structural core board. Additionally, the method includes pressing the structural core board onto the porcelain slab after abuttingly contacting the structural core board to a bottom surface of a porcelain slab to spread the adhesive material thereon evenly therebetween, thereby to reduce air between the structural core board and to affix the structural core board onto the porcelain slab when in the adhesive material cures. The method further includes trimming outer peripheries of the structural core board such that the structural core board extends an equidistant distance beyond all outer peripheries of the first surface area of the porcelain slab by an overhang of about 0.125 inch to about 0.750 inches. Further, the adhesive material is applied by techniques using a spray, roller, bead applicators, or a combination thereof, and wherein the adhesive material includes a silyl-terminated polyether base resin.

In still another embodiment, the fracture toughness of the structural core board resists a fracture after the porcelain slab is divided such that the structural core board remains intact when the porcelain slab is divided into two or more portions, so that the structural core board remains intact after the porcelain slab is divided into the two or more portions. The structural core board extends beyond outer peripheries of the first surface area of the porcelain slab by an overhang length within about 0.125 inch to about 0.750 inches evenly around the outer peripheries of the first surface area of the porcelain slab.

In another embodiment, the foam-core material is formed by a technique using molding, pressing, layering, or the like, and includes a thermoplastic, wherein the thermoplastic consists of polyurethane, polycarbonate, polyphenylene oxide, polybutylene terephthalate, polyethylene terephthalate, or acrylonitrile butadiene styrene. The foam-core material has a young's modulus value lower than the porcelain slab and the young's modulus value of the foam-core material has a range of about 2.0 GPa to about 14.6 GPa.

In an additional embodiment, the reinforced porcelain panel product has an impact resistance of at least a 30% greater than porcelain having a thickness of 6 mm or higher and a breaking strength of at least 40% greater than porcelain having a thickness of at least 6 mm. The foam-core material has a young's modulus value lower than the porcelain slab and the young's modulus value of the foam-core material has a range of about 2.0 GPa to about 14.6 GPa. Additionally, the structural core board extends beyond outer peripheries of the first surface area of the porcelain slab by an overhang length within about 0.125 inch to about 0.750 inches evenly around the outer peripheries of the first surface area of the porcelain slab.

In another embodiment, the method further includes coating the bottom surface of the structural core board such that the bottom surface is substantially non-permeable, thereby to (a) enable use of a vacuum tool to position the reinforced porcelain panel product in various locations during fabrication, or (b) substantially waterproof the bottom surface.

In still another embodiment, for example, the method further includes scoring the top surface of the porcelain slab with one or more scorelines positioned along one or more selected locations across the top surface, thereby to guide controlled breaks to cut the porcelain slab into a selected pattern when a radial force is exerted on or near the scorelines.

In yet another embodiment, the method further includes (a) cutting the porcelain slab along the one or more scorelines to make one or more tiles of the reinforced porcelain panel product, (b) positioning the one or more tiles of the reinforced porcelain panel product in a selected orientation, and c) abuttingly affixing one or more tiles to a mounting surface adhesively.

In yet another embodiment, the method further includes cutting the reinforced porcelain panel product to fit kitchen fixtures such that the reinforced porcelain panel product is laid on a kitchen structure to be used as a counter having the kitchen fixtures when installed.

In another embodiment of the present disclosure, a method to fabricate a reinforced porcelain panel product for renovations or new constructions, as would be understood by one skilled in the art, includes pre-sizing a porcelain slab to have a thickness of about 3-millimeters to about 8-millimeters and applying an adhesive material to a top surface of a structural core board, the structural core board including a bottom surface opposite the top surface. The adhesive material is applied by a technique using a spray, a roller, a bead applicator, or a combination thereof. The method further includes abuttingly contacting the structural core board to a bottom surface of a porcelain slab with the adhesive material therebetween such that regions of the top surface of the structural core board extend beyond outer peripheries of a first surface area of the porcelain slab to define a buffer region, thereby to allow the buffer region to be visible when viewing a reinforced porcelain panel product produced from a front view of the reinforced porcelain panel product and to enhance an impact resistance of at least a 30% greater than porcelain having a thickness of 6 mm or higher from cracking or chipping when the reinforced porcelain panel product is handled. The buffer region includes a first pair of peripheral opposite side portions positioned substantially parallel with each other and a second pair of opposite side portions connected to and extending transverse to the first pair of peripheral opposite side portions also positioned substantially parallel to each other. The structural core board has a thickness greater than the porcelain slab and a young's modulus value lower than the porcelain slab. The top surface of the structural core board has a second surface area greater than a first surface area of the porcelain slab while the bottom surface of the structural core board is to be attached to a mounting surface when installed. The method continues with trimming outer peripheries of the structural core board such that the structural core board extends an equidistant distance beyond all outer peripheries of the first surface area of the porcelain slab.

In an embodiment, the method includes scoring the top surface of the porcelain slab with one or more scorelines positioned along one or more selected locations across the top surface, thereby to guide controlled breaks to cut the porcelain slab into a selected pattern when a radial force is exerted on or near the scorelines. Additionally, the scoring is performed with a glass cutting wheel or a utility knife.

In still another embodiment of the present disclosure, for example, a method to fabricate one or more reinforced porcelain panel products for renovations or new constructions, as would be understood by one skilled in the art, includes applying an adhesive material to a top surface of a structural core board. The structural core board includes a foam-core material, a bottom surface opposite the top surface, and a total surface area defined by summating surface areas from all surfaces of the structural core board. The method further includes positioning the structural core board such that top surface of a structural core board aligns with a preselected position of a bottom surface of a porcelain slab and abuttingly contacting the structural core board to the bottom surface of the porcelain slab with the adhesive material therebetween at the preselected position to produce a reinforced porcelain panel product. The structural core board has a thickness greater than the porcelain slab such that the total surface area of the structural core board is greater than the total surface area of the porcelain slab, thereby to enhance protection from cracking or chipping when the reinforced porcelain panel product is handled. The bottom surface of the structural core board (a) has a first surface plane substantially parallel to the top surface of the porcelain slab and (b) is to be attached to a mounting surface when installed. The method further includes pressing the structural core board onto the porcelain slab to spread the adhesive material thereon evenly therebetween, thereby to reduce air between the structural core board onto the porcelain slab and to affix the structural core board onto the porcelain slab when in the adhesive material cures.

In some embodiments, the adhesive material is applied by techniques using a spray, roller, bead applicators, or a combination thereof, and wherein the adhesive material includes a silyl-terminated polyether base resin.

In other embodiments, outer peripheries of the structural core board substantially align with outer peripheries of the porcelain slab such that outer peripheries of the structural core board are substantially flush aligned with the outer peripheries of the porcelain slab.

In an embodiment of the present disclose, for example, a method to fabricate one or more reinforced porcelain panel products for renovations or new constructions, as would be understood by one skilled in the art, includes applying an adhesive material to a top surface of a structural core board. The structural core board includes a foam-core material, a bottom surface opposite the top surface, a total surface area defined by summating surface areas from all surfaces of the structural core board, and has a thickness up to 10-millimeters. The method further includes positioning the structural core board such that top surface of a structural core board aligns with a preselected position of a bottom surface of a porcelain slab. The porcelain slab has a thickness of about 3-millimeters to about 8-millimeters. The method further includes abuttingly contacting the top surface of the structural core board to the bottom surface of the porcelain slab with the adhesive material therebetween at the preselected position to produce a reinforced porcelain panel product. The structural core board has a thickness greater than the porcelain slab such that the total surface area of the structural core board is greater than the total surface area of the porcelain slab and a second surface area of the top surface of the structural core board is substantially equal to a first surface area of the top surface of the porcelain slab such that outer peripheries of the structural core board substantially align with outer peripheries of the first surface area of the porcelain slab, thereby to enhance protection from cracking or chipping when the reinforced porcelain panel product is handled. The bottom surface of the structural core board (a) has a first surface plane substantially parallel to the top surface of the porcelain slab and (b) is to be attached to a mounting surface when installed. The method further includes pressing the structural core board onto the porcelain slab to spread the adhesive material thereon evenly therebetween, thereby to reduce air between the structural core board onto the porcelain slab and to affix the structural core board onto the porcelain slab when in the adhesive material cures.

In another embodiment, the adhesive material is applied by techniques using a spray, roller, bead applicators, or a combination thereof. Additionally, the adhesive material includes a silyl-terminated polyether base resin.

In still another embodiment, for example, the structural core board includes two or more interlocking backing segments so that each of the two or more interlocking backing segments interlock to another of the two or more interlocking backing segments. Each of the two or more interlocking backing segments comprises a finger joint, a shiplap joint, or a dovetail joint each configured to adhesively interlock each of the two or more interlocking backing segments together.

Aspects and advantages of these exemplary embodiments and other examples, are discussed in detail herein. Moreover, it is to be understood that both the foregoing information and the following detailed description provide merely illustrative examples of various aspects and embodiment and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to illustrate embodiments of the disclosure more clearly.

FIG. 6D is an exemplary transport embodiment of the reinforced porcelain panel products being handled to be loaded onto a delivery truck, according to one embodiment of the present disclosure.

FIGS. 16A and 16B are perspective views of a reinforced porcelain panel product kit, according to two embodiments of the present disclosure.

Figure 1:
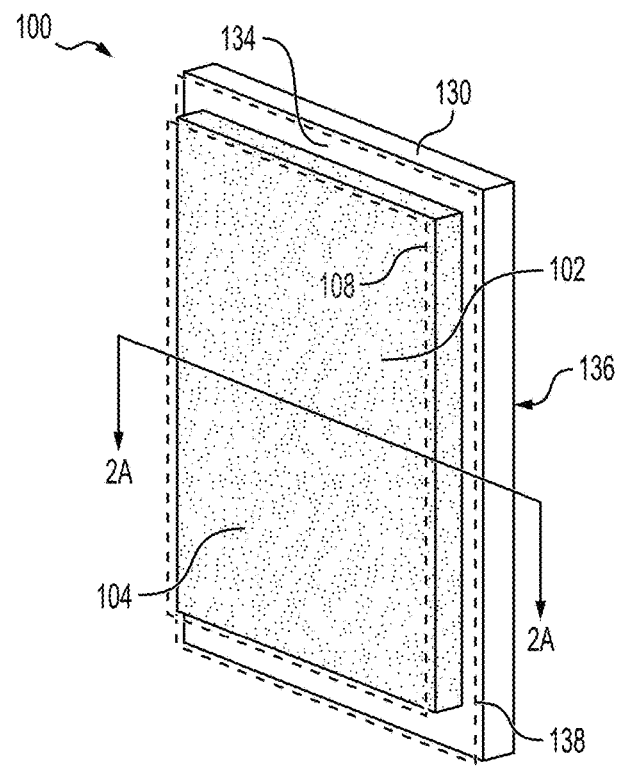
FIG. 1 is perspective view of an embodiment of a reinforced porcelain panel product, according to one embodiment of the present disclosure.

To facilitate understanding, identical reference numerals have been used, where possible, to designate identical elements that are common to the figures. It is contemplated that elements and features of one embodiment may be beneficially incorporated into other embodiments without further recitation.

DETAILED DESCRIPTION

The present disclosure describes various embodiments of reinforced porcelain panel products and associated methods for enhanced structural protection to reduce risk of chips or cracks from a handling of the reinforced porcelain panel products by protection of the porcelain slab with a structural core board. Porcelain slabs have various utility in the construction and decoration industry. Large porcelain slabs may be designed, textured, decorated, or engineered for specific aesthetic appealing walls. However, large porcelain slabs are challenging to transport, fabricate, and install as expert, or routine, handling methods may result in broken, fractured, chipped, or cracked porcelain slabs attributed to mishandling of the fragile porcelain slab. These mishandling failures necessitate repairs that increase cost of construction projects, repair solutions that may be undesirable to the purchaser, and/or lost productivity of fabrication and installation.

The below description may use the phrases "in certain embodiments," "in various embodiments," "in an embodiment," "in one embodiment, or "in example," which may each refer to one or more of the same or different embodiments. Furthermore, the terms "comprising," "including," "having," and the like, as used with respect to embodiments of the present disclosure, are synonymous. The term "plurality" as used herein refers to one or more items or components. The terms "about" or "approximately" are defined as being close to as understood by one of ordinary skill in the art. In one non-limiting example, these terms are defined to be within 10 percent (%), preferably within 5%, more preferably within 1%, and most preferably within 0.5%.

The terms "removing," "removed," "reducing," "reduced," or any variation thereof, when used in the claims and/or the specification includes any measurable decrease of one or more components in a mixture to achieve a desired result. The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %," "vol. %," or "mol. %" refers to a weight, volume, or molar percentage of a component, respectively, based on the total weight, the total volume of material, or total moles, which includes the component. In a non-limiting example, 10 grams of a component in 100 grams of the material is 10 wt. % of the component.

Generally, fabricated porcelain material may include a ceramic made by heating porcelain-creating raw materials to temperatures commonly between about 1,200 degrees Celsius and about 1,400 degrees Celsius. Porcelain-creating raw materials may include kaolin, such as kaolinite, feldspar, ball clay, glass, bone ash, steatite, quartz, petuntse and alabaster. Porcelain may include natural patterning, such as veins, which offers a variety of decorative purposes, such as art displays. Further, porcelain may be manipulated to display a variety of finishes or designs, for example, polished, natural, honed, marble look, wood-look, metal-look, concrete-look, fabric-look and may possess grains therein to exhibit types of textures created by varied processes. Porcelain may also be etched, or engraved, to include descriptive text for signage or other functional uses. Therefore, porcelain is an attractive material for wall cladding, kitchen countertops, tabletops, fireplaces, shower walls, floors, pools, and/or other construction uses due to its ability to be manipulated with a variety of designs or textures.

Porcelain may be fabricated in sheets of porcelain referred herein as porcelain slabs. The porcelain slabs described herein can include various types of porcelain materials, types including sintered stone, such as neolith, or ultra compact porcelain, such as florim, having various grades and/or qualities. One use of porcelain includes fabricating porcelain large panels for use in occupied spaces, such as, for example, lodgings, hotels, houses, new space construction, and/or renovations of the former. However, as discussed above, porcelain slabs are large, thin, and delicate, and therefore, the panels are susceptible to chip or crack when used by fabricators, stone masons, or the like, as compared to other more tolerant materials, such as quartz, or granite, leading to a reduction of the use of porcelain slabs in construction projects to reduce risk of mishandling in the fabrication cutting and/or installation process.

The following disclosure is related to thin and large porcelain slabs, commonly referred to as "thin large format porcelain" amongst those skilled in the art. However, the solution provided to the challenges plaguing thin large format porcelain herein may be also provided for various sizes of porcelain slabs to reduce the risk of stress induced fractures from transportation and mishandling. Further, the following disclosure refers to "panel(s)" as sheets, or portions of slabs of porcelain material that are independent, or stand alone, and further refers to "board(s)" as integrated, or fabricated materials that are united to provide structure, such as a structural core board having an internal structural core. Furthermore, the following disclosure may refer to "assembly(ies)," as integrated materials that are adhesively united, such as a porcelain slab and a structural core board to define a reinforced porcelain panel product being produced under the trademark "MightySlab™."

Figure 2A:
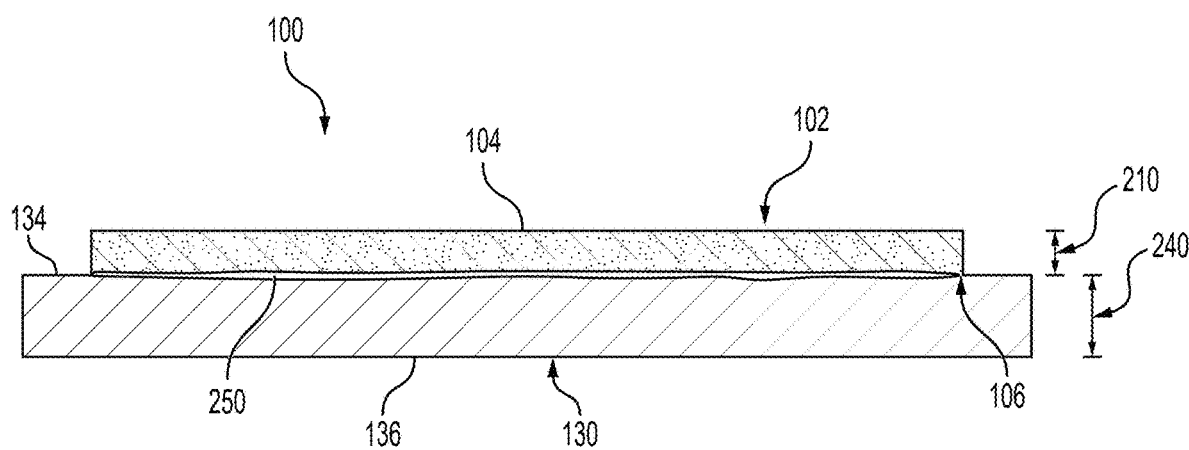
FIG. 2A is a sectional view of the reinforced porcelain panel product taken along the lines of FIG. 2A of the perspective view of an embodiment of a reinforced porcelain panel product of FIG. 1, according to another embodiment of the present disclosure.

FIG. 1 is perspective view of an embodiment of a reinforced porcelain panel product 100 according to one embodiment of the present disclosure. FIG. 1 illustrates a reinforced porcelain panel product 100 including a porcelain slab 102 and a structural core board 130 positioned thereon. The porcelain slab 102 has a top surface 104 and a bottom surface 106 (as shown in FIG. 2A) positioned opposite of the top surface 104. The top surface 104 has a surface area 108. In one embodiment, the bottom surface 106 has a surface area that substantially matches the surface area 108 of the top surface 104. In one embodiment, the porcelain slab 102 is rectangular, although various shapes are contemplated.

The structural core board 130 has a top surface 134 and a bottom surface 136 positioned opposite of the top surface 134. In one embodiment, top surface 134 and a bottom surface 136 each have a plane that are substantially parallel to each other. The top surface 134 has a surface area 138. In one embodiment, the bottom surface 136 has a surface area that substantially matches the surface area 138 of the top surface 134. In one embodiment, the structural core board 130 is rectangular, although various shapes are contemplated as discussed below. The structural core board 130 may be constructed from a foam-core material such as a variety of structural foams, foams, or other foam-core materials with similar foam strength, weight, and/or structural characteristics. In some examples, the foam-core material may be formed by techniques using molding, pressing, layering, or the like, as would be understood by one skilled in the art. In another embodiment, the structural core board 130 includes polyethylene terephthalate ("PET") foam. In some embodiments, the PET foam may be mixed with glass fibers or carbon fiber. In one embodiment, the bottom surface 136 of the structural core board 130, may be laminated, thereby to have a smooth surface for use on air suction tables for positioning, for example, a CNC table, as would be understood by those skilled in the art. In one embodiment, the PET foam is closed-cell PET foam formulated to provide enhanced mechanical properties from, for example, recyclable material such as plastic bottles. Furthermore, PET foam mechanical properties have exhibited significant structural resilience in other industry uses such as, the wind industry on turbine blades, the marine industry on decks and hulls of vessels, the railroad industry on train body sidewalls and flooring supports, and the aerospace industry on plane structural periphery supports. PET foam is temperature tolerant up to about 150 degrees Celsius. In some embodiments, PET foam has a young's modulus of about 2.0 GPa to about 14.6 GPa and a fracture toughness ranging from about 3 MPa-m$^{1/2}$ to about 9.5 MPa-m$^{1/2}$. In comparison, porcelain has a young's modulus of about 67 GPa to about 150 GPa and a fracture toughness of about 2.0 MPa-m$^{1/2}$. Therefore, PET foam is less brittle and more fracture resistant as compared to the mechanical properties of porcelain. Furthermore, the structural core board 130 may weigh approximately 0.018 pounds per square foot. For example, suitable commercially available PET foam includes recyclable polymer foams, such as AIREX® T92. Conventionally, alternate 0.375 inches thick (or about 10-millimeters) support products for stone structural support, such as honeycomb plates, is about 3.5 to about 4 times the weight per square foot as compared to the structural core board 130 embodiment disclosed herein. As an example of the total weight of the reinforced porcelain panel product 100, including the structural core board 130, a 6-millimeter-thick reinforced porcelain panel product 100 may weigh about 150 pounds as compared to a similarly sized 2-centimeter thick quartz panel which may weigh about 800 pounds. Therefore, weight reduction may be advantageous in weight sensitive applications, such as, for example, yachts or other weight sensitive construction.

FIG. 2A is a sectional view of the reinforced porcelain panel product 100 taken along the lines of FIG. 2A of the perspective view of an embodiment of the reinforced porcelain panel product 100 of FIG. 1, according to another embodiment of the present disclosure. FIG. 2A illustrates the reinforced porcelain panel product 100 including the porcelain slab 102, the structural core board 130 positioned thereon, and an adhesive material 250 positioned between the porcelain slab 102 and the structural core board 130. The structural core board 130 has a thickness 240 and the porcelain slab 102 has a thickness 210. In one embodiment, for example, the structural core board 130 may be pre-sized to have a thickness 240 up to about 0.375 inches thick (or about 10-millimeters, such as less than 10-millimeters, or up to about 10-millimeters), although dimensions may be adjusted for specific scenarios of handling. In another embodiment, for example, the porcelain slab 102 may be pre-sized to have a thickness 210 of about 3-millimeter to about 8-millimeter thick, such as about 3.5-millimeter to about 7-millimeter, such as about 3.5-millimeter to about 6-millimeter, such as about 3.5-millimeter, such as about 6-millimeter, or such as about 7-millimeter. In yet another embodiment, for example, the thickness 240 of the structural core board 130 is greater than the thickness 210 of the porcelain slab 102.

Figure 3:
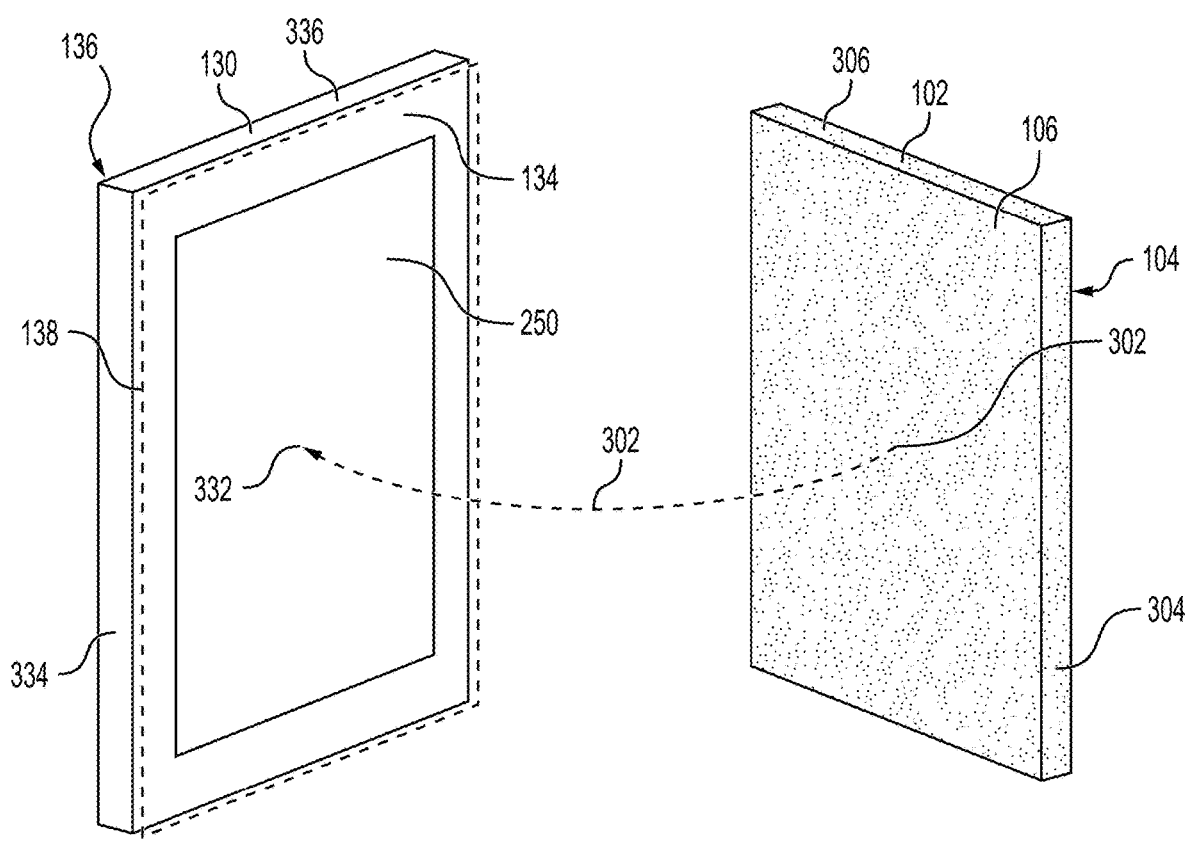
FIG. 3 is an open perspective view of an embodiment of a reinforced porcelain panel product, according to one embodiment of the present disclosure.

The adhesive material 250 unites the bottom surface 106 of the porcelain slab 102 to the top surface 134 of the structural core board 130 such that the porcelain slab 102 and the structural core board 130 are abutting connected and physically contacting. In one embodiment, the adhesive material 250 permanently bonds the porcelain slab 102 and the structural core board 130 together. In one embodiment, the adhesive material 250 is evenly spread across the top surface 134 of the structural core board 130 to promote an even spread of adhesive material 250 across the bottom surface 106 of the porcelain slab 102 when installed, as shown in FIG. 3. In one embodiment, the adhesive material 250 may be bead across the top surface 134 of the structural core board 130 and troweled prior to engaging with the bottom surface 106 of the porcelain slab 102, as would be understood by those skilled in the art. In yet another embodiment, the structural core board 130 may be back buttered and further vibrated, or pressed onto the porcelain slab 102, to promote adhesive material 250 coverage across the area of the bottom surface 106 of the porcelain slab 102 to reduce air pockets which advantageously provides tight sealing and support across the mated surfaces, thereby reducing risk of chips, fractures, or other damage, to the porcelain slab 102 at unsupported sites between the mated surfaces when installed. In still another embodiment, the adhesive material 250 may be applied as a spray across the top surface 134 of the structural core board 130. In another embodiment, the adhesive material 250 may be applied with a roller, or similar brushing technique across the top surface 134 of the structural core board 130. In some embodiments, the adhesive material 250 may be alternatively applied to the bottom surface 106 of the porcelain slab 102. The adhesive material 250 may selected from a variety of specialty adhesives, laminates, glues, or similar joining applications that are suitable for porcelain adhesion on to the material selected for the structural core board 130. In one embodiment, the adhesive material 250 contains a polymer. In another embodiment, the adhesive material 250 contains low-VOC Silyl-Terminated Polyether (STPE) base resin, such as provided by KANEKA MS Polymers™.

Figure 2B:
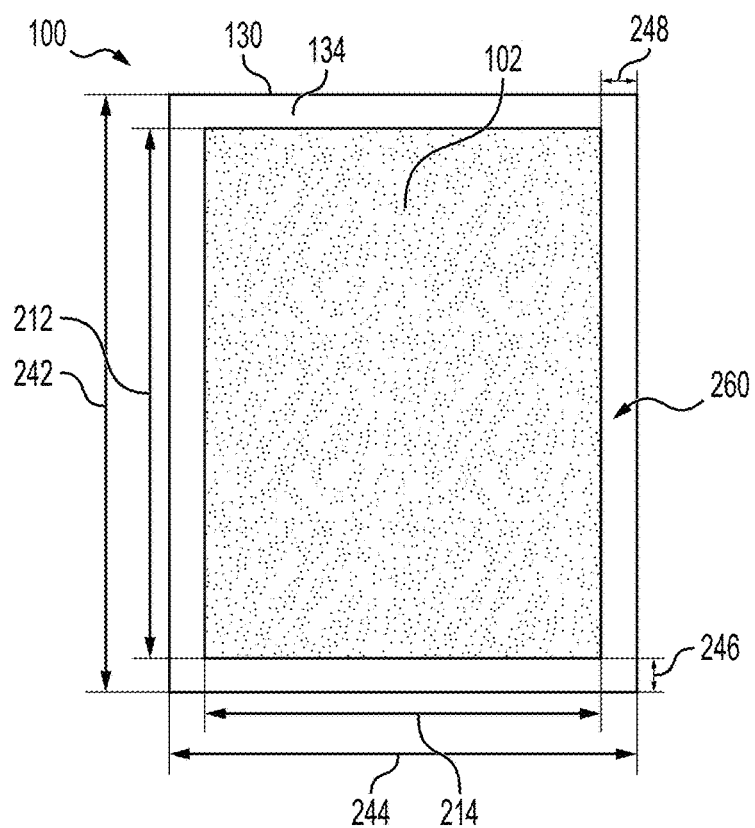
FIG. 2B is a front view of an embodiment of a reinforced porcelain panel product with a buffer region, according to one embodiment of the present disclosure.

FIG. 2B is a front view of an embodiment of a reinforced porcelain panel product 100 with a buffer region 260, according to one embodiment of the present disclosure. The front view of FIG. 2B shows an embodiment, for example, of the porcelain slab 102 having a length 212 of about 74 inch, about 96 inch, about 106 inch, about 109 inch, about 120 inch, or about 126 inch and a width 214 of about 31 inch, about 31.5 inch, about 48 inch, about 60 inch, or about 63 inch, although various sizes may be available, as will be understood by those skilled in the art. For example, commercial standard porcelain slabs 102 are produced by the fabricator in sizes of about 63 inch by about 126 inch, about 60 inch by 126 inch, about 60 inch by about 120 inch, or about 48 inch by about 109 inch. In another embodiment, for example, the porcelain slab 102 may be fabricated or cut to varied sizes, such as, but not limited to, about 31.5 inch by 74 inch, about 31.5 by 96 inch, about 31.5 inch by 106, about 48 inch by 96 inch, about 48 inch by 108 inch, about 60 inch by 74 inch, about 60 inch by 96 inch, about 60 inch by 106 inch, about 60 inch by 120 inch about 60 inch by 126 inch, or about 63 inch by about 126 inch. The largest of the porcelain slab 102 sizes is particularly used for delicate shower installations. In one embodiment, the structural core board 130 has a length 242 of less than about 75.5 inch, 97.5 inch, 107.5 inch, 121.5 inch, or less than about 127.5 inch and a width 244 of less than about 32.5 inch, 33 inch, 49.5 inch, 61.5 inch, or less than about 64.5, although various sizes are contemplated. In another embodiment, the structural core board 130 has a length 242 greater than the length 212 by about 0.250 inch to about 1.500 inch, such as about 0.350 inch to about 1.000 inch, such as about 0.400 inch to about 0.860 inch, such as about 0.500 inch to about 0.760 inch, such as about 0.600 inch to about 0.660 inch, such as about 0.625 inch, although various sizes are contemplated.

Furthermore, FIG. 2B shows the structural core board 130 larger than the porcelain slab 102, thereby to create a buffer region 260 defined by the visible difference of size between the structural core board 130 and the porcelain slab 102. Stated differently, the surface area 138 of the structural core board 130 has a greater surface area than the surface area 108 of the porcelain slab 102 such that the buffer region 260 visibly borders the porcelain slab 102 on the top surface 134 of the structural core board 130 from a front view, as illustrated in FIG. 2B. Stated in another way, the regions of the top surface 134 of the structural core board 130 substantially extend beyond outer peripheries of the first surface area 108 of the porcelain slab 102 and define a buffer region 260 so that a combination of the porcelain slab 102 and the structural core board 130 define the reinforced porcelain panel product 100. Furthermore, the buffer region 260 includes a first pair of peripheral opposite side portions, a length overhang 246, positioned substantially parallel with each other and a second pair of peripheral opposite side portions, a width overhang 248, connected to and extending transverse to the first pair of peripheral opposite side portions also positioned substantially parallel to each other. The size difference and placement of the porcelain slab 102 onto the structural core board 130, or vice versa, creates the length overhang 246 and the width overhang 248 that partially dimensionally defines the buffer region 260.

In one embodiment, for example, the length overhang 246 may be about 0.313+/−0.001 inch and the width overhang 248 may be about 0.313+/−0.001 inch. In another embodiment, for example, the length overhang 246 and the width overhang 248 are substantially equivalent having an overhang of about 0.125 inch to about 0.750 inch, such as about 0.175 inch to about 0.500 inch, such as about 0.200 inch to about 0.430 inch, such as about 0.250 inch to about 0.380 inch, such as about 0.300 inch to about 0.330 inch, such as about 0.313+/−0.001 inch, or such as less than about 0.750+/−0.001 inches, such as less than about 0.500 inches, such as less than about 0.43 inches, such as less than about 0.380 inches, or such as less than about 0.330 inches. Stated differently, the structural core board may extend an equidistant distance beyond all outer peripheries of the porcelain slab. In some embodiments, the structural core board 130 may be trimmed, after positioning onto the porcelain slab 102, to possess the aforementioned length overhang 246 and the width overhang 248 distances.

The length overhang 246 and the width overhang 248 of the structural core board 130 are particularly advantageous as the defined buffer region 260 has been empirically found to protect the porcelain slab 102 from chips, cracks, fractures, or the like, as will be understood by those skilled in the art, from mishandling of the reinforced porcelain panel product 100 during transport or installation. For example, the porcelain slab 102, as discussed above, is large, thin, and fragile such that bumps or an unassisted lift may cause stresses, such as shear, bend, torsion, torque, and the like, which may lead to a failure of the porcelain slab to remain intact, undamaged, or not chipped. However, the length overhang 246 and the width overhang 248 have empirically been found to significantly reduce the likelihood of fractures, and the like, from inadvertent drops, such as falls directly onto the bottom surface 136 of the structural core board 130 drops, corner bumps, or other similar collisions with another hard surface, such as a floor, crate, another panel, or other construction hazards that commonly occur with transportation and installation process of the porcelain slabs. Furthermore, the inventors discovered that overhangs exceeding the above disclosure are prone to failure by breaking off the porcelain slab 102 and thereby to expose the porcelain slab 102 to risk of stress induced damage. Similarly, the inventors discovered that overhangs not exceeding the lower values of the above disclosure are likely to expose the porcelain slab 102 to stress induced damage by not providing adequate protection against inadvertent drops, bumps, or other similar collisions on the sides. Therefore, the length overhang 246 and the width overhang 248 of the structural core board 130 are critical to the protection of the porcelain slab 102 to stress induced damage related to inadvertent drops, bumps, or other similar collisions with another hard surface that commonly occurs with transportation and installation process of the porcelain slabs.

Figure 2C:
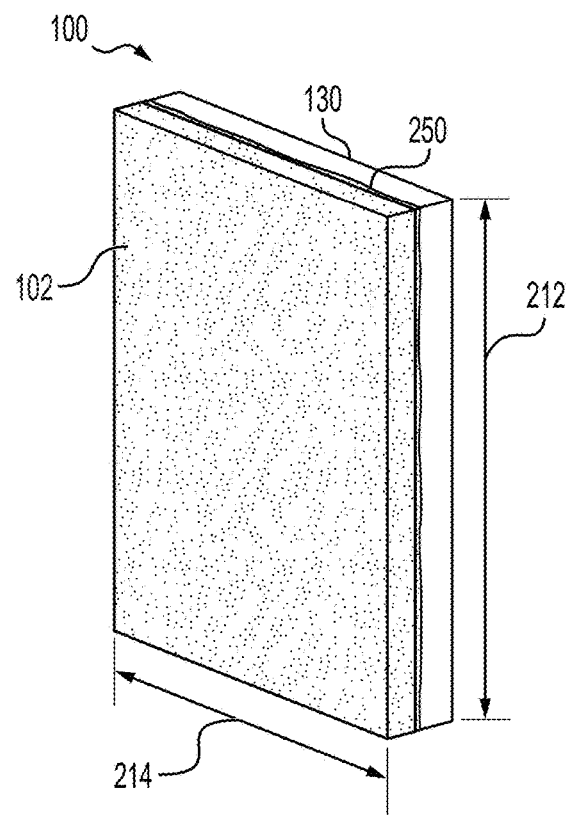
FIG. 2C is a perspective view of an embodiment of a reinforced porcelain panel product without a buffer region, according to one embodiment of the present disclosure.

FIG. 2C is a perspective view of an embodiment of a reinforced porcelain panel product 100 without a buffer region 260 as compared to FIG. 2B, according to one embodiment of the present disclosure. FIG. 2C illustrates an embodiment of the reinforced porcelain panel product 100 where the structural core board 130 and the porcelain slab 102 are substantially the same size at their outer peripheries. However, in some embodiments, as discussed above, the thickness of the structural core board 130 is greater than thickness of the porcelain slab 102 such that the total surface area, defined by summating surface areas from all surfaces of the structural core board 130, is greater than the total surface area of the porcelain slab 102, defined by summating surface areas from all surfaces of the of the porcelain slab 102. In some embodiments, the porcelain slab 102 may have sides, about the outer peripheries, that are flush, or substantially flush with the structural core board 130. The porcelain slab 102 may be dimensionally sized as discussed in FIG. 2B above, including length, width, and thickness. Similarly, the structural core board 130 may also possess the length and width dimensions discussed in FIG. 2B pertaining to the porcelain slab 102.

The embodiment of FIG. 2C may be fabricated without the buffer region 260 of FIG. 2B for various reasons. In one embodiment, an installation may require the buffer region 260 of FIG. 2B to be absent, thereby encouraging fabricators to ship the reinforced porcelain panel product 100 as shown in FIG. 2C. As will be discussed below, trim pieces may be added to edges of the reinforced porcelain panel product 100 to conceal the union between the structural core board 130 and the porcelain slab 102, such as adhesive 250. The embodiment of FIG. 2C may be utilized in delicate transportations wherein the transport of the reinforced porcelain panel product 100 may not experience substantial turbulence. As illustrated, the structural core board 130 provides protection from stresses applied onto the top surface 104 of the porcelain slab 102, such as shear, bend, torsion, torque, and the like, which may lead to a failure of, or damage to, the porcelain slab 102.

FIG. 3 is an open perspective view of an embodiment of a reinforced porcelain panel product 100, according to one embodiment of the present disclosure. FIG. 3 illustrates a preinstallation view of the porcelain slab 102 to be attached to the structural core board 130 to construct the reinforced porcelain panel product 100. The porcelain slab 102 has a porcelain length side 304 and a porcelain width side 306. Similarly, the structural core board 130 has a backing length side 334 and a backing width side 336. In one embodiment, the porcelain slab 102 and the structural core board 130 are centrally aligned along alignment line 300 such that a center 302 of the porcelain slab 102 and a center 332 of the structural core board 130 contact when installed. In one embodiment, the porcelain length side 304 is substantially parallel to the backing length side 334. In one embodiment, the porcelain width side 306 is substantially parallel to the backing width side 336. The alignment of the porcelain slab 102 and the structural core board 130, as discussed above, is advantageous as the buffer region 260 is uniform across the length, the width, or both, of the reinforced porcelain panel product 100 allowing the buffer region 260 to provide equal protection from contact against hard surfaces all around the porcelain slab 102. Further, a uniform buffer region 260 provides a stone mason, or a fabricator, confidence when handling the reinforced porcelain panel product 100 as no one side is more exposed to potential damage.

Foams commonly used for the structural core board 130 may be recycled polymeric foams, but others could be used as well. Structural foams commonly include a thermoplastic or a thermoset. In one embodiment, a commonly used thermoplastic includes, for example but not limited to, polyurethane, polycarbonate, polyphenylene oxide, polybutylene terephthalate, polyethylene terephthalate, and acrylonitrile butadiene styrene, although other materials are contemplated. In one embodiment, a chemical blowing agent may be used to promote foam expansion. In one embodiment, the foam may be a rigid polymeric foam including polyethylene terephthalate. The foam may exhibit desired mechanical properties including increased strength and/or low-weight characteristics, as discussed above. In some embodiments, the structural core board 130 may be chemically stable, exhibit good adhesion and fatigue strength, significantly low water absorption, among other features rendering the structural core board 130 desirable for the reinforced porcelain panel product.

Figure 4A:
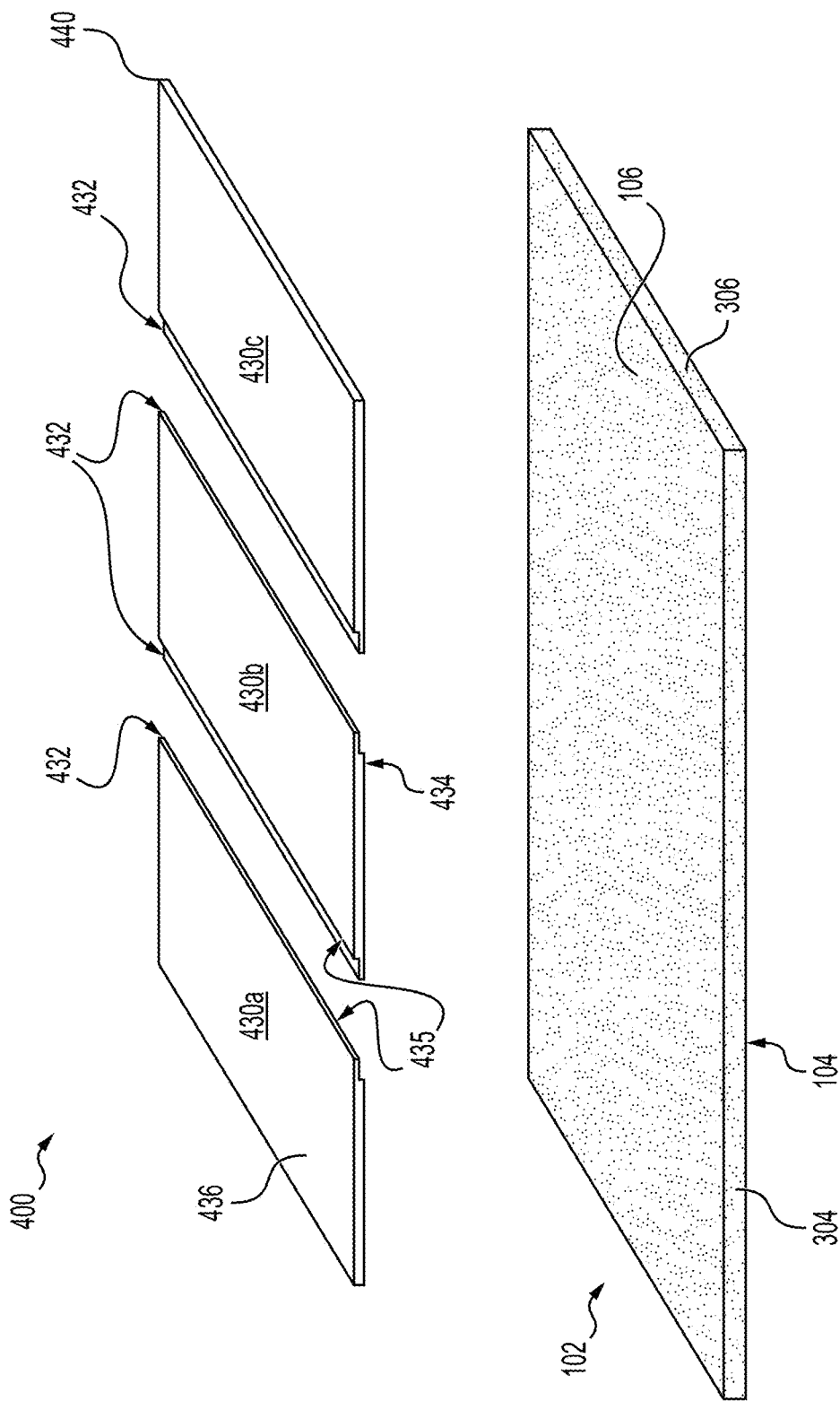
FIG. 4A is an exploded view an embodiment of the reinforced porcelain panel product having interlocking backing segments in an interlocking configuration, according to one embodiment of the present disclosure.

FIG. 4A is an exploded view an embodiment of the reinforced porcelain panel product 400 having interlocking backing segments, or structural core boards, in an interlocking configuration, according to one embodiment of the present disclosure. The reinforced porcelain panel product 400 may include the porcelain slab 102 and multiple interlocking backing segments 430a, 430b, and 430c, although more or fewer interlocking backing segments are contemplated to support the porcelain slab 102. The interlocking backing segments 430a, 430b, and 430c, together define the structural core board 130. In one embodiment, the dimensions of the interlocking backing segments 430a-430c individually are less than the dimension of structural core board 130 discussed in FIGS. 1-4A. However, the embodiments using the interlocking backing segments 430a-430c enable porcelain slabs 102 to be fabricated at sizes larger than presently fabricated as the segments may be combined to fit larger thin large format porcelain. Stated differently, thin large format porcelain may be produced in sizes greater than presently available due the interlocking backing segments 430a-430c providing tailored sizes equivalent to the purposes of the structural core board 130, as discussed above. In some embodiments, the interlocking backing segments 430a-430c are about 4 foot wide each wherein three backing segment panels may be combined and cut to construct one large panel, for example, a size of about 63.625 inch by about 12-6625 inch.

Each of the interlocking backing segments 430a-430c may have one or more ends 432 for each of the interlocking backing segments 430a-430c. Each of the one or more ends 432 have an interlocking configuration to connect the interlocking backing segments 430a-430c to each other, as desired. In one embodiment, a method to fabricate the interlocking backing segments 430a-430e may include fabricating the interlocking configurations onto the interlocking backing segments 430a-430c, as discussed below, for protective use on the reinforced porcelain panel product 400. As illustrated, the one or more ends 432 each have a shelf 435 configured to receive the opposite shelf 435 such that the shelf 435 is positioned on the opposite shelf 435 and joined to marry at least two of the interlocking backing segments 430a-430c. In one embodiment, the one or more ends 432, or interlocking configuration, may be an overlay joint, such as a finger, shiplap, or a dovetail joint, among other types of overlay joints, configured to join or fasten the interlocking backing segments 430a-430c together. In one embodiment, adhesives may be used to join and secure one or more ends 432 together. In one embodiment, the interlocking backing segments 430a-430c may be fabricated with adhesive tape positioned on mating surfaces of the one or more ends 432, for example on the shelf 435, to bond the shelf 435 of one backing segment to the opposite shelf 435 of another backing segment. In one embodiment, the adhesive tape may be covered with a peelable cover to expose the tape. In one embodiment, the interlocking backing segments 430a-430c may be fabricated with porcelain-compliant adhesive tape positioned on the bottom surface 434 of each of the interlocking backing segments 430a-430c to adhere to the bottom surface 106 of the porcelain slab 102, thereby to construct the reinforced porcelain panel product 400. Further, some of the interlocking backing segments, such as interlocking backing segments 430a and 430c may have termination ends 440 that are not configured to interlock with another backing segment but rather are configured to provide the appropriate overhang, as discussed above.

In another embodiment, an interlocking configuration may be placed on the periphery edges of the reinforced porcelain panel product such that the structural core board comprises one or more interlocking edges configured to interlock with a structural core board of another reinforced porcelain panel product such that two or more reinforced porcelain panel products are interlockable and positionable adjacent each other. Stated differently, the peripheral outer edges of the structural core board may possess interlocking configurations that may be utilized to connect two or more reinforced porcelain panel products together when being installed. This feature is advantageous to reduce the amount of waste or structural core board cut by a worker when installing adjacent reinforced porcelain panel products. Further the interlocking configurations on the periphery edges of the reinforced porcelain panel product may provide adequate spacing for some installation embodiments.

Figure 4B:
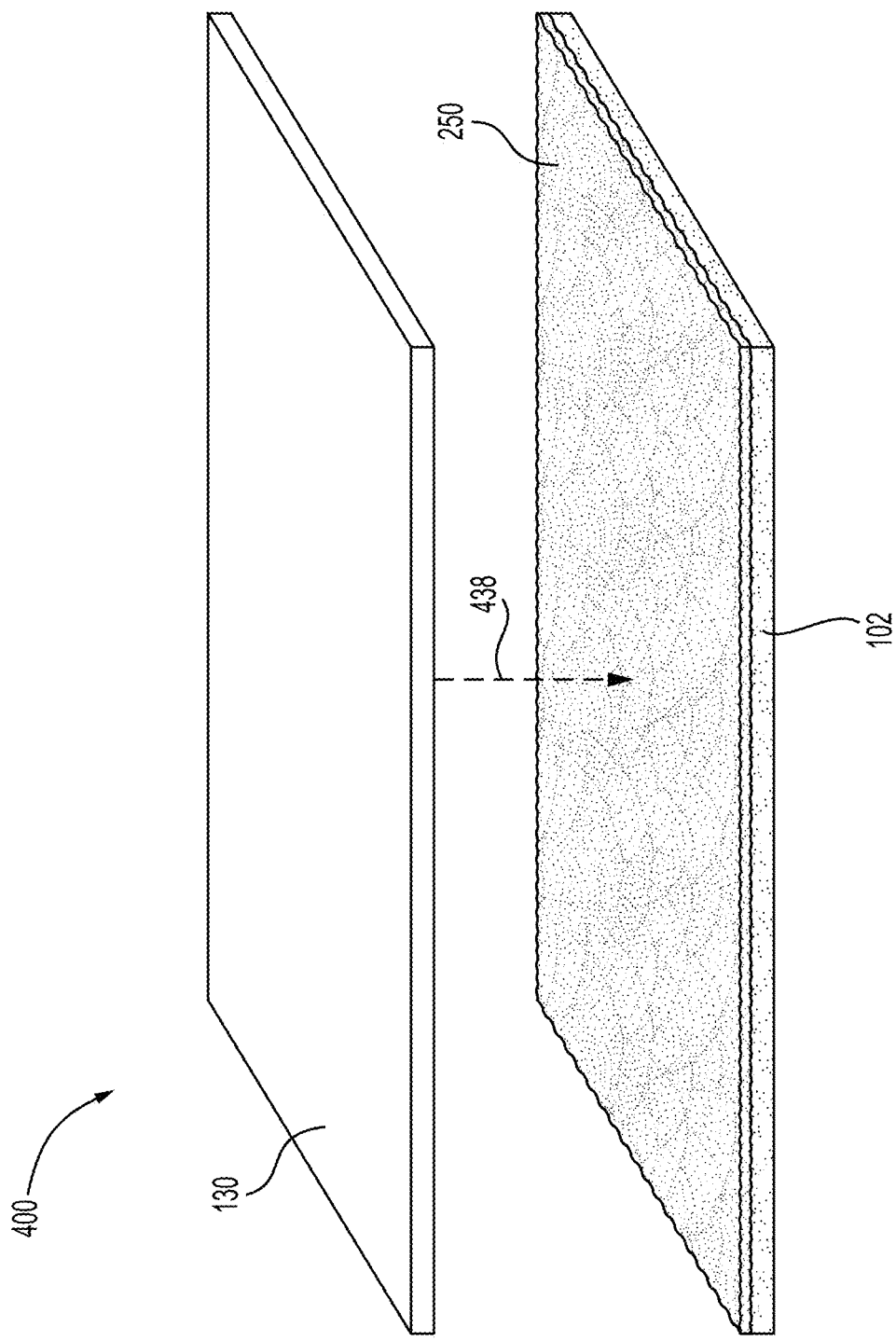
FIG. 4B is an exploded view an embodiment of a reinforced porcelain panel product having a single structural core board, according to one embodiment of the present disclosure.

FIG. 4B is an exploded view an embodiment of a reinforced porcelain panel product 400 having a single structural core board 130, according to one embodiment of the present disclosure. The structural core board 130, as illustrated, may be positioned to be place on the porcelain slab 102 such that each side that are flush, or substantially flush, with the structural core board 130, as similarly discussed in FIG. 2C. In one embodiment, a bottom surface 106 of the porcelain slab 102 may be covered with adhesive 250. The structural core board 130 may be positioned, via line 438, onto the bottom surface 106 of the porcelain slab 102 to fabricate reinforced porcelain panel product 400. As discussed above, some installations may require a reinforced porcelain panel product 400 without a buffer region 206. In particular, transport of the reinforced porcelain panel product 400 that lay, or stack, the reinforced porcelain panel product 400 may not demand the buffer region 260 of FIG. 2B for protection against, for example, shear, bend, torsion, torque, and the like, as the structural core board 130 protects the porcelain slab 102 where adhesively attached. Unlike the embodiment of the reinforced porcelain panel product 400 containing the buffer region 260, the reinforced porcelain panel product 400 without the buffer region 260 may be suitable for delicate handling and transportation scenarios.

Figure 5A:
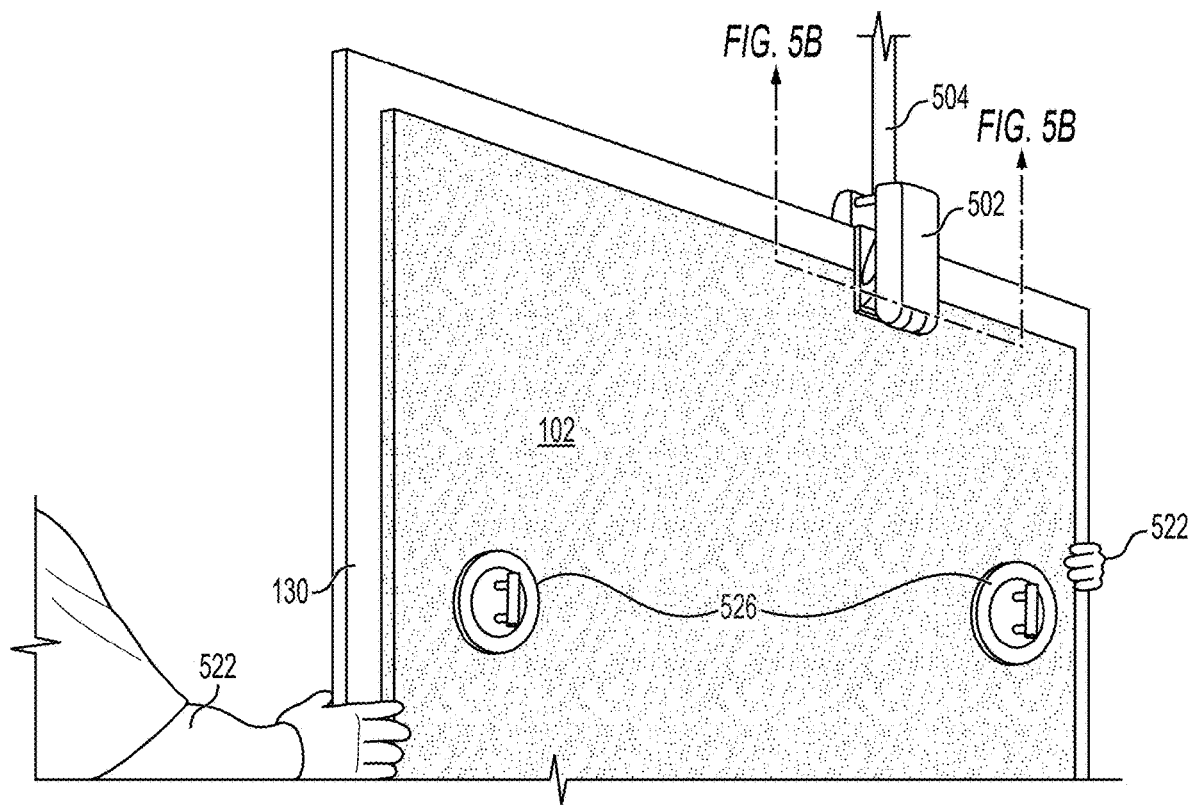
FIG. 5A is an exemplary handling embodiment of reinforced porcelain panel products using a lifting clamp, according to one embodiment of the present disclosure.

FIG. 5A is an exemplary handling embodiment for moving reinforced porcelain panel products 100 using a lifting clamp, according to one embodiment of the present disclosure. Fabricators use a variety of tools to handle stone panels. For example, air tables may be used to maneuver, or position, a laid down panel on, for example, a CNC machine. Other tools also include portable a-frames, such as shown in FIG. 6D but on caster wheels. Similarly, individual suction cups 526 may be used to provide handles for which workers 522 may move the panel. Another tool often used in a fabrication of stone is a lifting clamp 502 as shown in FIG. 5A, The lifting clamp 502 may be attached to an overhead rail system (not shown) by the clamp link 504. The clamp link 504 may be a chain or similar device suitable for linkage between the overhead rail system and the lifting clamp 502. In one embodiment, the lifting clamp 502 compresses the positioned reinforced porcelain panel product therein to be lifted and moved, for example, to a different location for further fabrication. In one embodiment, the lifting clamp 502 may lift the reinforced porcelain panel product 100 in a substantially vertical manner. In another embodiment, the weight of the reinforced porcelain panel product 100 may cause the lifting clamp 502 to angularly lift the reinforced porcelain panel product 100 for movement to the desired location. Conventionally, fabricators have grown accustomed to using the lifting clamp 502 on stone panels, such as, for example, quartz, granite, travertine, marble, and the like fracture resistant stone panels. However, fabricators have avoided using the lifting clamp 502 on porcelain materials as porcelain slabs have routinely failed, for example, by fracturing, shattering, or chipping, when being clamped and/or lifted by lifting clamp 502. The reinforced porcelain panel product 100 of this disclosure, however, is able to be lifted or positioned by use of a lifting clamp 502. The structural core board 130 of the reinforced porcelain panel product 100 advantageously provides stability and structural strength to protect against the forces exerted on the porcelain slab 102 by use of the lifting clamp 502 from fracturing, shattering, or chipping the porcelain slab 102. Therefore, fabricators may advantageously apply their routine stone panel handling techniques to the reinforced porcelain panel product 100 embodiments, discussed above, without further special porcelain handling training and with a substantially reduced risk of product loss due to broken, fractured, chipped, or cracked porcelain slabs attributed to mishandling of the fragile porcelain slab.

Figure 5B:
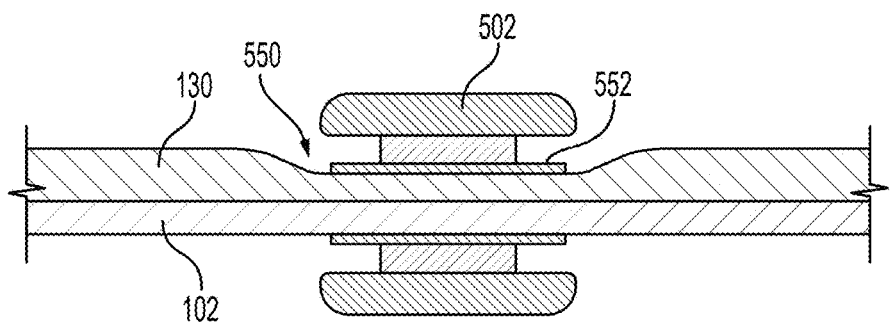
FIG. 5B is a sectional view of the compressed reinforced porcelain panel product by the lifting clamp taken along the lines of 5B of the perspective view of an embodiment of a reinforced porcelain panel product of FIG. 5A, according to another embodiment of the present disclosure.

FIG. 5B is a sectional view of the compressed reinforced porcelain panel product by the lifting clamp taken along the lines of 5B of the perspective view of an embodiment of a reinforced porcelain panel product of FIG. 5A, according to another embodiment of the present disclosure. FIG. 5B illustrates a pair of movable jaws 552 within an interstitial space 550 of the lifting clamp 502. In one embodiment, the interstitial space 550 is configured to open or close by an activation of the lifting clamp 502 to actuate expanding or narrowing the interstitial space 550 with the movable jaws 552. Stated differently, the interstitial space 550 reduces and is eliminated as the movable jaws 552 close so as to clamp and secure, for example, the reinforced porcelain panel product 100. Conversely, the interstitial space 550 may increase as the movable jaws 552 open to for example, release the reinforced porcelain panel product 100. In one embodiment, the movable jaws 552 provide sufficient inward force to crush conventional unsupported porcelain. In other embodiments, the movable jaws 552 may not break the conventional unsupported porcelain, however, the conventional unsupported porcelain may still break upon a lifting of the porcelain by the lifting clamp. The present disclosure of the reinforced porcelain panel product 100 advantageously provides protection against breakage, chipping, and/or cracking of the porcelain slab 102 when using a lifting clamp 502. In one embodiment, the structural core board 130 of the reinforced porcelain panel product 100 deforms to provide 1) a grip for the lifting clamp, and 2) an ability to withstand the compression of the movable jaws 552 of the lifting clamp 502 to enable the lift. As illustrated, the structural core board 130 absorbs the compression power from the movable jaws 552 of the lifting clamp 502 to provide the protection to the porcelain slab 102, as discussed, and the ability to move the reinforced porcelain panel product 100 to a desired location. Therefore, again, fabricators may advantageously apply their routine stone panel handling techniques, such as using a lifting clamp 502, to the reinforced porcelain panel product 100 embodiments with a substantially reduced risk of product loss due to broken, fractured, chipped, or cracked porcelain slabs attributed to mishandling of the fragile porcelain slab.

Figure 6A:
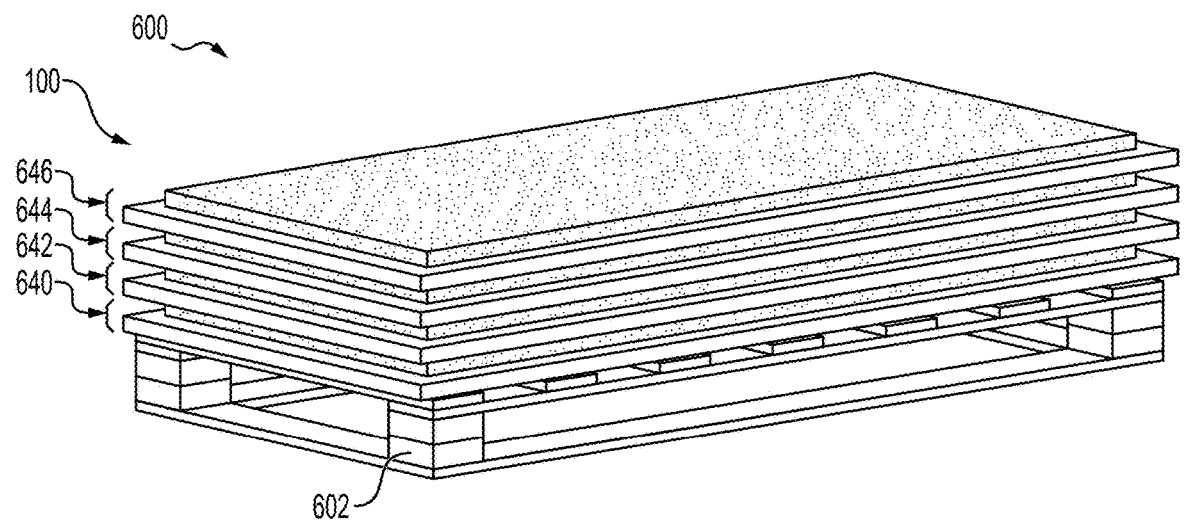
FIG. 6A is an exemplary transport embodiment of stacking reinforced porcelain panel products on a pallet for transporting the reinforced porcelain panel products, according to one embodiment of the present disclosure.
Figure 6B:
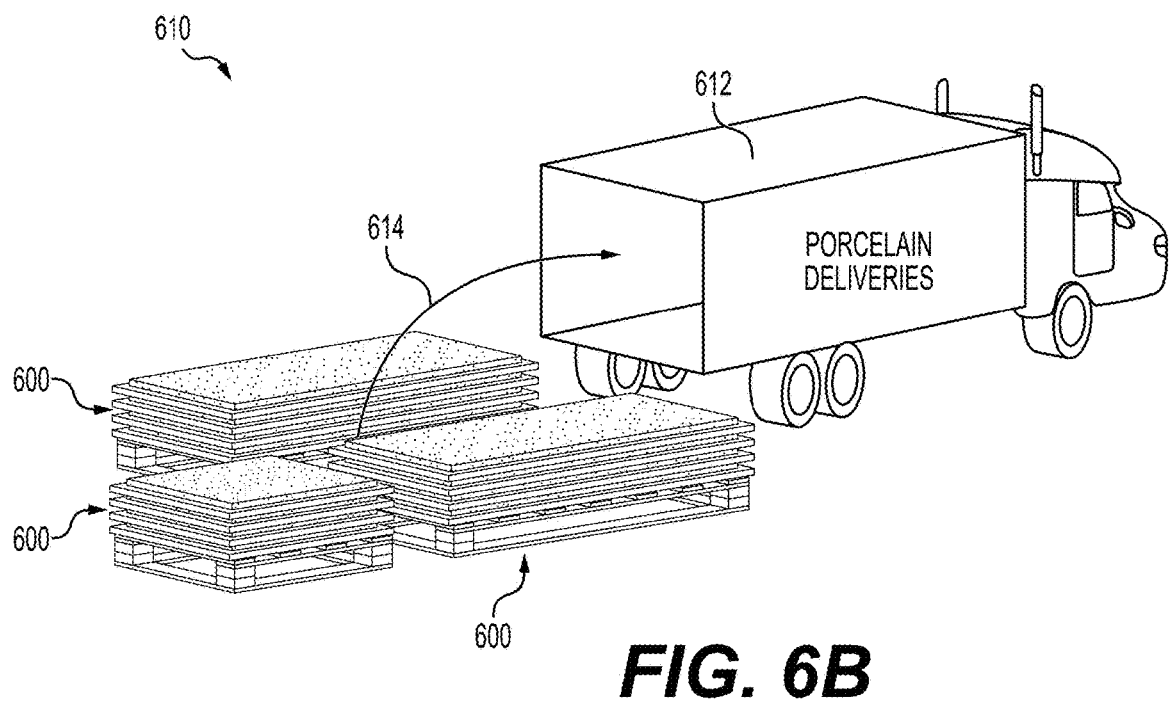
FIG. 6B is an exemplary transport embodiment of the pallets of reinforced porcelain panel products transported with freight shipping, according to one embodiment of the present disclosure.
Figure 6C:
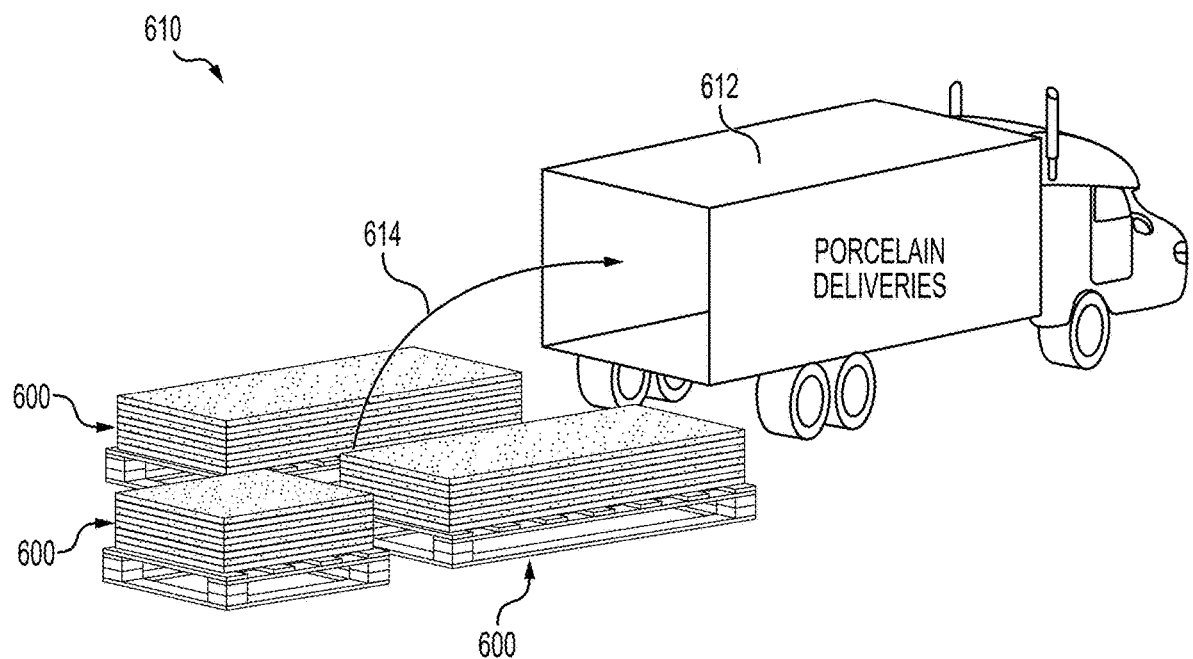
FIG. 6C is an exemplary transport embodiment of the pallets of reinforced porcelain panel products without buffer region transported with freight shipping, according to one embodiment of the present disclosure.

FIG. 6A-6D are exemplary transport embodiments for transporting the reinforced porcelain panel products 100. In particular, FIG. 6A is an exemplary transport embodiment of stacking reinforced porcelain panel products on a pallet for transporting the reinforced porcelain panel products 100, according to one embodiment of the present disclosure. FIG. 6B is an exemplary transport embodiment of the pallets of reinforced porcelain panel products transported with freight shipping, according to one embodiment of the present disclosure. FIG. 6C is an exemplary transport embodiment of the pallets of reinforced porcelain panel products without buffer regions transported with freight shipping, according to one embodiment of the present disclosure. FIG. 6D is an exemplary transport embodiment of the reinforced porcelain panel products being handled to be loaded onto a delivery truck, according to one embodiment of the present disclosure. It is to be understood the term "stacking" is not intended to be limited to a vertical orientation, but rather is used to define a layering of two or more panels in either a vertical, horizontal, or angled orientation wherein the weight of the stacking is absorbed by the structural core board 130 of the reinforced porcelain panel product 100 discussed herein.

FIG. 6A illustrates a pallet of reinforced porcelain panel products 600 as an exemplary stacking of the reinforced porcelain panel products onto a pallet 602 for shipping for example, from a manufacturer to a fabricator. The reinforced porcelain panel products in FIG. 6A may be the reinforced porcelain panel product 100, as discussed above. In one embodiment, each of the reinforced porcelain panel products 100 may contact the stacked adjacent reinforced porcelain panel product 100, such that no space is between the boards.

FIG. 6A provides a visualization of how the discussed panels are handled and possibly be damaged as a result from the transportation of the reinforced porcelain panel products 100. For example, a fabricating site may produce the porcelain slabs 102 and attach the structural core board 130, or interlocking backing segments 430a-c, to create a reinforced porcelain panel product, Each of the boards must then be moved to the location of sale, fabrication, or the location of installation. One method of transporting the reinforced porcelain panel products 100, 400 may be by a transport device, such as a pallet 602, and freight shipping 610 as shown in FIGS. 6B and 6C. FIGS. 6B and 6C are similar illustrations however, the reinforced porcelain panel products 100, 400 may or may not possess the buffer region 260, as shown in FIG. 6B and absent in FIG. 6C. Each of the pallet of reinforced porcelain panel products 600 are subjected to various stresses including manufacturer, or fabricator, handling, pressure points from the straps used to tie down the boards onto the pallet 602, loading 614 onto the freight truck 612 by, for example, a forklift, road vibrations or bumps from freight shipping 610, and unloading to a fabrication or distribution site (as shown in FIG. 6D). For example, conventional fabricators of porcelain slabs may chip or significantly crack unsupported porcelain slabs, when sawed, drilled, or when lifting the panels as discussed in relation with FIGS. 5A and 5B. Conventional fabrication shops may use heavy equipment, such as the lifting clamp 502, to lift heavy panels that may not be sufficiently delicate to handle and carry thin panels, such as the porcelain slab 102, described herein. In another example, the weight of porcelain slabs would conventionally fracture, or damage, by the process of stacking, or layering, another porcelain slab thereon as illustrated in FIG. 6A. The weight of the stacked porcelain slabs would cause the lowest positioned porcelain slab to break, chip, or crack from the weight of the stack. Each of these stresses has challenged industrial usage of large size panels as the porcelain slab 102 is often broken, chipped, or fractured, prior to installation. However, as illustrated, the structural core board 130 may advantageously deform to absorb, or evenly distribute, the weight of the stacked reinforced porcelain panel products 100 to reduce the breakage, chipping, and/or cracking of the porcelain slab 102. By way of illustration, the structural core board 130 of each of the reinforced porcelain panel products 100 of FIG. 6A are numbered as 640, 642, 644, and 646. In this example, a visual representation of the deformation of each of the structural core boards 640, 642, 644, 646 is shown. The stacked reinforced porcelain panel products 100 exert the compiled weight of reinforced porcelain panel products 100 above and thus the structural core board 640 is illustrated with the most deformation to absorb the weight of the stack. Similarly, structural core board 642 is illustrated with the second most deformation to absorb the weight of the stack, structural core board 644 is illustrated with the third most deformation to absorb the weight of the stack, and structural core board 644 exhibits the least deformation as no other reinforced porcelain panel product is positioned thereon. Stated differently, the thickness of the structural core boards 640, 642, 644, 646 each are shown to indicate the weight absorption such as the structural core board 640 having a thickness less than the structural core board 642, which has a thickness less than the structural core board 644, which has a thickness less than the structural core board 646 to advantageously reduce the breakage, chipping, and/or cracking of the porcelain slab 102.

Similarly, as shown in FIG. 6D, operations at fabrication or distribution sites 620 also have hazards that may break, chip, or fracture the reinforced porcelain panel products 100, or 400. For example, a pallet of reinforced porcelain panel products 600 may be separated for fabrication and distribution to installation sites. Workers 622 may utilize other tools to lift each of the reinforced porcelain panel products 100. For example, a tool may be a rail 624 and suction cup 626 tool to hoist a top reinforced porcelain panel product 100 off the pallet of reinforced porcelain panel products 600 and move to a desired location. Operations at fabrication or distribution sites 620 may also decorate or manipulate the reinforced porcelain panel products to cut and/or display an aesthetic feature, as discussed above. Furthermore, the workers 622 may load the reinforced porcelain panel product 100, 400 onto a delivery truck 628 with a transport device, such as a crate 630, further including an a-frame crate embodiment, positioned thereon to deliver the reinforced porcelain panel products 100, 400 to the installation site. In one embodiment, the reinforced porcelain panel products 100, 400 may be stacked at an angle of the crate 630 to encourage inward leaning and strapped to the crate with straps 632. However, conventional unsupported porcelain slabs frequently experienced integrity failure as the leaning and strapped positioning stressed the fragile stone leading to breaks, chips, and/or fractures. For example, while not illustrated, the leaning and strapped positioning may experience 1) a force from the ground by the weight of the porcelain slab and may further experience 2) a force from the weight of another porcelain slab leaning on the first porcelain slab. To rectify the problem of integrity failure, mentioned above, the reinforced porcelain panel products 100 possess the structural core board 130 that may deform by 1) compressing the periphery of the structural core board 130 to absorb the weight of the reinforced porcelain panel product 100 and may further deform by 2) compressing the structural core board 130 of the stacked, or layered, second reinforced porcelain panel product 100 leaning thereon to advantageously reduce the breakage, chipping, and/or cracking of the porcelain slab 102.

Each of the movements of the reinforced porcelain panel products 100 is an added risk to mishandling leading to loss of product. Hazards during operations at fabrication or distribution sites 620 may include dropping of the reinforced porcelain panel product 100, 400 onto a hard surface, colliding the reinforced porcelain panel product 100, 400 with a hard surface, or bending the reinforced porcelain panel product 100, 400 from improper use of the rail 624 and suction cup 626 tool. Similarly, each of these stresses on the porcelain slab 102 has previously challenged industrial usage of large size panels as the porcelain slab 102 is often broken, chipped, or fractured, prior to installation. However, the structural core board 130 integrated onto the porcelain slat 102 has provided a layer of protection against these likely stresses from handling during installation reducing product loss and construction cost by for example, enabling the structural core board 130 to deform to absorb the contact or weight of stacked, or layered reinforced porcelain panel products 100 that advantageously reduce the breakage, chipping, and/or cracking of the porcelain slab 102.

Figure 7A:
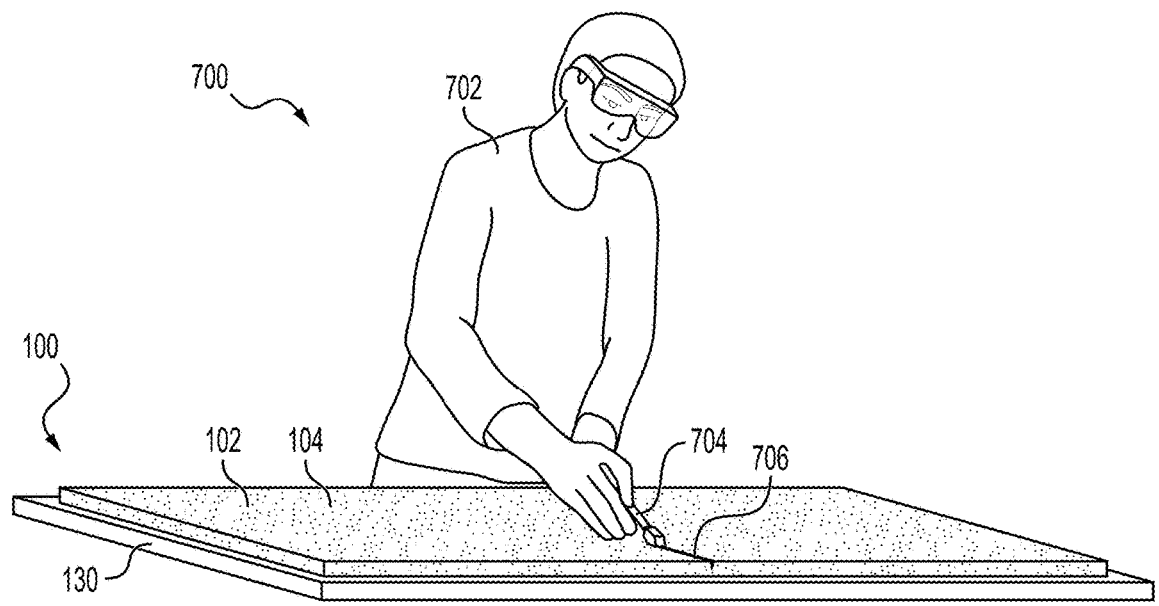
FIGS. 7A-E are exemplary cutting operations of the reinforced porcelain panel product, according to one embodiment of the present disclosure.
Figure 7B:
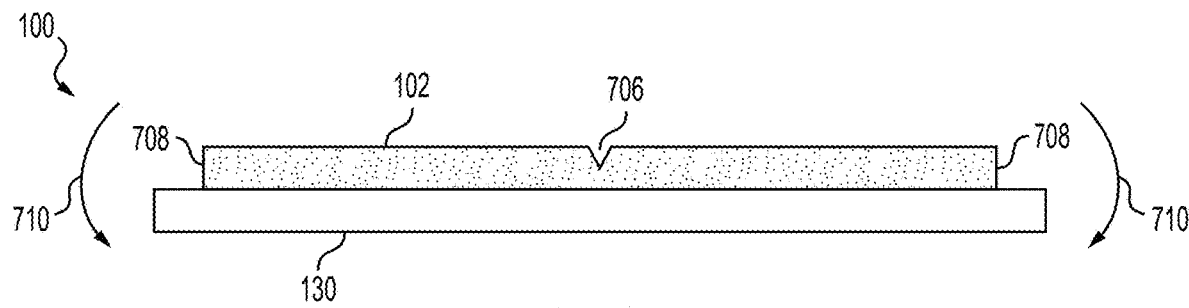
Figure 7C:
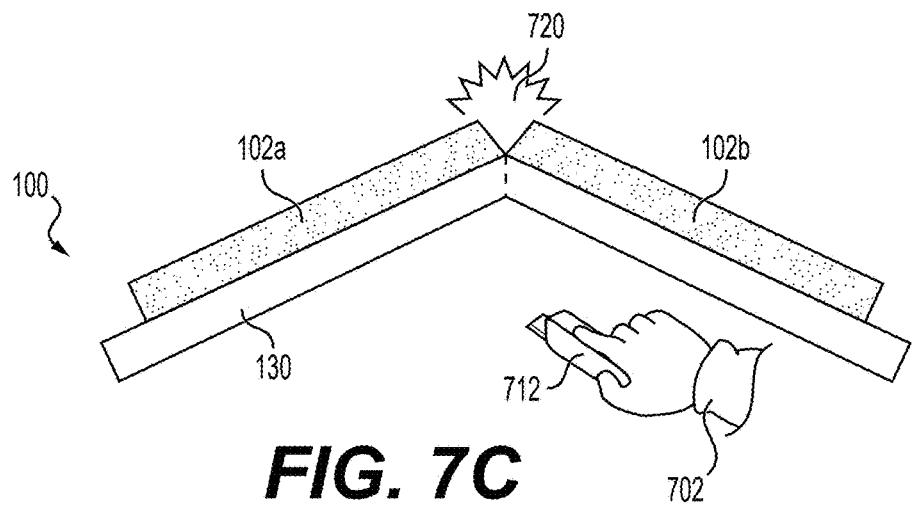
Figure 7D:
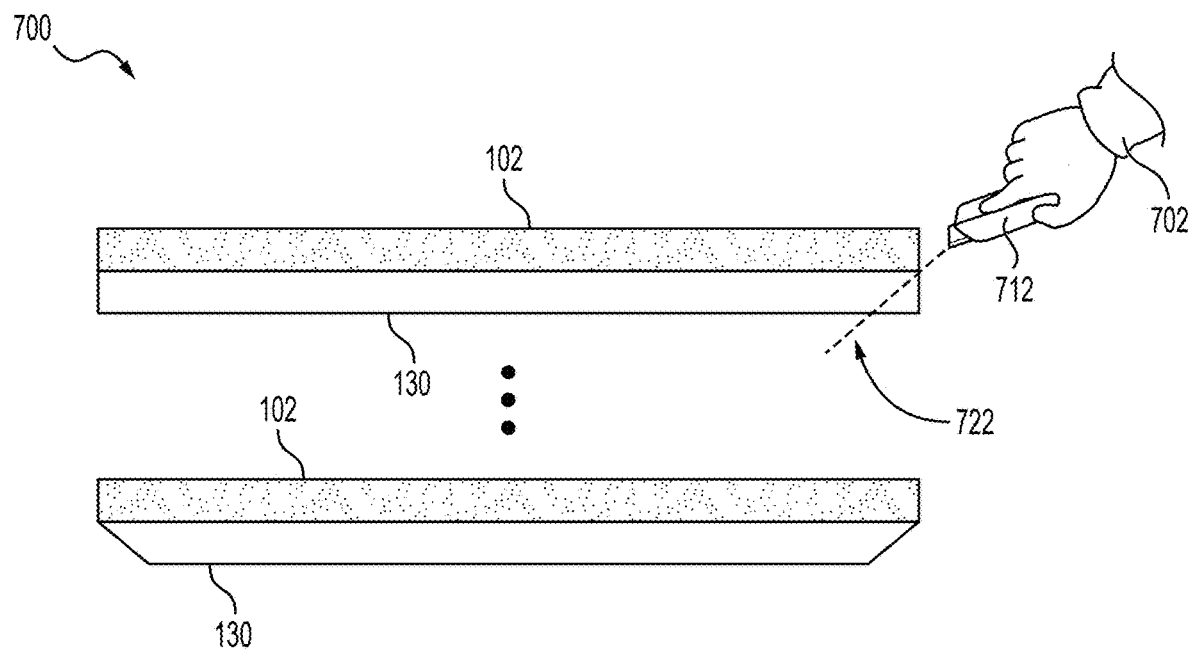
Figure 7E:
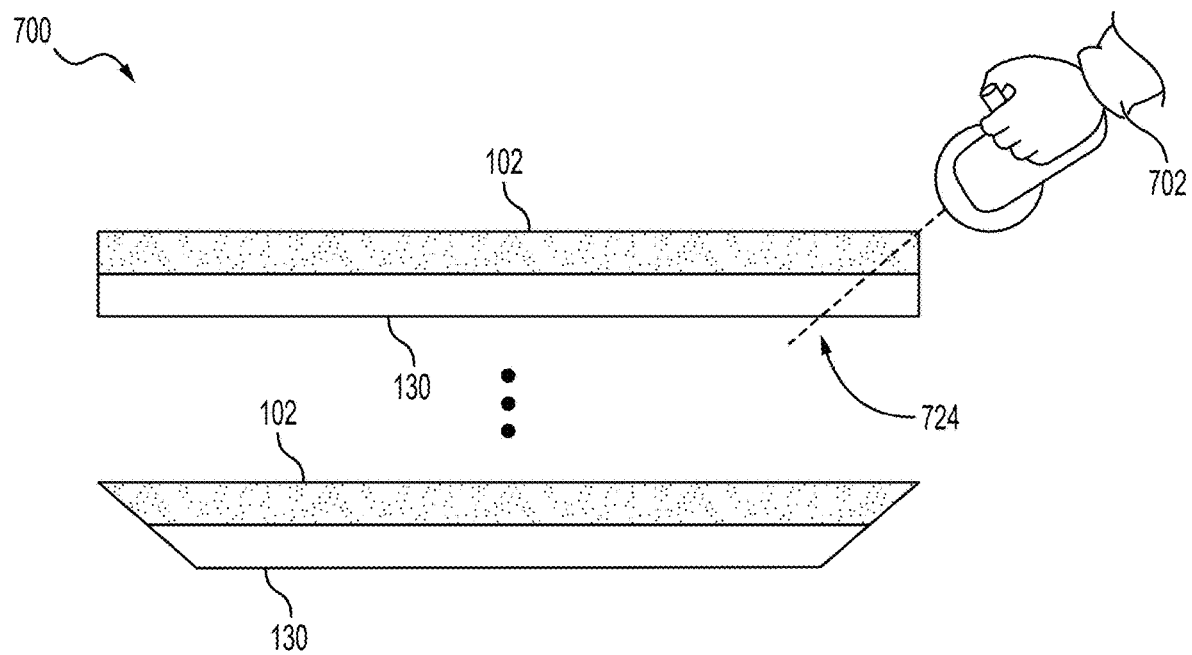

FIG. 7A-7E are exemplary cutting operations 700 of the reinforced porcelain panel product 100, according to one embodiment of the present disclosure. FIG. 7A-7C illustrate a scoreline technique and FIGS. 7D and 7E illustrate edge cutting techniques.

FIG. 7A illustrates a stone mason 702 with a scoring tool 704 in hand. The stone mason 702 is creating a scoreline 706 on the top surface 104 of the porcelain slab 102 within the reinforced porcelain panel product 100, or 400. The scoring tool may be a glass cutting wheel, a porcelain or tile cutter, a scoring wheel, or the like, as will be understood by those skilled in the art, commonly used to score ceramics, stone, and/or glass. After the stone mason 702 has positioned the scoreline 706 in the desired location, the stone mason 702 may initiate an angular bend 710 across the reinforced porcelain panel product 100, as shown in FIG. 7B, or a radial force exerted on or near the scoreline 706, such that the edges 708 move towards each other in a direction facing opposite the opening of the scoreline 706 causing a snap 720 that controllably breaks the porcelain slab 102 into two portions, the first portion 102a and the second portion 102b. In one embodiment, the snap 720 separates the porcelain slab 102 into two portions however the structural core board 130 remains intact. In one embodiment, the structural core board 130 may be cut with a utility knife 712, or other similar cutting tool to separate the reinforced porcelain panel product 100 into two separated portions (not shown). In another embodiment, the snap 720 separates the porcelain slab 102 and the structural core board 130 into two portions. In some embodiments, a score to cut technique may cut the reinforced porcelain panel product 100 in less than about a minute, such as about 30-45 seconds, as compared to conventional porcelain cutting times of 30 minutes or more.

The cutting of the reinforced porcelain panel product 100, as described, is advantageous as the speed of cutting a porcelain slab is significantly increased. The reinforced porcelain panel product 100 may also be cut by use of conventional cutting tools, such as a bridge-saw using a diamond blade, a water jet, an edging machine used to grind panel edges, a CNC router, or the like, as would be understood by one skilled in the art. Conventionally, cutting techniques using saws for porcelain slabs 102, for example, necessitate the tuning of the cutting speed and water cooling to reduce the damage to porcelain slabs. For example, a stone mason 702 may have to adjust the cutting wheel and the cooling water flow of the cutting tool to a slow speed/ high flow to reduce the chipping effect resulting from high-speed, or high heat, of cutting porcelain. In comparison, the stone mason 702 may not be required to slow the cutting speed of the cutting tool, and/or adjust the cooling water flow, for other stone materials, such as a quartz or granite panel. Based on results of experimentation of the disclosed reinforced porcelain panel product 100, it was found that the reinforced porcelain panel product 100 may be cut about four to five times faster than a quartz or granite panel in manner described above. In one embodiment, a fabricator may cut the reinforced porcelain panel product 100 using a diamond bladed bridge-saw at a speed of up to 30 feet per minute ("fpm"), such as about 3 fpm to about 30 fpm, such as about 15 fpm to about 27 fpm, such as about 20 fpm to about 25 fpm, thereby improving upon traditional porcelain cutting times. Therefore, the added stability from the structural core board 130, or interlocking backing segments 430a-c, enables a stone mason 702 to portion, or cut, the reinforced porcelain panel product 100 with a cutting technique discussed above, thereby to significantly reduce cutting times and save overall water usage.

FIGS. 7D and 7E are exemplary edge cutting techniques in which a stone mason 702 may utilize in the fabrication of the specifications or during installation. For example, FIG. 7D shows a utility knife 712 providing a bevel edge, as shown by line 722. As discussed above, the structural core board 130 may be configured to be cut such that beveled edges may be produced with a cutting tool. For example, a 45 degree angle cut across the structural core board 130 may allow the reinforced porcelain panel product 100 to be installed on a wall, as will be discussed in FIGS. 8 and 9. In another example, the structural core board 130 may be cut back to provide porcelain slab contact between two porcelain slabs 102 of adjacent reinforced porcelain panel product 100, thereby to install a contacting seam along the length, or width, of the adjacent reinforced porcelain panel products.

In another embodiment, as illustrated in FIG. 7E, the reinforced porcelain panel product 100 may be beveled along the line 724 through both the porcelain slab 102 and structural core board 130. In this embodiment, a suitable cutting tool, such as an angle grinder, a bridge-saw, or the like, may cut through the porcelain slab 102 and structural core board 130 to provide an angle for installation. For example, a corner detail, such as a trim piece discussed in FIG. 10, or a kitchen counter, as illustrated in FIG. 11 may abut in a desirable position such that two porcelain slabs 102 of adjacent reinforced porcelain panel products 100 mate by contacting their beveled edges along their respective lines 724. While the illustrations of FIGS. 7D and 7E show beveled edges, the cuts may be performed using other shapes, such as, but not limited to, a chamfer, square, bullnose, knife cut, roman ogee, rounded, mitered, eased, cove, or the like, or a combination thereof for intricate or detailed installations that showcase the porcelain slab 102 of the reinforced porcelain panel products 100 as desired.

Figure 8:
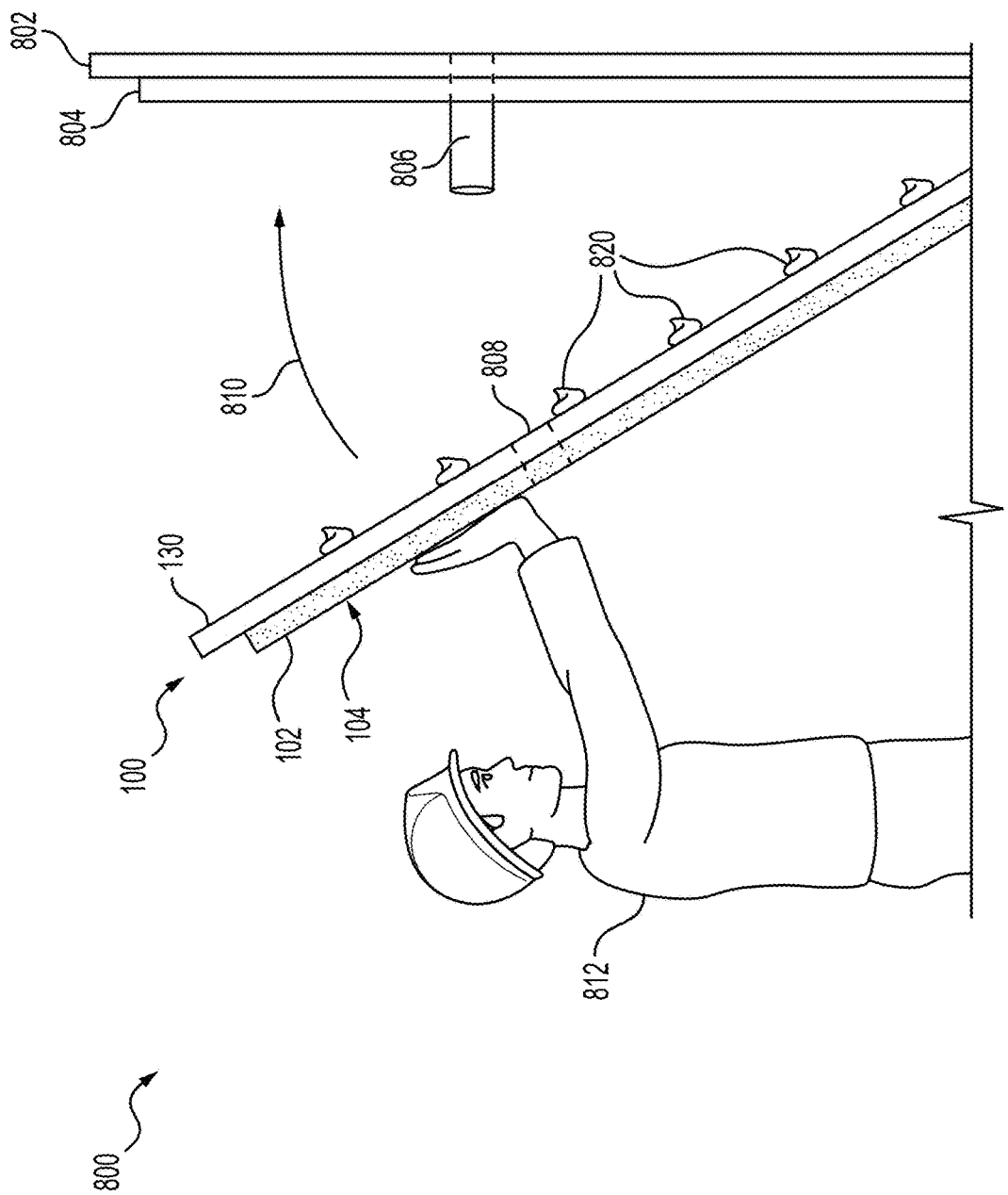
FIG. 8 is an exemplary installation of the reinforced porcelain panel product, to one embodiment of the present disclosure.
Figure 11:
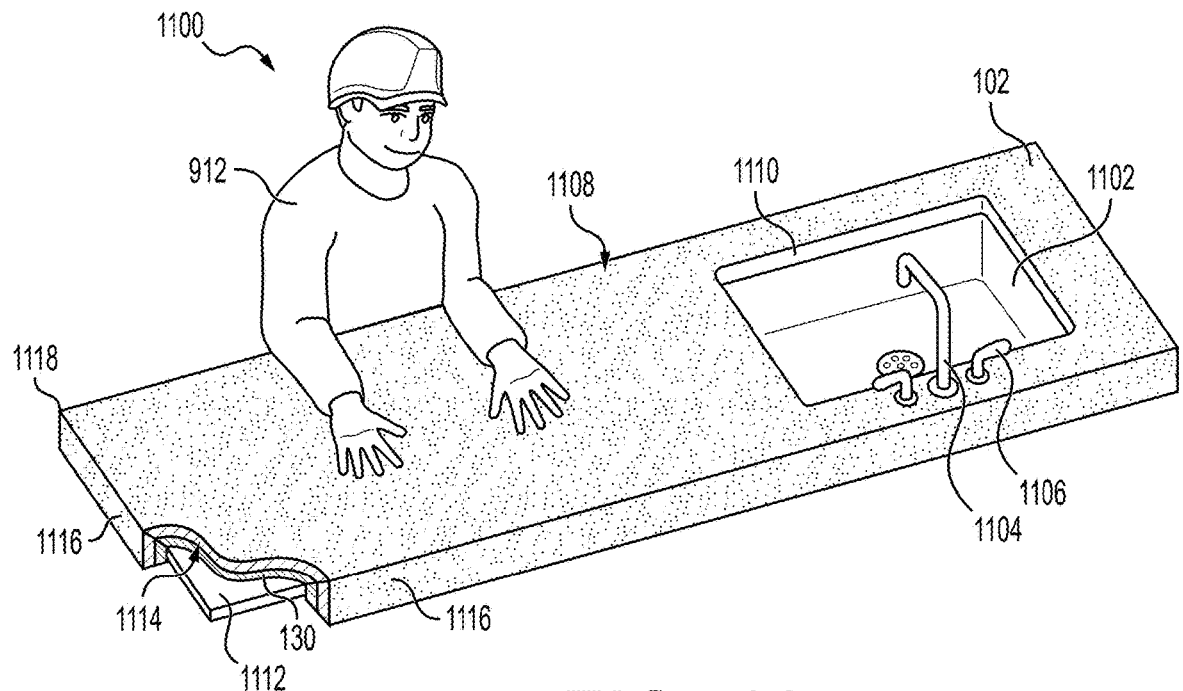
FIG. 11 is an exemplary installation of a countertop constructed from a reinforced porcelain panel product in a kitchen with a cutout showing the structural core board of the installed countertop, according to one embodiment of the present disclosure.
Figure 12:
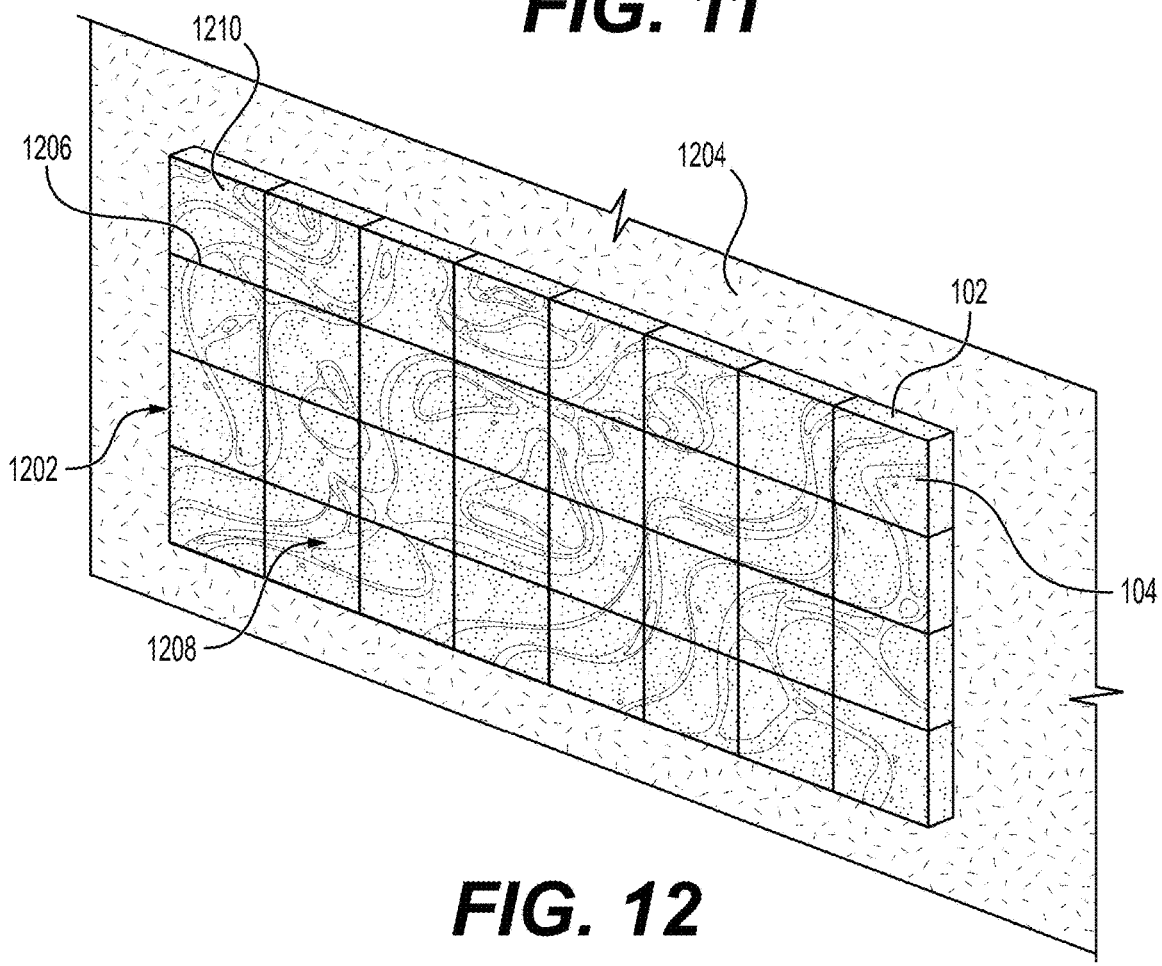
FIG. 12 is an exemplary installation of a tiled art piece displayed on a wall constructed from a reinforced porcelain panel product, according to one embodiment of the present disclosure.

FIG. 8 is an exemplary installation 800 of the reinforced porcelain panel product 100, according to one embodiment of the present disclosure. FIG. 8 illustrates a worker 812 leaning a reinforced porcelain panel product 100 into position against the wall 802 in a direction 810. In one embodiment, the wall 802 may be a studded wall, for example, a framed wall using studs. In one embodiment, as shown in FIG. 8, the wall 802 may have a gypsum panel 804, or drywall, positioned between an installed reinforced porcelain panel product 100 and the wall 802. In one embodiment, the reinforced porcelain panel product 100 may be a gypsum panel 804 substitute and thus a gypsum panel 804 is not necessary for installation. The reinforced porcelain panel product 100 advantageously does not require the usage of thinset mortar material, but rather uses construction adhesive to connect the wall 802 to the reinforced porcelain panel product 100. As will be further discussed below in FIG. 12, as the structural core board 130 is a panel not governed by a national tile counsel and therefore, the reinforced porcelain panel product 100 may be glued to the intended surface with dollops 820 of construction adhesive spaced about 8 inches to about 16 inches apart. Prior to installation, the worker 812 may skillfully remove a portion 808 from the porcelain slab 102 and the structural core board 130 to create a void space configured to fit a fixture 806, such as a plumbing tube therein, causing the fixture to protrude out from of the top surface 104 of the porcelain slab 102. In one embodiment, as would be understood by one skilled in the art, the fixture 806 may be a pipe configured to receive a finished fixture thereon after installation of the reinforced porcelain panel product 100 around or about the pipe. Furthermore, the worker 812 may trim, or remove, any excess structural core board 130 overhanging the desired dimensions of the porcelain slab 102 with a utility knife 712, or other similar cutting tool. In one embodiment, the structural core board 130 overhang is trimmed to abut against another structural core board 130 of a second reinforced porcelain panel product 100, thereby to define an intended grouting joint thickness while protecting both reinforced porcelain panel products 100 from colliding. In another embodiment, the reinforced porcelain panel product 100 may be advantageously shimmed into a level installation position using shims, as would be understood by one skilled in the art, thereby to enable an increased speed of installation. FIG. 8 installation 800 may provide for usage of thin large format porcelain for various installations, such as bathrooms (as shown in FIG. 9A-D), kitchens (as shown in FIG. 11), and/or commercial spaces, such as a hotel lobby (as shown in FIG. 12).

Figure 9A:
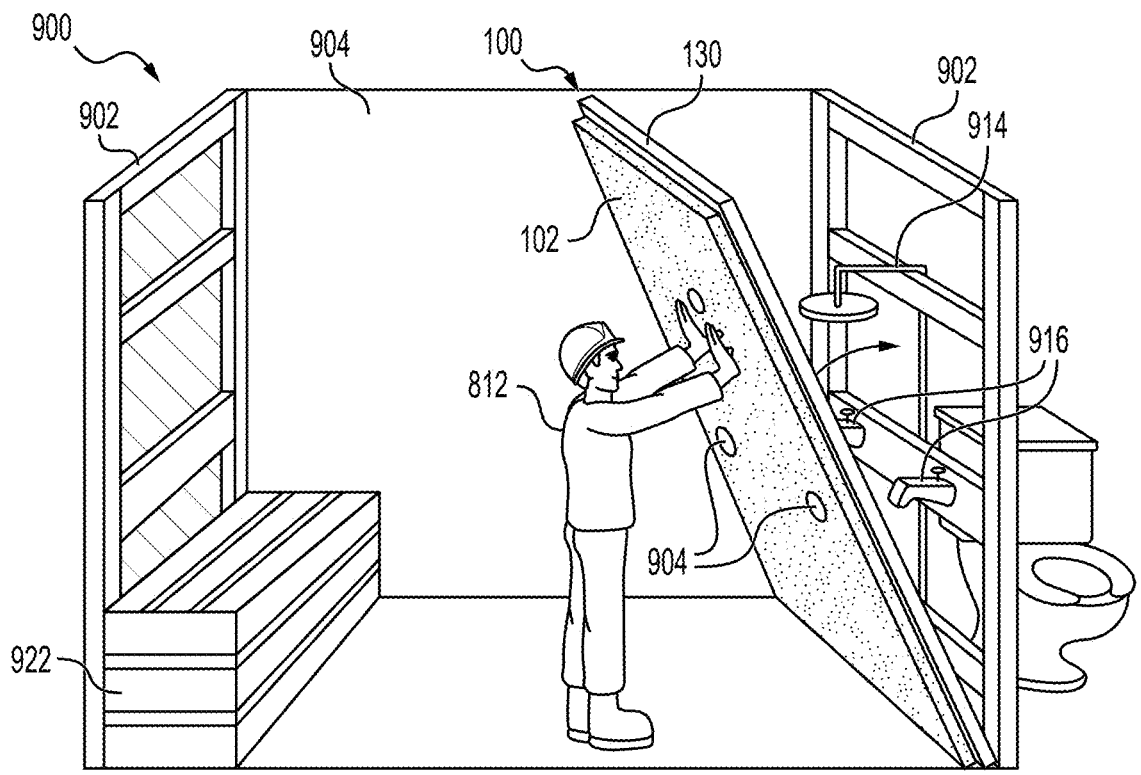
FIGS. 9A-D are exemplary installations of the reinforced porcelain panel product in a bathroom setting, according to various embodiments of the present disclosure.

FIGS. 9A-D are exemplary installations of the reinforced porcelain panel product in a bathroom setting, according to various embodiments of the present disclosure. FIG. 9A illustrates a worker 912 leaning a porcelain slab 102 to be installed onto the stud wall 902 having bathroom fixtures positioned thereon. As shown, the bathroom 900 includes a pair of stud walls 902, a gypsum paneled wall 904, bench 922 (unfinished), a floor 920, and bathroom fixtures. The bathroom fixtures include a shower head 914 and faucets 916. It is to be understood a variety of fixtures may be installed in a bathroom 900 which require a portion 908 removed from the reinforced porcelain panel product 100 to fit the reinforced porcelain panel product 100 onto the stud wall 902, for example. In one embodiment, the reinforced porcelain panel product 100 may be directly attached to the wall 902, or the wall 904, with adhesive. In one embodiment, the reinforced porcelain panel product 100 may abut a water proofing barrier (not shown), such as Redguard® or waterstop as would understood by one skilled in the art, positioned on a floor 920 and between the reinforced porcelain panel product 100, the stud wall 902, and the gypsum paneled wall 904 when installed. In one embodiment, the structural core board 130 of the reinforced porcelain panel product 100 may be coated with a waterproof coating to create a watertight enclosure when the reinforced porcelain panel product 100 is installed onto the wall 902, or wall 904. In one embodiment, the waterproof coating may be rolled, sprayed, or placed on the structural core board 130 with a large format roll of tape, or the like, as will be understood by those skilled in the art. In yet another embodiment, the waterproof coating may be rolled, sprayed, or placed on the wall 902 such that the reinforced porcelain panel product 100 is installed onto the wall 902 with the waterproof coating.

Figure 9B:
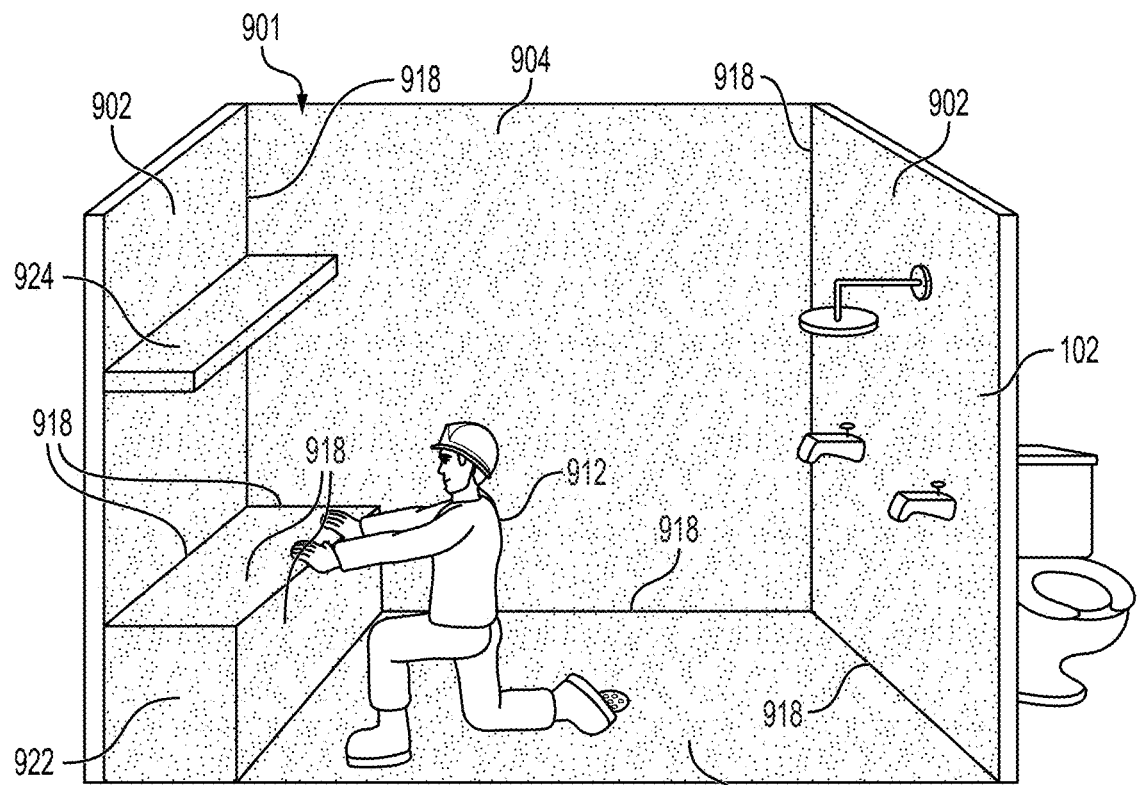

Generally, large panels of material are desired in bathroom settings as more wall coverage is available with the large panels. Therefore, thin large format porcelain is desirable for such applications due to a reduction of necessary grout, or caulking, compared to conventional tiling of the same walls and also due to the ability of porcelain to withstand wear and tear of showers when installed. For example, a finished shower room 901 using the thin large format porcelain, as shown in FIG. 9B, may use grout, or caulking, at the interfacing joints 918. The reduction of use of grout, or caulking, is advantageous as both, grout and caulking are prone to mold, crack, and/or fail causing water damage behind the stone, tile, or panel installed. The use of the reinforced porcelain panel product 100 may span the coverage each of the wall 902, the wall 904, the floor 920, the bench 922 (finished), and a shelf 924 (as shown in FIG. 9B) with a reduced usage of grout, or caulking, at the interfacing joints 918.

Previously, thin large format porcelain was limited to smaller panel sizes and unable to provide full coverage for shower walls as the thin large format porcelain was fragile to handle in large sizes. However, the implementation of the structural core board 130 onto the porcelain slab 102 has enabled the size of the reinforced porcelain panel product 100 to increase to provide larger panels previously unattainable by porcelain slabs 102 alone. Therefore, installation of the reinforced porcelain panel product 100, or 400, may be easier and quicker to install as larger panels provide greater coverage as compared to prior porcelain slabs, alternative stone, or tile solutions. For example, an installation may be increased by a reduction of preparation time, such as squaring off walls, and shimming the reinforced porcelain panel product 100 thereby to stabilize the material resulting in less damage to the porcelain, as would be understood by one skilled in the art. Furthermore, fewer materials may be required for installation further increasing the ease and speed of installation. For example, in one embodiment, the wall 902 may be finished with only the reinforced porcelain panel product 100 compared to the conventional method of installation that requires tiles attached, via thinset mortar, to a gypsum panel that is fastened to the wall and a waterproof barrier, or coating, positioned between the tile and the gypsum panel. Thus, the speed of installation of the reinforced porcelain panel product 100, as discussed, increases project completion efficiency, and also provides the owner less maintenance as less grout is used. In one example, the installation of a shower room 901 may be performed in less than about 24 hours, such as less than about 20 hours, such as less than about 15 hours, such as less than about 10 hours, such as less than about 5 hours, such as less than about 3 hours, such as about 3 hours.

Figure 9C:
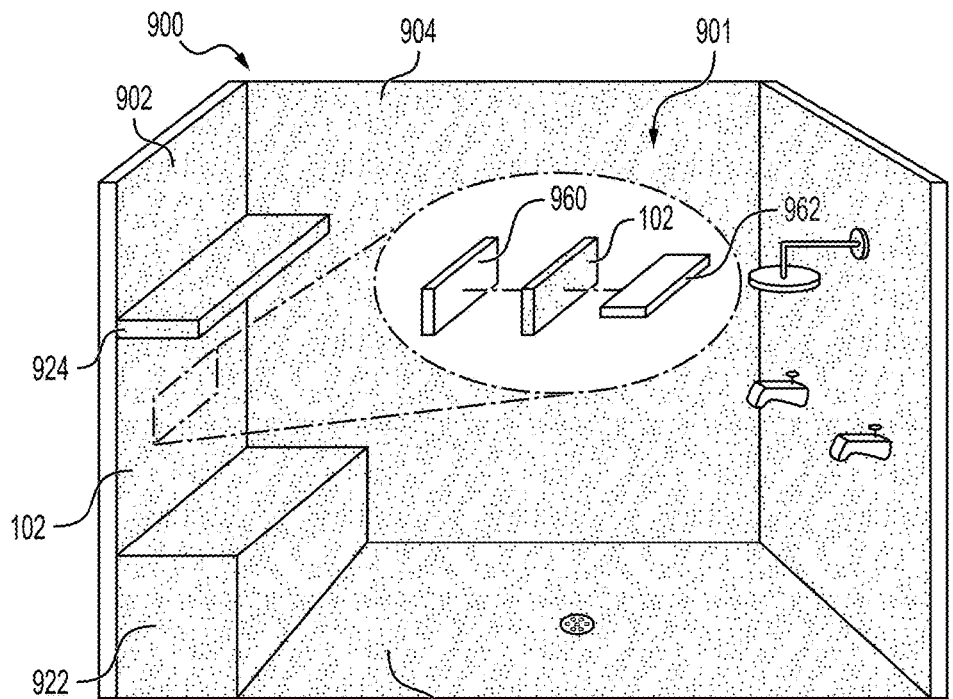

FIG. 9C illustrates one panel assembly embodiment for magnetic shower attachments through the reinforced porcelain panel product 100, according to one embodiment of the present disclosure. As discussed above, shower rooms 901 and fixtures may be adorned with a reinforced porcelain panel products 100, however, the use of grout, or caulking, may be necessary at the interfacing joints 918. Furthermore, conventional shower accessories may necessitate drilling into the porcelain slab 102 to secure the accessory to the wall 902, thereby to create a water infiltration site needing to be caulked to prevent water damage. One embodiment of the present disclosure takes advantage of the thin porcelain slabs 102 that allow attractive magnetic forces to position movable magnetic accessories on the top surface 104 of the porcelain slab 102, for example. For example, FIG. 9C illustrates a partially exploded view of wall 902 having a metal panel 960 positioned behind the porcelain slab 102 when installed. It is to be understood, the metal panel 960 may further be positioned between the porcelain slab 102 and the wall 904 when installed. In one embodiment, the metal panel 960 may be replaced with a magnet such as a permanent magnet. In one embodiment, the metal panel 960 may be a magnetic material, such as steel, or other magnetic material. In those embodiments, magnetic forces may attract magnetic shower accessories 962 through the porcelain slab 102. In one embodiment, the magnetic shower accessories 962 possess a magnet configured to be attracted to the metal panel 960. In another embodiment, the magnetic shower accessories 962 possess a magnetic material to attract to a magnet positioned behind the porcelain slab 102. In one embodiment, the metal panel 960 is a small panel positioned and installed in desired areas behind the installed reinforced porcelain panel product 100 and adhesively connected to the wall 902. In one embodiment, the metal panel 960 is thin and does not add a significant difference in thickness to the wall 902 during construction. It is also contemplated that a non-metallic sheet, equal in thickness to the metal panel 960, may be installed around the metal panel 960 such that the wall 902 is level. Fasteners, such as screws, clips, or the like, as will be understood by those skilled in the art, and adhesives, as discussed above, are contemplated methods of securing the metal panel 960 to the wall 902. In one embodiment, the metal panel 960 is large such that a significant portion of the wall 902 is magnetic, thereby to provide a large surface area to adjust the magnetic shower accessories 962 about the wall 902 and into a desired position to fit an individual's need, which may be due to height, weight, temporary disability, permanent disability, aesthetic preference, or other functional preference. The magnetic shower accessory 962 may be a shelf, a shower caddy, a footrest, a towel rack, a shower arm for a handheld shower hose, or the like shower accessories, as will be understood by those skilled in the art. In one embodiment, the porcelain slab 102, or the reinforced porcelain panel product 100, are attached to the metal panel 960 with adhesive, such as construction grade adhesive.

The magnetic shower attachments advantageously hide the metal panel 960 behind the porcelain slab 102 to discreetly provide functionality to the positioning of the magnetic shower accessories 962 while reducing the use of grout, or caulking, that challenges shower installations. While the magnetic shower attachments are illustrated connected and installed in a wall, other surfaces walls are contemplated, such as a ceiling or the floor 920. Therefore, it may be understood an assembly for positioning a movable magnetic accessory may include a magnetic panel affixed to a mounting surface and the reinforced porcelain panel product positioned to conceal the magnetic panel and having thickness less than the magnetic attractive force configured between a magnetic accessory attachment positioned on a top surface of the porcelain slab and the magnetic panel.

It is to be understood that the disclosure of the magnetic shower attachments as discussed in FIG. 9C may also utilize other materials such as granite, quartz, ceramic, concrete, limestone, vinyl, marble, laminate, glass, fiberglass, or the like, as will be understood by those skilled in the art, rather than the porcelain slab 102, or reinforced porcelain panel product 100, to finish the wall 902 as a cover panel configured to conceal the magnetic metal panel, for example. In another embodiment, the cover panel may conceal the magnet, such as a permanent magnet installed behind the cover panel for use with magnetic material-containing shower attachments. In some embodiments, the other materials, mentioned above, may or may not possess an equivalent structural core board, such as structural core board 130 used in the reinforced porcelain panel product 100. Furthermore, while the above disclosure of the magnetic attachments was made in reference to a shower embodiment, it is contemplated the discrete metal panel 960 may be used in other spaces such as, for example, shelving in water closets, on vanity walls, in living rooms, above fireplaces, and/or the like.

Figure 9D:
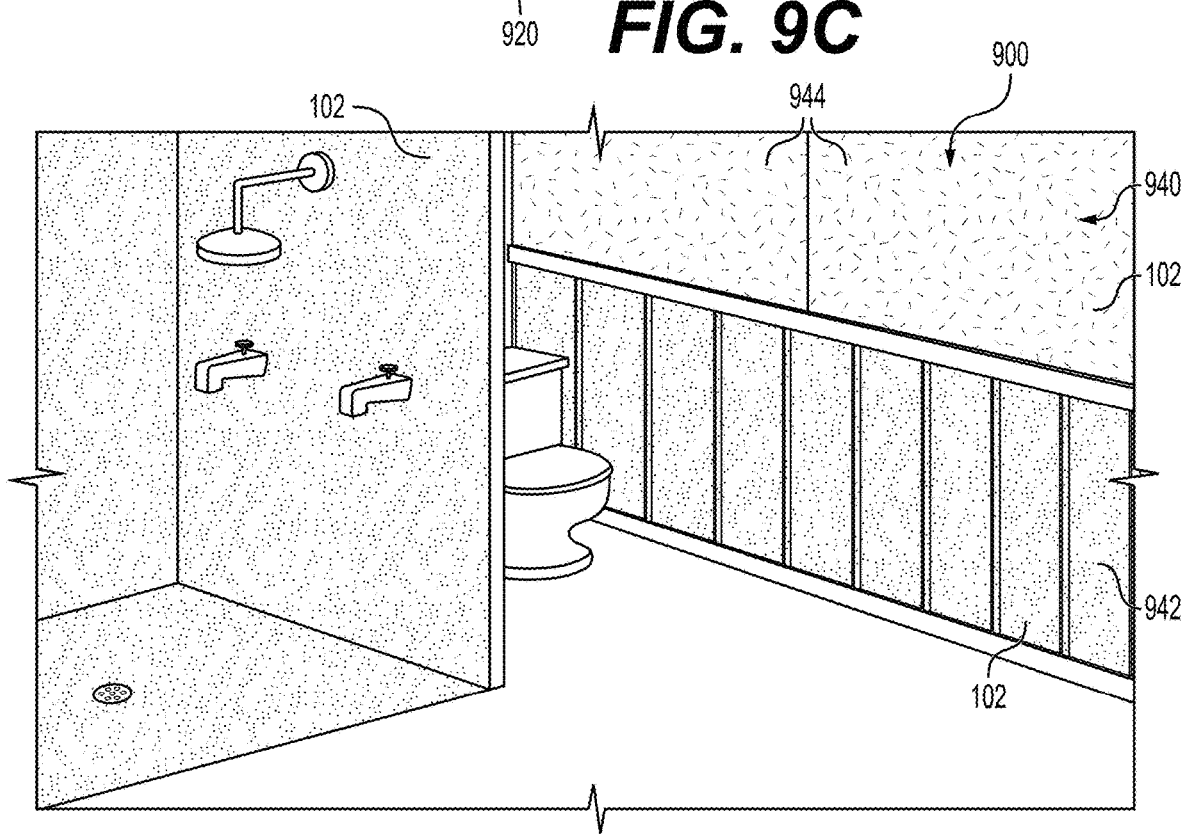

FIG. 9D illustrates one embodiment that uses reinforced porcelain panel product 100 as wall cladding 944 and a wainscoting 942 on wall 940. Wall cladding 944 may be panels of reinforced porcelain panel product 100 installed on the wall 940 that was previously, for example, tiled or finished, with only adhesive. In some embodiments, fasteners may also be used to attach the wall cladding 944. However, as briefly discussed above and further discussed below, the structural core board 130 is a panel not governed by a national tile counsel and therefore, the reinforced porcelain panel product 100 may be glued to the intended surface using only dollops 820 of construction adhesive, as shown in FIG. 8. In one embodiment, the wall cladding 944 is decorated to display an appealing design to add visual appeal to the bathroom 900, for example. Similarly, the wainscoting 942 may be designed with several aesthetic, or artistic, designs to appeal to the desires of the owner.

Figure 10:
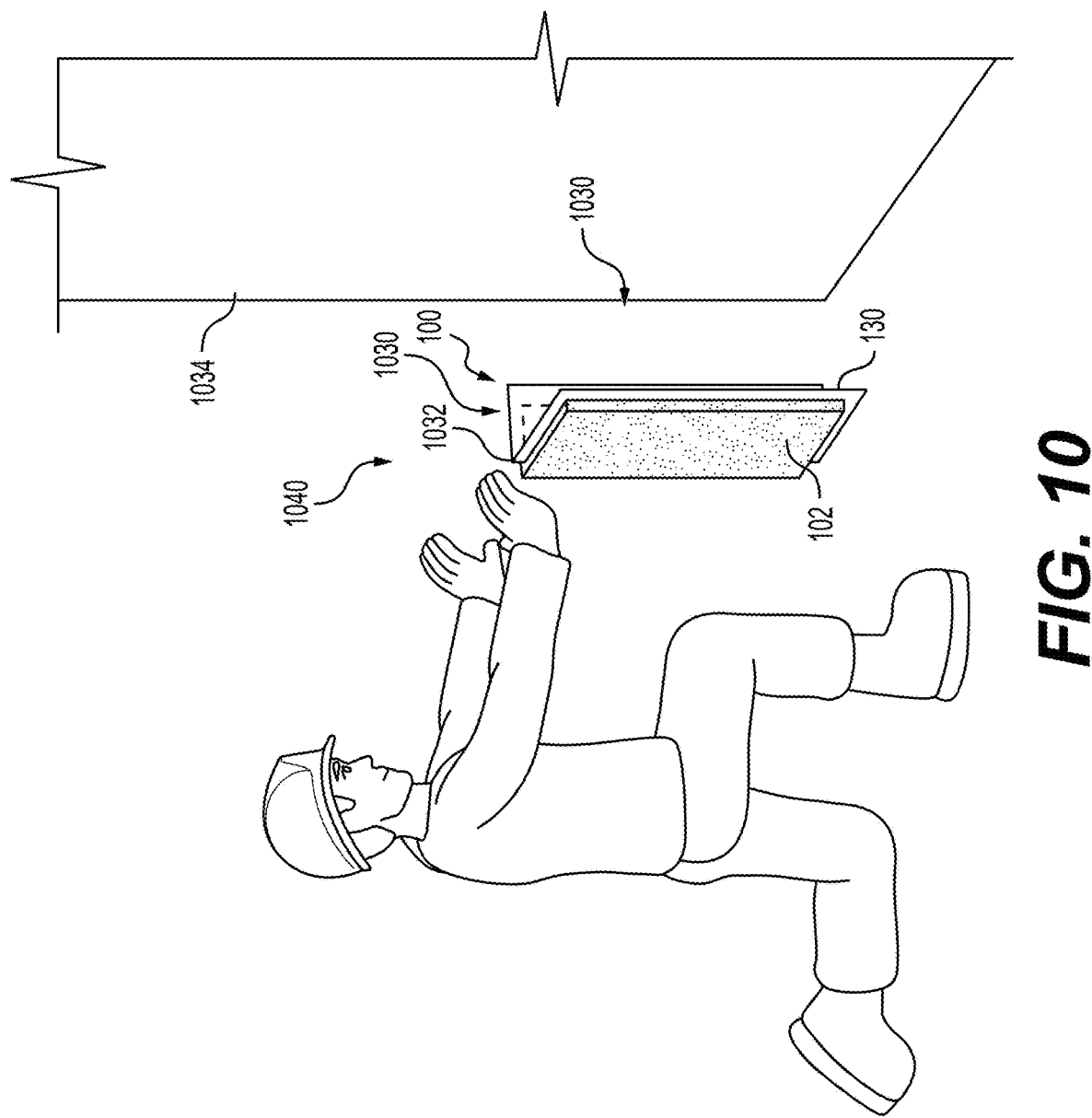
FIG. 10 is an exemplary installation of a trim piece constructed from a reinforced porcelain panel product, according to one embodiment of the present disclosure.

FIG. 10 is an exemplary installation of a trim piece 1040 constructed from a reinforced porcelain panel product 100, according to one embodiment of the present disclosure. The reinforced porcelain panel product 100 may be cut into narrow sections 1030 and adhesively attached on one end 1032 of each of the narrow sections 1030 of the reinforced porcelain panel product 100, thereby to define the trim piece 1040. In one embodiment, the trim piece 1040 may be configured to fit around a corner 1034 to provide a decorated corner 1034 using the trim piece 1040. In one embodiment, the trim piece 1040 may extend a distance of about 1 inch in each direction covering the corner 1034. In one embodiment, the trim piece 1040 may have the shape of a sharp corner or a rounded corner, although various shapes are contemplated. In one embodiment, the trim piece 1040 may abut to a reinforced porcelain panel product 100 installed on the wall having the corner 1034. As discussed above, porcelain may be manipulated to display a variety of patterns enabling an owner to create a unique design that appeals to the owner. Here, the trim piece 1040 may match the wall decoration or may provide a varied pattern for an accented piece on the corner 1034. Furthermore, in one embodiment, the trim piece 1040 may have the structural core board 130 removed for installation such that no overhang is present when installing the trim piece 1040.

FIG. 11 is an exemplary installation of a countertop 1108 constructed from a reinforced porcelain panel product 100 in a kitchen 1100 with a cutaway 1114 showing the structural core board 130 of the installed countertop 1108, according to one embodiment of the present disclosure. As illustrated, the worker 912 may position reinforced porcelain panel product 100 onto a countertop support 1112 to construct the countertop 1108. In one embodiment, the countertop 1108 may have a cutout 1110 to accommodate a kitchen sink 1102 and may further have other cutouts to position a faucet spout 1104 and faucet handles 1106 near the kitchen sink 1102. The countertop 1108 may be secured with fasteners or adhesive to the countertop support 1112. Furthermore, as illustrated, the countertop 1108 may be finished with a trim 1116, for example, a trim piece 1040 further customized for an edge of a countertop 1108. As shown, the trim 1116 may be a portion of a reinforced porcelain panel product 100 cut at, for example, a 45-degree angle and to mate with a 45-degree angle cut on the countertop 1108. The two 45-degree angles may be joined by porcelain-compliant adhesive, or the like, as would be understood by one skilled in the art. Similarly, the trim 1116 may be joined with the adjacent trim 1116 such that both trims come to an edge that further aligns with the countertop 1108 to construct a point 1118. While the above cuts are referenced to have 45-degree angles, the cuts may be made with various angles common in the countertop industry. The structural core board 130 advantageously supports both the adjacent structural core board 130 and the porcelain slab 102 of both the countertop 1108 and the trim 1116, thereby providing an added strength to the joint between the two trim 1116 and the countertop 1108, such as at the point 1118.

FIG. 12 is an exemplary installation of a tiled art piece 1202 displayed on a display wall 1204 constructed from a reinforced porcelain panel product 100, according to one embodiment of the present disclosure. As discussed above, a pattern may be designed on an intact reinforced porcelain panel product 100 at a fabrication location. As illustrated, the pattern 1208 is represented as a natural stone vein pattern across the top surface 104 of the porcelain slab 102 for display on the display wall 1204. A stone mason (not shown) may utilize a cutting operation, as discussed in FIG. 7A-C, to create individual smaller panels, or tiles 1210 divided by tile lines 1206, that may allow for easier shipping and easier installation as compared to installing a large intact reinforced porcelain panel product 100. In one embodiment, the tiles 1210 may be labeled with an identifier, such as an alpha or numeric identifier, which allows the tiles 1210 to be placed in a particular order when installed to create the originally intended layout or aesthetic design created at, for example, a fabrication location. Furthermore, as discussed above, the reinforced porcelain panel product 100 may weigh significantly less than other stone or ceramic alternatives and therefore may cause less stress, and/or damage to mounting surfaces, such as a display wall 1204. For additional perspective, the tiled art piece 1202 may be placed in a commercial space, such as a hotel lobby.

Traditionally, conventional tiles (not shown) are installed onto cement, concrete, or the like hard surfaces, as will be understood by those skilled in the art, with an adhesive mortar, such as a thinset mortar. Thinset mortar, commonly referred to as thinset cement, dryset mortar, or drybond mortar by those skilled in the art, is an adhesive mortar made of cement, fine sand, and a water-retaining agent such as an alkyl derivative of cellulose to bond two hard surfaces together, such as a ceramic tile to a hard surfaced wall. The installation of conventional tiles (not shown) is directed by policies set forth by the Tile Council of North America (TCNA), a trade organization, which requires the use of thinset mortar for installation of tile, including conventional porcelain. The use of thinset mortar may be problematic as voids, or cavities, between the installed material and the wall may be prone to breaking as the void is unsupported by the thinset mortar leading to future repairs. However, the use of the reinforced porcelain panel product 100 may not require the use of thinset mortar as the structural core board 130 is the adhesive surface, rather than the porcelain slab 102 which required thinset mortar. Therefore, as the reinforced porcelain panel products 100 are lighter than other stone alternatives and cause less stress, and/or damage, to the mounting wall, an adhesive, such as a construction grade adhesive, may be used to secure the tiled art piece 1202 onto the display wall 1204, thereby to reduce the amount of clean up from thinset derived dust or splatter, offsetting any additional costs of materials, such as the cost of thinset mortar and adhesive, and increase the speed of installation to thereby increase project efficiency.

Figure 13A:
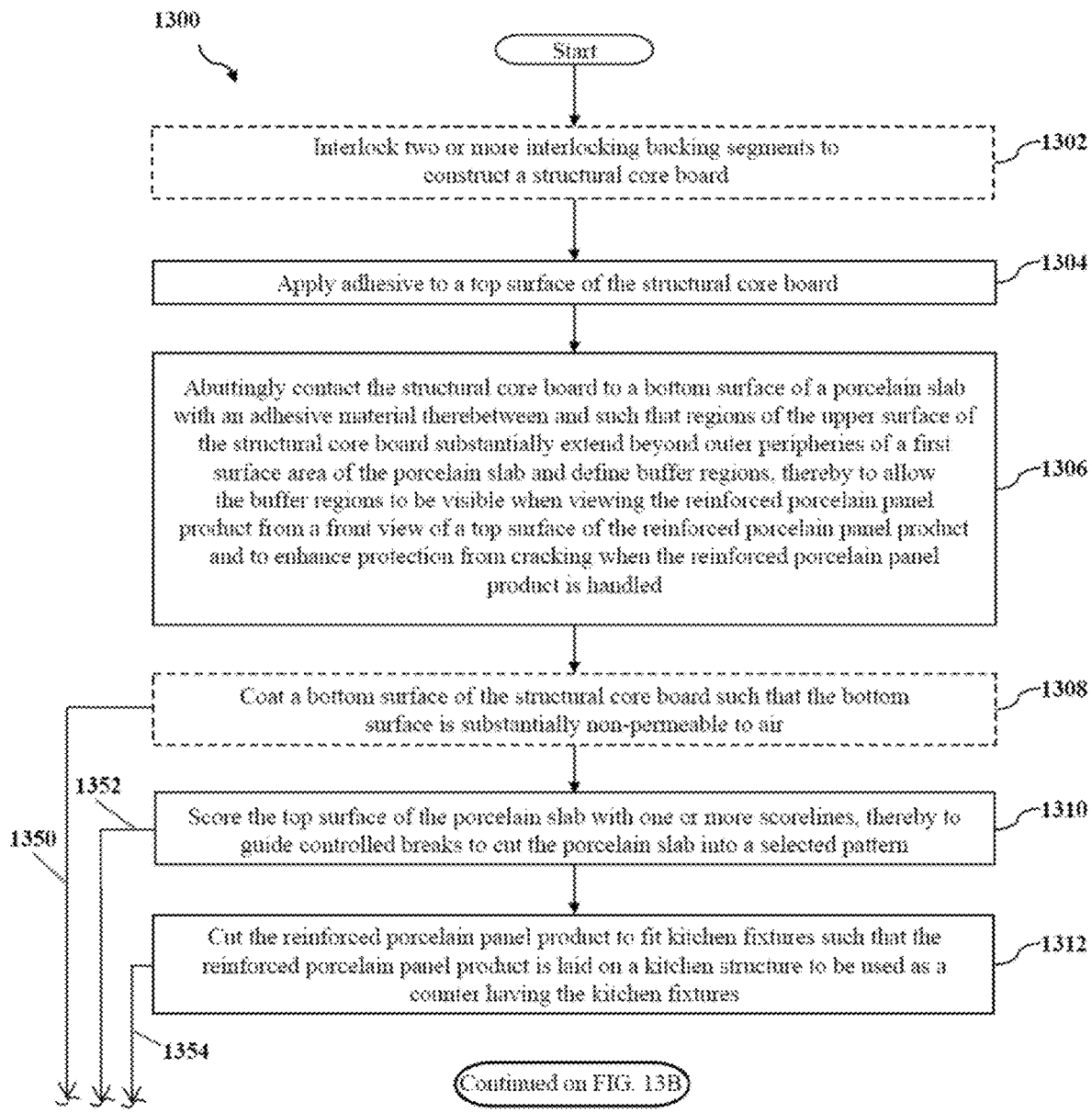
FIGS. 13A and 13B are a flow chart of a method of fabricating a reinforced porcelain panel product for commercial or residential renovations or new constructions, according to one embodiment of the present disclosure.
Figure 13B:
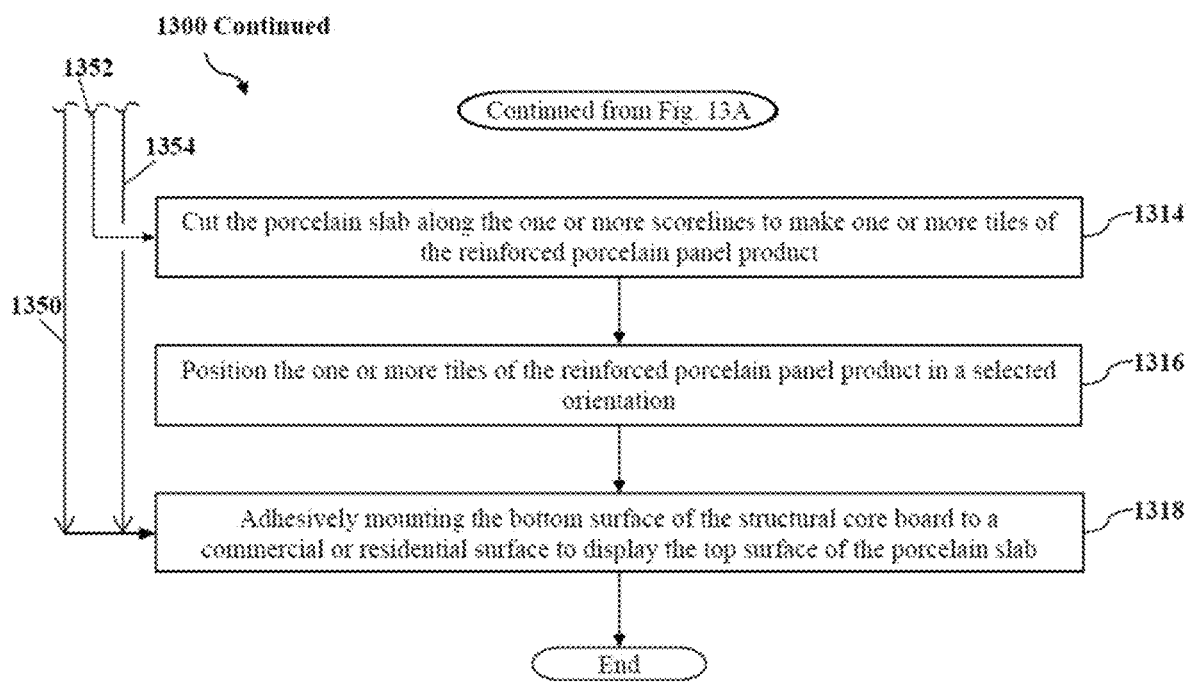

FIGS. 13A and 13B contain a flow chart of a method 1300 of fabricating a reinforced porcelain panel product 100 for commercial or residential renovations or new constructions, according to one embodiment of the present disclosure. Method 1300 includes blocks 1302, 1304, 1306, 1308, 1310, 1312, 1314, 1316, and 1318. While the operations are illustrated sequentially, some of the operations may be excluded to achieve owner designs. As discussed above, the embodiments of the reinforced porcelain panel product 100 equally apply to the method discussed below.

Method 1300 begins with optional block 1302 by, for example, interlocking two or more interlocking backing segments to construct a structural core board. As discussed above in FIG. 4, the structural core board 130 may be constructed to a single structural core board by use of various interlocking backing segments that utilize, for example an overlay joint, such as a finger, shiplap, or a dovetail joint, among other types of overlay joints, configured to join or fasten the interlocking backing segments 430a-430c together.

Method 1300 continues to block 1304 by applying an adhesive material 250 to foam-core backing material, such as structural core board 130. The adhesive material 250 may be applied by use of an aerosol adhesive tool, a roller, an applicator, and spread using a spreading tool, or the like, as would be understood by one skilled in the art.

At block 1306, a worker may continue method 1300 by abuttingly contacting the structural core board 130 to a bottom surface 106 of a porcelain slab 102 with an adhesive material 250 therebetween such that regions of the top surface 134 of the structural core board 130 substantially extend beyond outer peripheries of a first surface area 108 of the porcelain slab 102 to define buffer regions 260 so that a combination of the porcelain slab 102 and the structural core board 130 define the reinforced porcelain panel product 100, thereby to allow the buffer regions 260 to be visible when viewing the reinforced porcelain panel product 100 from a front view of a top surface 104 of the reinforced porcelain panel product 100, as shown in FIG. 2B, and to enhance protection from cracking when the reinforced porcelain panel product is handled. Similarly, at block 1306, a worker may utilize another embodiment of the reinforced porcelain panel product 100, such as illustrated in FIGS. 2C, 4B, 6C, 7D and 7E, wherein the structural core board 130 and the porcelain slab 102 are flush aligned. Stated differently, a worker, at block 1306, may continue method 1300 by abuttingly contacting the structural core board 130 to a bottom surface 106 of a porcelain slab 102 with an adhesive material 250 therebetween such that regions of the upper surface 134 of the structural core board 130 substantially align with outer peripheries of a first surface area 108 of the porcelain slab 102, thereby to enhance protection from cracking when the reinforced porcelain panel product is handled. In one embodiment, the bottom surface 136 of the structural core board 130 has a first surface plane substantially parallel to the top surface 104 of the porcelain slab 102 such that the reinforced porcelain panel product 100 is rectangular. In one embodiment, the bottom surface 136 of the structural core board 130 is configured to adhesively attach to a mounting surface such as a wall, as shown in FIGS. 8-12. In one embodiment, the structural core board 130 has a second surface area 138 greater than the first surface area 108 of the porcelain slab 102 and has a thickness 240 greater than the porcelain slab 102. As discussed above, the porcelain slab 102 integrated within the reinforced porcelain panel product 100 may be manipulated to incorporate a variety of designs, patterns, or the like, as will be understood by those skilled in the art, to create an aesthetic décor for the owner of the commercial, or residential, space, such as adhesively attaching trims to construct a wainscoting, as discussed above.

Method 1300 may continue at optional block 1308 where the bottom surface 136 of the reinforced porcelain panel product 100 may be coated such that the bottom surface 136 is substantially non-permeable to air and thereby to allow the use of a vacuum lifting tool to move the reinforced porcelain panel product 100. In one embodiment, the structural core board 130 has a coating that is substantially waterproof. The waterproof coating is advantageous in embodiments that are installed in wet areas, such as shower enclosure floor where waterproofing is a desirable characteristic to reduce water damage from lack of water containment, as would be understood by one skilled in the art. The vacuum lifting tool may be an air-driven table, or "air table", able to sufficiently lift the weight of the reinforced porcelain panel product 100 to aid a worker in the movement and/or positioning of the reinforced porcelain panel product 100. In another embodiment, the vacuum lifting tool may a vacuum table that provides suction configured to restrain the reinforced porcelain panel product 100 from movement and/or positioning of the reinforced porcelain panel product 100 while the reinforced porcelain panel product 100 is being processed, such as decorated, scored, or cut.

The method 1300 may pursue various pathways, such as pathways 1350, 1352, and/or 1354. For example, pathway 1350 may be utilized for shower enclosures as discussed above in FIGS. 8 and 9A-9D. In another example, pathway 1352 may be utilized for a tile 1210 embodiment, or a trim piece 1040 embodiment, produced from the reinforced porcelain panel product 100 as discussed above in FIGS. 10 and 12. In yet another example, pathway 1354 may be utilized for a kitchen counter embodiment as discussed above in FIG. 11. Each of the pathways 1350, 1352, and/or 1354 may conclude the method 1300 at block 1318.

At block 1310, a worker, or stone mason, may score the reinforced porcelain panel product 100 such as, in one embodiment, scoring the top surface 104 of the porcelain slab 102 with one or more scorelines 706 positioned along one or more selected locations across the top surface 104. The scorelines 706 provide guided and controlled breaks to snap 720 the porcelain slab 102 into a selected pattern when a radial force is exerted on or near the scoreline 706.

At block 1312, a worker, or stone mason, may cut the reinforced porcelain panel product 100 configured to fit kitchen fixtures therein such that the reinforced porcelain panel product 100 is laid on a kitchen counter support structure to be used as a kitchen counter as discussed in FIG. 11. The worker, or stone mason may utilize cutting techniques described in FIGS. 7A-D and/or may use tools to perform porcelain cuts, such as water jet, an angle grinder, or the like, as would be understood by one skilled in the art.

At block 1314, a worker, or stone mason, may cut the reinforced porcelain panel product 100 by using, for example, cutting techniques described in FIGS. 7A-D to cut the reinforced porcelain panel product 100 into various sized or shaped tiles as discussed above in FIG. 12.

At block 1316, the cut tiles from the reinforced porcelain panel product 100 may be positioned in a selected, or desired, orientation such that the reinforced porcelain panel product 100 may be reassembled in the selected orientation desired pattern at a second location for installation as discussed above in FIG. 12. Stated differently, the cut tiles from the reinforced porcelain panel product 100 of block 1314 may be positioned in a selected orientation and may further be marked in such a way that enable a tile installer to reconstruct the intended design, i.e., the selected orientation.

The various embodiments of method 1300 may conclude at block 1318 where the bottom surface 136 of, for example, the kitchen counter, the trim pieces or tiles, or the shower enclosure panels using reinforced porcelain panel product 100 containing an embodiment of the structural core board 130, are adhesively mounted to the commercial or residential surface, such as display wall 1204 shown in FIG. 12, to display the top surface 104 of the porcelain slab 102. As discussed above, the bottom surface 136 of the structural core board 130, and thus the reinforced porcelain panel product 100, may be attached to the desired mounting surface with adhesive, such as construction grade adhesive.

Figure 14:
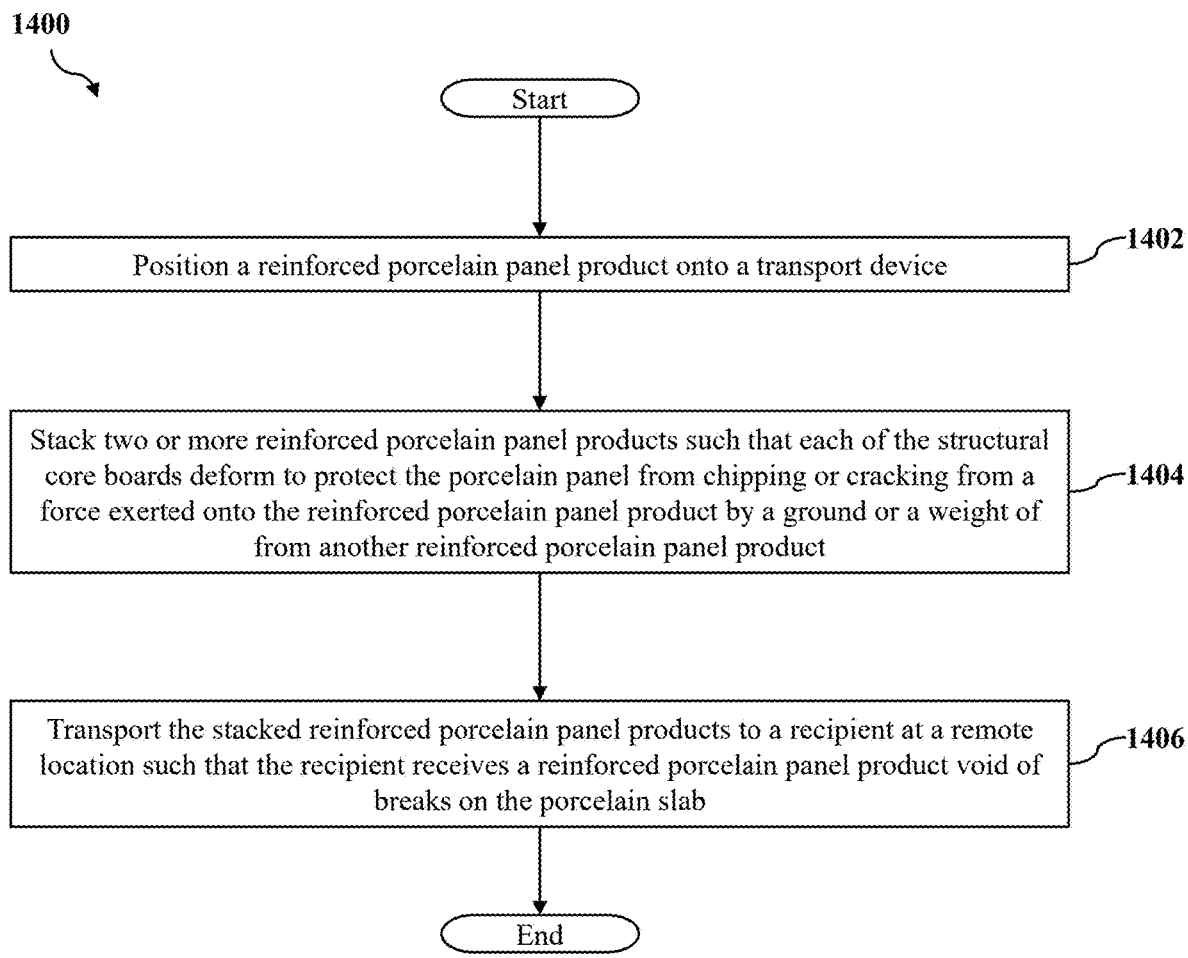
FIG. 14 is a flow chart of a method of transporting and using a reinforced porcelain panel product, according to one embodiment of the present disclosure.

FIG. 14 is a flow chart of a method 1400 of transporting a reinforced porcelain panel product 100, according to one embodiment of the present disclosure. Method 1400 includes blocks 1402, 1404, and 1406. While the operations are illustrated sequentially, some of the operations may be excluded to achieve owner designs. As discussed above, the embodiments of the reinforced porcelain panel product 100 equally apply to the method discussed below.

Method 1400 begins at block 1402 by positioning a reinforced porcelain panel product 100, defined above, onto a transport device, such as, but not limited to, a pallet 602, a freight shipping 610, a crate 630, a forklift, or an a-frame crate, as shown and discussed in FIGS. 6B and 6D.

The method 1400 may continue at block 1404 with stacking two or more reinforced porcelain panel products 100 such that each of the structural core boards 130 deform to protect the porcelain slab 102 from chipping or cracking from a force exerted onto the reinforced porcelain panel product 100 by a ground or a weight of from another reinforced porcelain panel product 100 stacked thereon. As discussed in FIGS. 6A-6D, the structural core boards 130 deforms to advantageously reduce the breakage, chipping, and/or cracking of the porcelain slab 102 as compared to conventional unsupported porcelain.

The method 1400 continues to a remote location, such as a second location different than the first location, at block 1406, by transporting the reinforced porcelain panel product 100 to a recipient at a remote location such that the recipient receives the reinforced porcelain panel product 100 void, or absent, of breaks on the porcelain slab 102. In one embodiment, the fabricated reinforced porcelain panel product 100 may be in one or more reinforced porcelain panel product sections, such discussed in the cutting embodiment of the reinforced porcelain panel product 100 above.

Figure 15:
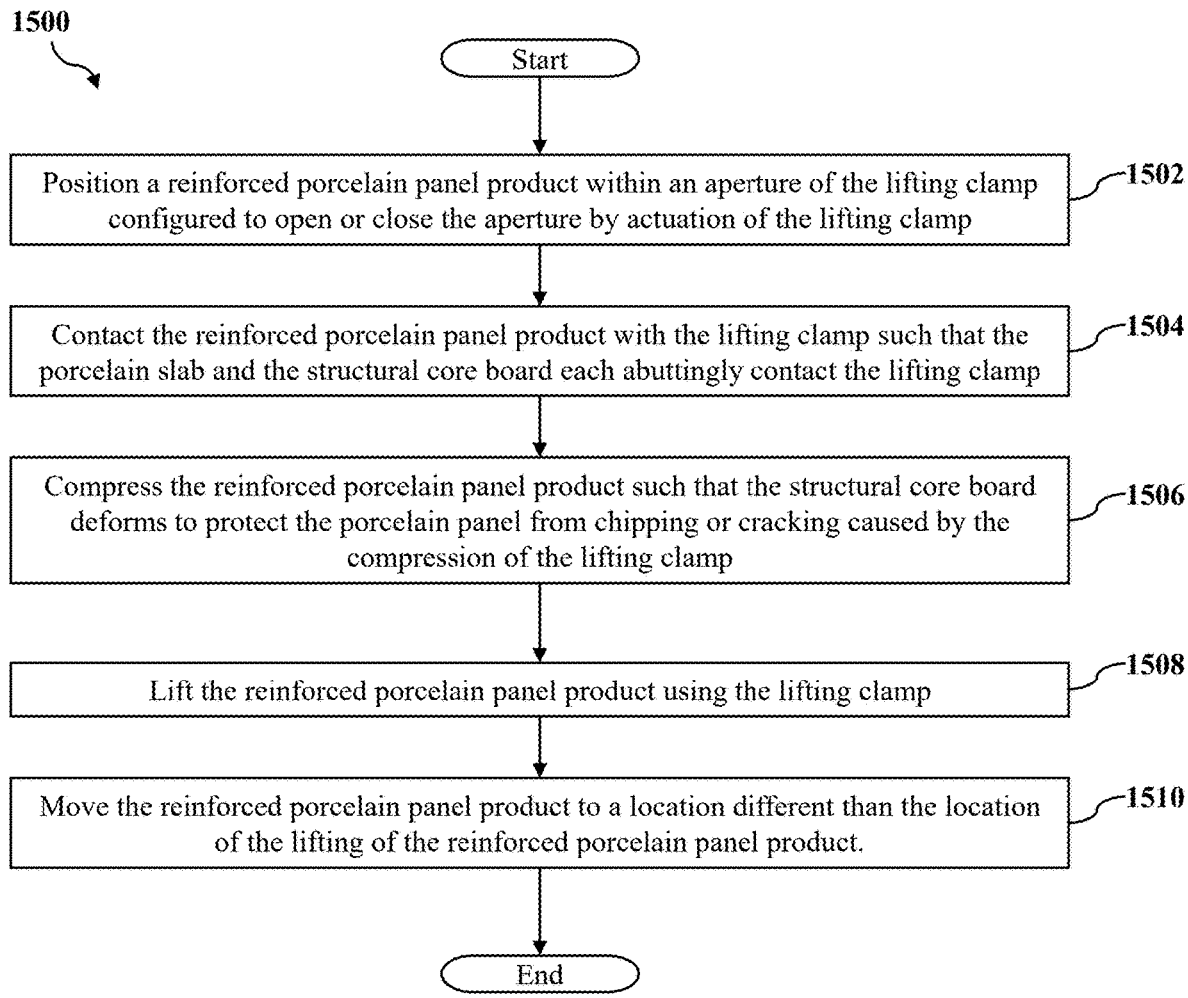
FIG. 15 is a flow chart of a method for lifting a reinforced porcelain panel product using a lifting clamp, according to one embodiment of the present disclosure.

FIG. 15 is a flow chart of a method for lifting a reinforced porcelain panel product using a lifting clamp, according to one embodiment of the present disclosure. Method 1500 includes blocks 1502, 1504, 1506, 1508, and 1510. While the operations are illustrated sequentially, some of the operations may be excluded to achieve owner designs. As discussed above, the embodiments of the reinforced porcelain panel product 100 equally apply to the method discussed below.

Method 1500 begins at block 1502 by positioning a reinforced porcelain panel product 100, discussed above, within an interstitial space 550 of the lifting clamp 502 configured to open or close the interstitial space 550 by actuation of the lifting clamp 502. As discussed above in FIGS. 6A-6D, the conventional fabrication shops may use heavy equipment, such as the lifting clamp 502, to lift heavy panels that may not be sufficiently delicate to handle and carry thin panels, such as an unsupported porcelain slab. However, by use of the present disclosure of a reinforced porcelain panel product 100, the deformation of the structural core board 130 provides protection against breakage, chipping, and/or cracking of the porcelain slab 102 when using a lifting clamp 502, as discussed in FIGS. 5A and 5B.

The method 1500 may continue at block 1504 with contacting the reinforced porcelain panel product 100 with the lifting clamp 502 such that the porcelain slab 102 and the structural core board 130 each abuttingly contact the movable jaws 552 of the lifting clamp 502. The movable jaws 552 of the lifting clamp may be actuated to close the interstitial space 550, thereby to contact the reinforced porcelain panel product 100 via the porcelain slab 102 and the structural core board 130, respectively.

The method 1500 continues at block 1506 by compressing the reinforced porcelain panel product 100 such that the structural core board 130 deforms to protect the porcelain slab 102 from chipping or cracking caused by the compression of the movable jaws 552 of the lifting clamp 502. In one embodiment, the compression of the movable jaws 552 of the lifting clamp 502 may exert a force that would fracture or crush conventional unsupported porcelain. In examples where the conventional unsupported porcelain was able to withstand the compression of the lifting clamp 502, the porcelain often broke upon a lifting of the lifting clamp 502 with the porcelain held within. However, the structural core board 130 of the present disclosure advantageously provides protection against breakage, chipping, and/or cracking of the porcelain slab 102 when using a lifting clamp 502. As illustrated in FIG. 5B, the deformation of the structural core board 130 provides 1) grip for the lifting clamp, and 2) an ability to withstand the compression of the movable jaws 552 of the lifting clamp 502 to enable the lift.

The method 1500 continues at block 1508 by lifting the reinforced porcelain panel product using the lifting clamp to elevate the reinforced porcelain panel product 100 from, for example, the ground, or crate, as discussed in FIGS. 6A-6D.

The method 1500 may conclude at block 1510 by moving the reinforced porcelain panel product 100 to a location different than the location of the lifting of the reinforced porcelain panel product 100 without breakage, chipping, and/or cracking of the porcelain slab 102.

Figure 16A:
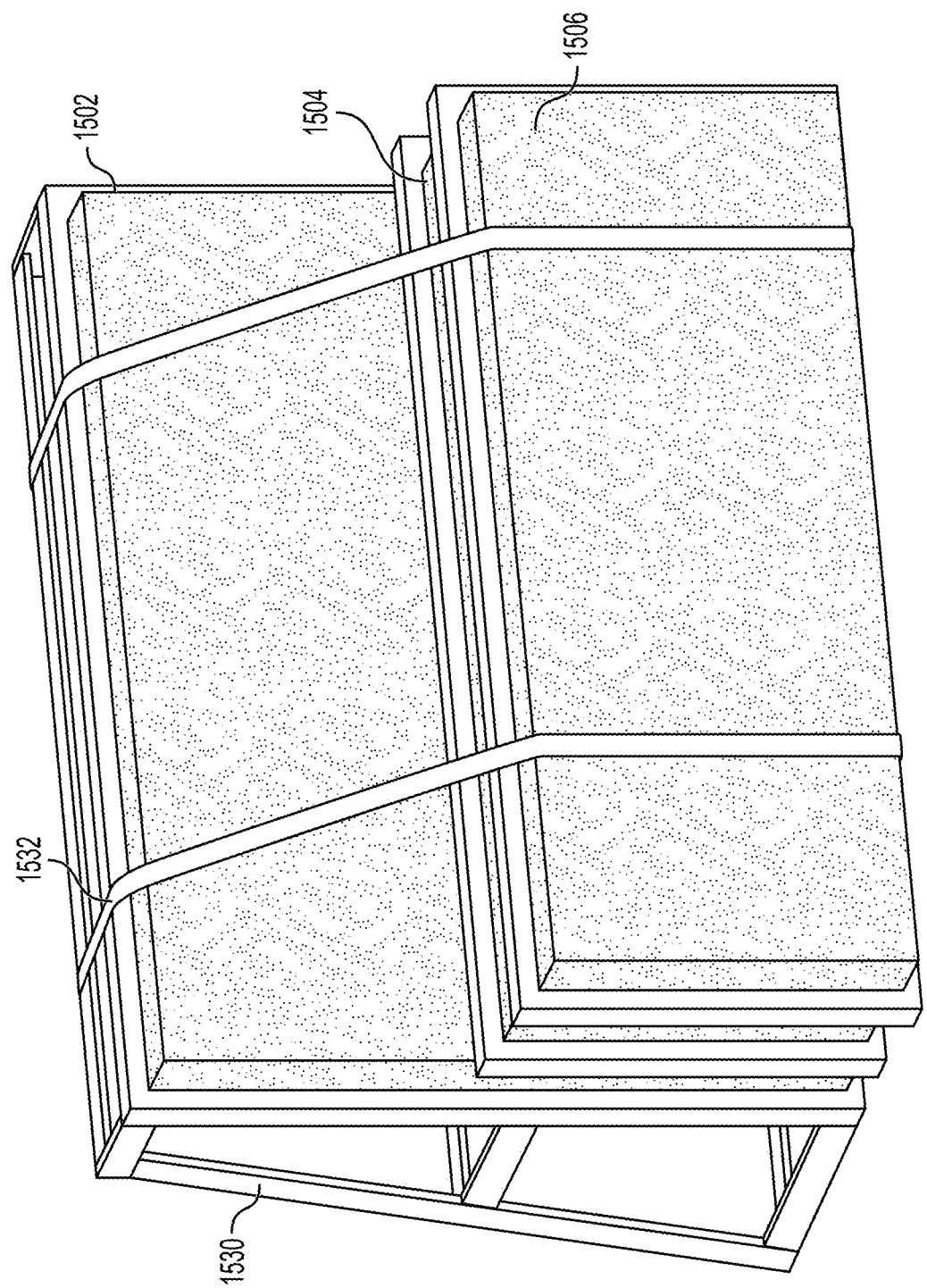

FIGS. 16A and 16B are perspective views of a reinforced porcelain panel product kit, according to two embodiments of the disclosure. In all embodiments, the reinforced porcelain panel product kit 1600 includes a container 1630, or a support member. The container 1630 may be a wooden or plastic box, a crate, a pallet, an a-frame crate, or the like, wherein the container 1630 is configured to house, support, or keep the components within the reinforced porcelain panel product kit 1600 together or in a specific position, to define a shipping package, as would be understood by those skilled in the art. In one embodiment, the container 1630 has a locking feature or a tamper-resistant feature to reduce unauthorized or inadvertent opening of the container 1630. In another embodiment, the container 1630 has straps 1632 configured to position or restrain the contents of the reinforced porcelain panel product kit 1600 from moving for transport.

FIG. 16A illustrates an embodiment of a reinforced porcelain panel product kit 1600 for a shower enclosure that includes three porcelain slabs 1602, 1604, and 1606 positioned within the container 1630. As illustrated, the three porcelain slabs 1602, 1604, and 1606 are positioned in the boundaries of a shipping package. The three porcelain slabs 1602, 1604, and 1606 are panels specifically sized to accommodate the three most common shower enclosure sizes, as would be understood by one skilled in the art. In some embodiments, the reinforced porcelain panel product kit 1600 includes two porcelain slabs of substantially similar size and one porcelain slab that is larger than the two smaller porcelain slabs. In other embodiments, the reinforced porcelain panel product kit 1600 includes two porcelain slabs of substantially similar length and one porcelain slab that has a length longer than the two porcelain slabs. In yet another embodiment, the reinforced porcelain panel product kit 1600 includes two porcelain slabs of substantially similar width and one porcelain slab that has a width longer than the two porcelain slabs. For example, in one embodiment, the reinforced porcelain panel product kit 1600 includes three porcelain slabs 1602, 1604, and 1606, wherein 1) the porcelain slab 1602 is about 60 inches by about 74 inches, and 2) the porcelain slabs 1604 and 1606 are each about 31 inches by about 74 inches. In another embodiment, the reinforced porcelain panel product kit 1600 includes three porcelain slabs 1602, 1604, and 1606, wherein 1) the porcelain slab 1602 is about 60 inches by about 96 inches, and 2) the porcelain slabs 1604 and 1606 are each about 31 inches by about 96 inches. In still another embodiment, the reinforced porcelain panel product kit 1600 includes three porcelain slabs 1602, 1604, and 1606, wherein 1) the porcelain slab 1602 is about 60 inches by about 106 inches, and 2) the porcelain slabs 1604 and 1606 are each about 31 inches by about 106 inches.

FIG. 16B illustrates an embodiment of the reinforced porcelain panel product kit 1600 wherein the kit is provided by a support member, such as a pallet. In one embodiment, the reinforced porcelain panel product kit 1600 is provided in a plurality of pallets, as illustrated. In yet another embodiment, the reinforced porcelain panel product kit 1600 is provided on single pallet. In still another embodiment, each porcelain slab may be provided on individual pallets, thereby to delicately transport fragile porcelain slabs.

Figure 16C:
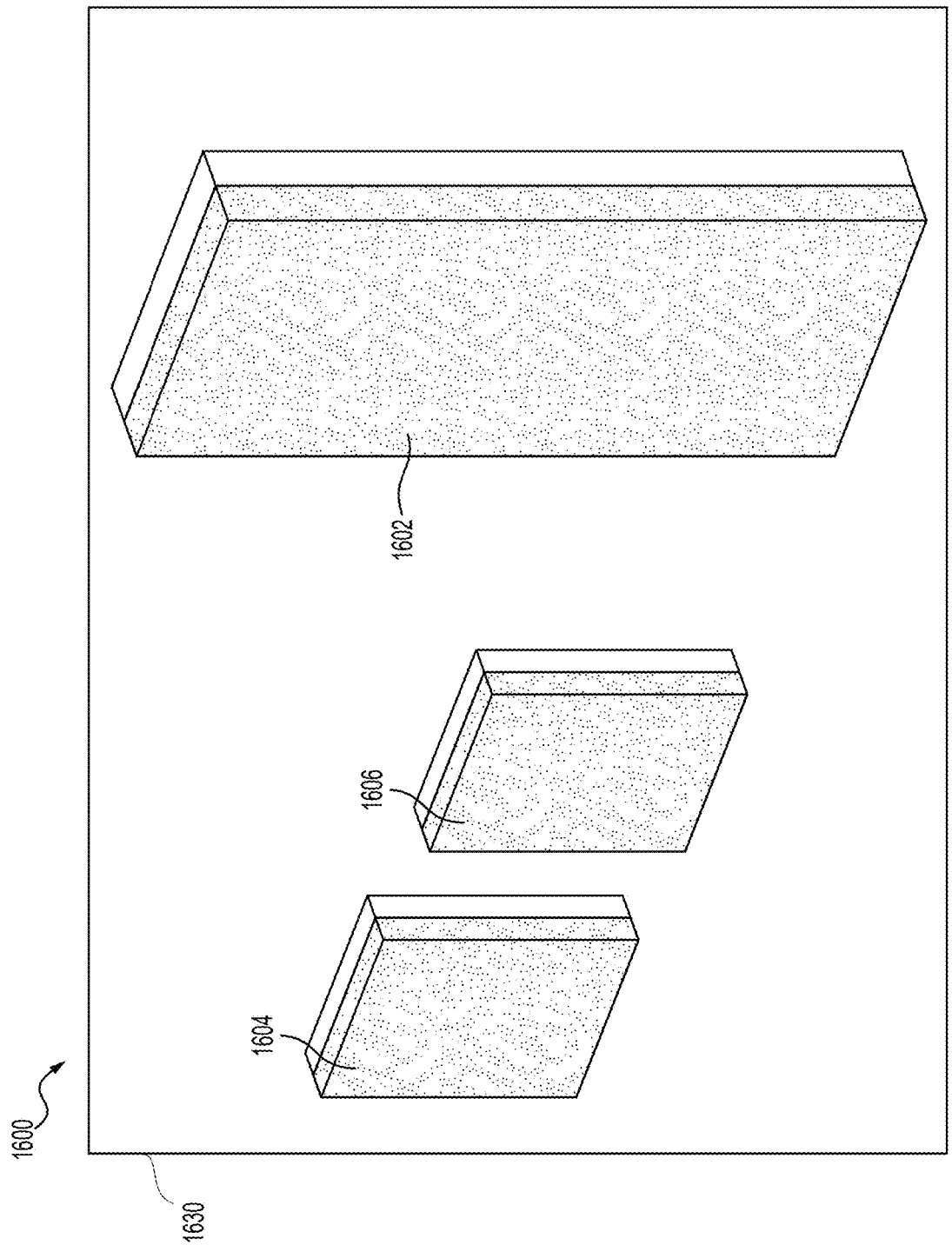
FIG. 16C is a schematic view of a reinforced porcelain panel product kit, according to one embodiment of the present disclosure.

FIG. 16C illustrates an embodiment of the reinforced porcelain panel product kit 1600 wherein the kit is provided within a container. As previously mentioned, the container 1630, or a support member. The container 1630 may be a box, a crate, a pallet, an a-frame crate, or the like, wherein the container 1630 is configured to house, support, or keep the components within the reinforced porcelain panel product kit 1600 together or in a specific position, to define a shipping package, as would be understood by those skilled in the art. In one embodiment, the reinforced porcelain panel product kit 1600 includes more components as illustrated in FIG. 16C such as, for example, additional trim pieces for finishing work, as discussed in FIG. 10. In another embodiment, the reinforced porcelain panel product kit 1600 includes fewer components as illustrated in FIGS. 16A, 16B, and 16C. In still another embodiment, the reinforced porcelain panel product kit 1600 further includes a magnetic metal panel 960 as discussed in FIG. 9C. Further, it is to be understood by those skilled in the art that the reinforced porcelain panel product kit 1600 also may include instructional manuals, video tutorials, adhesive, cleaning wipes or cloth, shims, and/or the like, configured to provide instruction, and/or tools, such as a utility knife or a cutting tool, to enable a stone mason to install the reinforced porcelain panel product 100 in a desired location. The components as illustrated within the reinforced porcelain panel product kit 1600 of FIGS. 16A, 16B, and 16C are not representative of the actual size, or quantity, but rather are exemplary to view an embodiment of a kit.

EXAMPLES

The following examples reveal the durability of the reinforced porcelain panel product 100 discussed above as will be understood by those skilled in the art. The reinforced porcelain panel product 100 was experimentally evaluated to exhibit strength and resilience as compared to conventional porcelain option available for construction purchase. Below are the findings of tested examples for breaking strength, impact resistance, and adhesive resilience as will be understood by those skilled in the art.

Example 1: In a first example, a breaking strength of the reinforced porcelain panel product 100 was experimentally determined under International Organization for Standardization ("ISO") test number 10545-4, as will be understood by those skilled in the art. The breaking strength of the reinforced porcelain panel product 100 was determined to yield increased strength with a conventional 6-millimeter neolith porcelain. The below table illustrates the specific ISO test findings.

TABLE 1

Breaking strength increase using a structural core board from Example 1.

| PROCEDURE | PROPERTY | PRODUCT | AVERAGE RESULTS | NEOLITH Porcelain 6-mm | STRENGTH INCREASE |
|---|---|---|---|---|---|
| ISO 10545-4 | Breaking Strength | T92.130 | 1,960 Nmm/mm | 700 Nmm/mm | 180% |

Table 1 illustrates the breaking strength increase of about 180% by using a structural core board, such as structural core board 130 discussed above on a conventional 6-millimeter neolith porcelain slab as compared to the conventional 6-millimeter neolith porcelain slab without the structural core board. Therefore, the results support a finding of at least 180% breaking strength increase, such as at least about 175% breaking strength increase, such as at least about 170% breaking strength increase, such as at least about 160% breaking strength increase, such as at least about 150% breaking strength increase, such as at least about 140% breaking strength increase, such as at least about 130% breaking strength increase, such as at least about 120% breaking strength increase, such as at least about 110% breaking strength increase, such as at least about 100% breaking strength increase, such as at least about 90% breaking strength increase, such as at least about 80% breaking strength increase, such as at least about 70% breaking strength increase, such as at least about 60% breaking strength increase, such as at least about 50% breaking strength increase, such as at least about 40% breaking strength increase, such as at least about 30% breaking strength increase, such as at least about 20% breaking strength increase, such as at least about 10% breaking strength increase, by using a structural core board, such as structural core board 130 discussed above on a conventional 6-millimeter neolith porcelain slab as compared to the conventional 6-millimeter neolith porcelain slab without the structural core board.

Example 2: In a second example, an impact resistance of the reinforced porcelain panel product 100 was experimentally determined under European Standard ("EN") test number 14617-9, as will be understood by those skilled in the art. The impact resistance of the reinforced porcelain panel product 100 was determined to yield increased resistance with a conventional 6-millimeter florim porcelain. The below table illustrates the specific EN test findings.

TABLE 2

Impact resistance increase using a structural core board from Example 2.

| PROCEDURE | PROPERTY | PRODUCT | AVERAGE RESULTS | FLORIM Porcelain 6-mm | RESISTANCE INCREASE |
|---|---|---|---|---|---|
| EN 14617-9 | Impact Resistance (Fracture Work) | T92.130 | 4.76 J | 3.16 J | 50.63% |

Table 2 illustrates the impact resistance increase of at least about 50% by using a structural core board, such as structural core board 130 discussed above on a conventional 6-millimeter florim porcelain slab as compared to the conventional 6-millimeter florim porcelain slab without the structural core board. Therefore, the results support a finding of at least 50% impact resistance increase, such as at least about 45% impact resistance increase, such as at least about 40% impact resistance increase, such as at least about 35% impact resistance increase, such as at least about 30% impact resistance increase, such as at least about 25% impact resistance increase, such as at least about 20% impact resistance increase, such as at least about 15% impact resistance increase, such as at least about 10% impact resistance increase, such as at least about 5% impact resistance increase, by using a structural core board, such as structural core board 130 discussed above on a conventional 6-millimeter florim porcelain slab as compared to the conventional 6-millimeter florim porcelain slab without the structural core board.

Example 3: In a third example, an impact resistance of the reinforced porcelain panel product 100 was experimentally determined under European Standard ("EN") test number 14617-9. The impact resistance of the reinforced porcelain panel product 100 was determined to yield increased resistance with a conventional 12-millimeter florim porcelain. The below table illustrates the specific EN test findings. Unless otherwise notated, the unit "J" refers to Joules, as would be understood by one skilled in the art.

TABLE 3

Impact resistance increase using a structural core board from Example 3.

| PROCEDURE | PROPERTY | PRODUCT | AVERAGE RESULTS | FLORIM Porcelain 12-mm | RESISTANCE INCREASE |
|---|---|---|---|---|---|
| EN 14617-9 | Impact Resistance (Fracture Work) | T92.130 | 4.76 J | 3.03 J | 57.10% |

Table 3 illustrates the impact resistance increase of at least about 57% by using a structural core board, such as structural core board 130 discussed above on a conventional 12-millimeter florim porcelain slab as compared to the conventional 12-millimeter florim porcelain slab without the structural core board. Therefore, the results support a finding of at least 57% impact resistance increase, such as at least about 55% impact resistance increase, such as at least about 45% impact resistance increase, such as at least about 40% impact resistance increase, such as at least about 35% impact resistance increase, such as at least about 30% impact resistance increase, such as at least about 25% impact resistance increase, such as at least about 20% impact resistance increase, such as at least about 15% impact resistance increase, such as at least about 10% impact resistance increase, such as at least about 5% impact resistance increase, by using a structural core board, such as structural core board 130 discussed above on a conventional 12-millimeter florim porcelain slab as compared to the conventional 12-millimeter florim porcelain slab without the structural core board.

It is important to note the testing results from Example 2 and Example 3 support a finding of at least 50% impact resistance increase, by using a structural core board on either a conventional 6-millimeter florim porcelain slab or a conventional 12-millimeter florim porcelain slab. Therefore, it may be understood the impact resistance is advantageously increased by at least 50% and other common values mentioned above.

Example 4: In a fourth example, an adhesive bonding test was performed using three types of KANEKA MS Polymer adhesives, referred to as 1) TAW, 2) SKIF-28, and 3) SWC-008. The three adhesives were tested for tensile strength, such as a pulling test, under the International Standard Organization (ISO) standard ISO13007-2 covering ceramic tiles including grouts and adhesives, which evaluates short term results, such as cohesive failure (CF) between ceramic surfaces using grouts and adhesives, as would be understood by one skilled in the art. Each adhesive was applied to a separate mortar substrate and adhered to green foam, as would be understood by one skilled in the art. The bond was tested after 4 days. The force to separate the bond was measured for each of the adhesives is shown in the below table.

TABLE 4

Tensile Testing Results.

| | | | | TAW | SKIF-28 | SWC-008 Green Foam |
|---|---|---|---|---|---|---|
| Tensile Testing ISO13007-2 | ISO Mortar | TB Failure | MPa | 0.34 CF | 0.49 CF | 0.35 CF |

Table 4 illustrates the tensile strength of each of the adhesives. The pressure, in megapascal (MPa), for TAW was 0.34 to achieve CF. The pressure for SKIF-28 was 0.49 MPa to achieve CF. The pressure for SWC-008B was 0.35 MPa to achieve cohesive failure. SKIF-28 was observed to tolerate the highest pressure on the tensile test.

Example 5: In a fifth example, a fast grab test was performed using two of the KANEKA MS Polymer™ adhesives in Example 4. The adhesives include 1) TAW and 2) SKIF-28. The two adhesives were tested for an evaluation of how much weight can be held by the substrate just after applying adhesive. One skilled in the art may refer to this test as a "non-sag" test. The force to move the substrate was evaluated against ANSI 118.4. The results of the fast grab test are shown in the below table.

TABLE 5

Fast Grab Test Results.

| | | | TAW | SKIF-28 | ANSI 118.4 |
|---|---|---|---|---|---|
| Fast Grab Testing 4 inch × 5 inch | 100% coverage | g/cm$^2$ lb/ft$^2$ | 7.17 14.68 | 6.39 13.10 | >1.94 >3.97 |

Table 5 illustrates the results of the fast grab test in which both TAW and SKIF-28 adhesives exceed the requirements of the ANSI 118.4 standard. For example, ANSI 118.4 criteria requires more than 3.97 lb/ft$^2$ and TAW exhibited a 14.68 lb/ft$^2$ fast grab results. Similarly, SKIF-28 exceeded the 3.97 lb/ft$^2$ ANSI 118.4 criteria at 13.10 lb/ft$^2$. Porcelain tile weight may be about 2.9 lb/ft$^2$, therefore TAW adhesive may require only about 20% coverage to hold tile or composite tile.

Example 6: In a sixth example, SWC-008 adhesive, as discussed in Example 4, was tested for satisfactory bonding of the porcelain to a foam panel. The SWC-008 adhesive was tested as an offset of GLAX, as SWC-008 is a 1-part, lower viscosity, rollable, and quickdry, as compared to the mixing requirement of a 2 part system. Dry time was observed to be less than 3.5 hours. The lower viscosity of SWC-008 enables bonding to bond porcelain tile to foam panels without gaps. Adhesion strength was empirically found to be satisfactory. In a subsequent tensile test, the foam panel was deformed before the SWC-008 adhesive was peeled off. Thus, SWC-008 has be found to have sufficient and satisfactory adhesion to bond porcelain and a foam panel, as disclosed above.

Example 7: In a seventh example, the compatibility of the KANEKA MS Polymer adhesives, referred to as 1) TAW, 2) SKIF-28, and 3) SWC-008, with waterproofing products, such as Redguard®, or waterstop, was tested. Each of the adhesives was applied to a wall coated with a waterproofing product. No damage or degradation of the waterproofing membrane, or wall coating, was observed.

Example 8: In an eight example, a ceiling tile test is to be performed. At the time of filing this application, a ceiling tile test is planned by first bonding porcelain and a foam panel, as discussed above, by SWC-008 and then using the composite to test durability of the adhesive in a simulated downward facing orientation to perform as a ceiling tile would be positioned, as would be understood by one skilled in the art.

This application is a divisional of U.S. Non-Provisional application Ser. No. 18/902,121, filed Sep. 30, 2024, titled "REINFORCED PORCELAIN PANEL PRODUCT FABRICATION METHODS FOR ENHANCED STRUCTURAL PROTECTION," which is a continuation-in-part of U.S. Non-Provisional application Ser. No. 18/821,454, filed Aug. 30, 2024, titled "REINFORCED PORCELAIN PANEL SYSTEM AND ASSOCIATED METHODS FOR ENHANCED STRUCTURAL PROTECTION," which claims priority to and the benefit of U.S. Provisional Application No. 63/676,400, filed Jul. 28, 2024, titled "REINFORCED PORCELAIN PANEL PRODUCT AND ASSOCIATED METHODS FOR ENHANCED STRUCTURAL PROTECTION," U.S. Provisional Application No. 63/651,803, filed May 24, 2024, titled "REINFORCED PORCELAIN PANEL PRODUCT AND ASSOCIATED METHODS FOR ENHANCED STRUCTURAL PROTECTION," U.S. Provisional Application No. 63/643,778, filed May 7, 2024, titled "REINFORCED PORCELAIN PANEL PRODUCT AND ASSOCIATED METHODS FOR ENHANCED STRUCTURAL PROTECTION," U.S. Provisional Application No. 63/551,903, filed Feb. 9, 2024, titled "MAGNETIC SHOWER WALL ACCESSORIES," U.S. Provisional Application No. 63/549,820, filed Feb. 5, 2024, titled "PORCELAIN BOARD TILES," U.S. Provisional Application No. 63/549,704, filed Feb. 5, 2024, titled "PORCELAIN BOARD FOR FABRICATORS OR DISTRIBUTORS," and U.S. Provisional Application No. 63/541,981, filed Oct. 2, 2023, titled "SYSTEMS AND METHODS FOR PORCELAIN BOARD," the disclosures of all of which are incorporated herein by reference in their entireties. U.S. Non-Provisional application Ser. No. 18/902,121 is also a continuation-in-part of U.S. Non-Provisional application Ser. No. 18/821,478, filed Aug. 30, 2024, titled "REINFORCED PORCELAIN PANEL SYSTEM AND ASSOCIATED METHODS FOR ENHANCED STRUCTURAL PROTECTION," which claims priority to and the benefit of U.S. Provisional Application No. 63/676,400, filed Jul. 28, 2024, titled "REINFORCED PORCELAIN PANEL PRODUCT AND ASSOCIATED METHODS FOR ENHANCED STRUCTURAL PROTECTION," U.S. Provisional Application No. 63/651,803, filed May 24, 2024, titled "REINFORCED PORCELAIN PANEL PRODUCT AND ASSOCIATED METHODS FOR ENHANCED STRUCTURAL PROTECTION," U.S. Provisional Application No. 63/643,778, filed May 7, 2024, titled "REINFORCED PORCELAIN PANEL PRODUCT AND ASSOCIATED METHODS FOR ENHANCED STRUCTURAL PROTECTION," U.S. Provisional Application No. 63/551,903, filed Feb. 9, 2024, titled "MAGNETIC SHOWER WALL ACCESSORIES," U.S. Provisional Application No. 63/549,820, filed Feb. 5, 2024, titled "PORCELAIN BOARD TILES," U.S. Provisional Application No. 63/549,704, filed Feb. 5, 2024, titled "PORCELAIN BOARD FOR FABRICATORS OR DISTRIBUTORS," and U.S. Provisional Application No. 63/541,981, filed Oct. 2, 2023, titled "SYSTEMS AND METHODS FOR PORCELAIN BOARD," the disclosures of all of which are incorporated herein by reference in their entireties.

Other objects, features, and advantages of the disclosure will become apparent from the foregoing figures, detailed description, and embodiments. It should be understood, however, that the figures, detailed description, and embodiments, while indicating specific embodiments of the disclosure, are given by way of illustration only and are not meant to be limiting. Additionally, it is contemplated that changes and modifications within the spirit and scope of the disclosure will become apparent to those skilled in the art from the detailed description. In further embodiments, features from specific embodiments may be combined with features from other embodiments. For example, features from one embodiment may be combined with features from any of the other embodiment. In further examples, additional features may be added to the specific embodiment described herein.

What is claimed is:

1. A method to fabricate one or more reinforced porcelain panel products for renovations or new constructions, the method comprising:
   applying an adhesive material to a top surface of a structural core board, the structural core board including a foam-core material, a bottom surface opposite the top surface, and a total surface area defined by summating surface areas from all surfaces of the structural core board;
   positioning the structural core board such that the top surface of the structural core board aligns with a preselected position of a bottom surface of a porcelain slab;
   abuttingly contacting the structural core board to the bottom surface of the porcelain slab with the adhesive material therebetween at the preselected position to produce a reinforced porcelain panel product, the structural core board having a thickness greater than the porcelain slab such that the total surface area of the structural core board is greater than the total surface area of the porcelain slab, thereby to enhance protection from cracking or chipping when the reinforced porcelain panel product is handled, the bottom surface of the structural core board (a) having a first surface plane substantially parallel to a top surface of the porcelain slab and (b) to be attached to a mounting surface when installed; and
   pressing the structural core board onto the porcelain slab to spread the adhesive material thereon so as to be substantially evenly distributed therebetween, thereby to reduce air between the structural core board onto the porcelain slab and to affix the structural core board onto the porcelain slab.

2. The method of claim 1, wherein applying the adhesive material includes using a spray, roller, bead applicators, or a combination thereof, and wherein the adhesive material includes a silyl-terminated polyether base resin.

3. The method of claim 1, further comprising:
   pre-sizing the porcelain slab to have a thickness within a range between, and including, about 3-millimeters to about 8-millimeters prior to applying the adhesive material to the top surface of the structural core board; and
   trimming outer peripheries of the structural core board, after pressing the structural core board onto the porcelain slab, such that the structural core board extends an equidistant distance beyond all outer peripheries of a first surface area of the top surface of the porcelain slab, and
   wherein the applying the adhesive material includes using a spray, roller, bead applicators, or a combination thereof, and wherein the adhesive material includes a silyl-terminated polyether base resin.

4. The method of claim 1, wherein the structural core board has a fracture toughness greater than the porcelain slab, wherein the fracture toughness of the structural core board resists a fracture after the porcelain slab is divided such that the structural core board remains intact when the porcelain slab is divided into two or more portions, and wherein outer peripheries of the structural core board substantially align with outer peripheries of the porcelain slab such that outer peripheries of the structural core board are substantially flush aligned with the outer peripheries of the porcelain slab.

5. The method of claim 1, further comprising forming the foam-core material by one or more of the steps of molding, pressing, or layering, and wherein the foam-core material includes a thermoplastic consisting of one or more of polyurethane, polycarbonate, polyphenylene oxide, polybutylene terephthalate, polyethylene terephthalate, or acrylonitrile butadiene styrene, wherein the foam-core material has a Young's modulus value lower than the porcelain slab, and wherein the Young's modulus value of the foam-core material has a range between, and including, about 2.0 GPa to about 14.6 GPa.

6. The method of claim 1, wherein the reinforced porcelain panel product has an impact resistance of at least a 30% greater than porcelain having a thickness of 6 mm or higher, wherein the reinforced porcelain panel product has a breaking strength of at least 40% greater than porcelain having a thickness of at least 6 mm, wherein the structural core board has a Young's modulus value lower than the porcelain slab, wherein the Young's modulus value of the foam-core material has a range between, and including, about 2.0 GPa to about 14.6 GPa, and wherein the structural core board extends beyond outer peripheries of a first surface area of the top surface of the porcelain slab by an overhang length within a range between, and including, about 0.125 inch to about 0.750 inches evenly surrounding the outer peripheries of the first surface area of the porcelain slab.

7. The method of claim 1, further comprising scoring the top surface of the porcelain slab with one or more scorelines positioned along one or more selected locations across the top surface, thereby to guide controlled breaks to cut the porcelain slab into a selected pattern when a radial force is exerted on or near the scorelines.

8. The method of claim 7, further comprising: (a) cutting the porcelain slab along the one or more scorelines to make one or more tiles of the reinforced porcelain panel product; (b) positioning the one or more tiles of the reinforced porcelain panel product in a selected orientation; and (c) abuttingly affixing one or more tiles to a mounting surface.

9. A method to fabricate one or more reinforced porcelain panel products for renovations or new constructions, the method comprising:
applying an adhesive material to a top surface of a structural core board, the structural core board including a foam-core material, a bottom surface opposite the top surface, a total surface area defined by summating surface areas from all surfaces of the structural core board, and having a thickness up to 10-millimeters;
positioning the structural core board such that the top surface of the structural core board aligns with a preselected position of a bottom surface of a porcelain slab, the porcelain slab having a thickness within a range between, and including, about 3-millimeters to about 8-millimeters;
contacting the top surface of the structural core board to the bottom surface of the porcelain slab with the adhesive material therebetween at the preselected position to produce a reinforced porcelain panel product, the structural core board having a thickness greater than the porcelain slab such that the total surface area of the structural core board is greater than the total surface area of the porcelain slab and a second surface area of the top surface of the structural core board substantially equal to a first surface area of the top surface of the porcelain slab such that outer peripheries of the structural core board substantially align with outer peripheries of the first surface area of the porcelain slab, thereby to enhance protection from cracking or chipping when the reinforced porcelain panel product is handled, the bottom surface of the structural core board (a) having a first surface plane substantially parallel to the top surface of the porcelain slab and (b) to be attached to a mounting surface when installed; and
pressing the structural core board onto the porcelain slab to spread the adhesive material thereon so as to be substantially evenly distributed therebetween, thereby to reduce air between the structural core board onto the porcelain slab and to affix the structural core board onto the porcelain slab when in the adhesive material cures.

10. The method of claim 9, further comprising trimming outer peripheries of the structural core board, after pressing the structural core board onto the porcelain slab, such that the structural core board extends an equidistant distance beyond all outer peripheries of the first surface area of the porcelain slab, wherein the applying of the adhesive material includes using a spray, roller, bead applicators, or a combination thereof, and wherein the adhesive material includes a silyl-terminated polyether base resin.

11. The method of claim 9, wherein the foam-core material is formed by a technique including one or more of molding, pressing, or layering, wherein the form-core material includes a thermoplastic consisting of one or more of polyurethane, polycarbonate, polyphenylene oxide, polybutylene terephthalate, polyethylene terephthalate, or acrylonitrile butadiene styrene, wherein the foam-core material has a Young's modulus value lower than the porcelain slab, wherein the Young's modulus value of the foam-core material has a range between, and including, about 2.0 GPa to about 14.6 GPa, and wherein the structural core board has a thickness greater than the porcelain slab.

12. The method of claim 11, wherein the structural core board comprises two or more interlocking backing segments so that each of the two or more interlocking backing segments interlock to another of the two or more interlocking backing segments, and wherein each of the two or more interlocking backing segments comprises a finger joint, a shiplap joint, or a dovetail joint each configured to adhesively interlock each of the two or more interlocking backing segments together.

13. A method to fabricate one or more reinforced porcelain panel products for renovations or new constructions, the method comprising:
forming a structural core board of a foam-core material, the forming including one or more steps of molding, pressing, or layering, the foam-core material having a Young's modulus value in a range between, and including, about 2.0 GPa to about 14.6 GPa, the structural core board having a bottom surface opposite a top surface, and a total surface area defined by summating surface areas from all surfaces of the structural core board;
applying an adhesive material to a top surface of the structural core board;

positioning the structural core board such that the top surface of the structural core board aligns with a preselected position of a bottom surface of a porcelain slab;

abuttingly contacting the structural core board to the bottom surface of the porcelain slab with the adhesive material therebetween at the preselected position to produce a reinforced porcelain panel product, the structural core board having a thickness greater than the porcelain slab such that the total surface area of the structural core board is greater than the total surface area of the porcelain slab, thereby to enhance protection from cracking or chipping when the reinforced porcelain panel product is handled, the bottom surface of the structural core board (a) having a first surface plane substantially parallel to a top surface of the porcelain slab and (b) to be attached to a mounting surface when installed; and pressing the structural core board onto the porcelain slab to spread the adhesive material thereon so as to be substantially evenly distributed therebetween, thereby to reduce air between the structural core board onto the porcelain slab and to affix the structural core board onto the porcelain slab when in the adhesive material cures.

14. The method of claim 13, further comprising: (a) cutting the porcelain slab along one or more scorelines to make one or more tiles of the reinforced porcelain panel product; (b) positioning the one or more tiles of the reinforced porcelain panel product in a selected orientation; and (c) abuttingly affixing one or more tiles to a mounting surface.

15. The method of claim 14, wherein the foam-core material includes a thermoplastic consisting of one or more of polyurethane, polycarbonate, polyphenylene oxide, polybutylene terephthalate, polyethylene terephthalate, or acrylonitrile butadiene styrene.

16. The method of claim 13, wherein the structural core board has a fracture toughness greater than the porcelain slab, wherein the fracture toughness of the structural core board resists a fracture after the porcelain slab is divided such that the structural core board remains intact when the porcelain slab is divided into two or more portions, and wherein outer peripheries of the structural core board substantially align with outer peripheries of the porcelain slab such that outer peripheries of the structural core board are substantially flush aligned with the outer peripheries of the porcelain slab.

17. The method of claim 16, wherein the reinforced porcelain panel product has an impact resistance of at least a 30% greater than porcelain having a thickness of 6 mm or higher, wherein the reinforced porcelain panel product has a breaking strength of at least 40% greater than porcelain having a thickness of at least 6 mm, wherein the structural core board has a Young's modulus value lower than the porcelain slab, and wherein the structural core board extends beyond outer peripheries of a first surface area of the top surface of the porcelain slab by an overhang length within a range between, and including, about 0.125 inch to about 0.750 inches evenly surrounding the outer peripheries of the first surface area of the porcelain slab.

18. The method of claim 13, further comprising trimming outer peripheries of the structural core board, after pressing the structural core board onto the porcelain slab, such that the structural core board extends an equidistant distance beyond all outer peripheries of the first surface area of the porcelain slab, wherein the applying of the adhesive material includes using a spray, roller, bead applicators, or a combination thereof, and wherein the adhesive material includes a silyl-terminated polyether base resin.

19. The method of claim 13, wherein the structural core board comprises two or more interlocking backing segments so that each of the two or more interlocking backing segments interlock to another of the two or more interlocking backing segments, and wherein each of the two or more interlocking backing segments comprises a finger joint, a shiplap joint, or a dovetail joint each configured to adhesively interlock each of the two or more interlocking backing segments together.

20. The method of claim 13, wherein applying the adhesive material includes using a spray, roller, bead applicators, or a combination thereof, and wherein the adhesive material includes a silyl-terminated polyether base resin, and the method further comprising pre-sizing the porcelain slab to have a thickness within a range between, and including, about 3-millimeters to about 8-millimeters prior to applying the adhesive material to the top surface of the structural core board.

* * * * *